(12) United States Patent
Kayumi

(10) Patent No.: US 7,063,368 B2
(45) Date of Patent: Jun. 20, 2006

(54) ELECTRIC VEHICLE SEAT STOWING STRUCTURE

(75) Inventor: Tetsuya Kayumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 10/878,106

(22) Filed: Jun. 28, 2004

(65) Prior Publication Data

US 2005/0017564 A1 Jan. 27, 2005

(30) Foreign Application Priority Data

Jun. 30, 2003 (JP) .............................. 2003-188909

(51) Int. Cl.
*B60N 2/10* (2006.01)
*B60N 2/14* (2006.01)

(52) U.S. Cl. ................. 296/65.05; 296/65.08

(58) Field of Classification Search ............ 296/65.05, 296/65.01, 66, 65.08, 65.09, 65.16–18; 297/378.1, 297/378.12, 344.1
See application file for complete search history.

(56) References Cited

U.S. PATENT DOCUMENTS

| 3,227,488 | A |   | 1/1966 | Kosbab et al. |
|---|---|---|---|---|
| 4,880,274 | A | * | 11/1989 | Ichikawa ................... 297/362 |
| 5,199,764 | A | * | 4/1993 | Robinson ............... 297/362.11 |
| 5,269,581 | A |   | 12/1993 | Odagaki et al. |
| 5,660,437 | A | * | 8/1997 | Bauer et al. ................. 297/237 |
| 5,702,155 | A | * | 12/1997 | Ito ......................... 297/362.11 |
| 5,788,329 | A | * | 8/1998 | Pilarczyk et al. ...... 297/354.13 |
| 5,860,702 | A | * | 1/1999 | Pilarczyk et al. ...... 297/354.13 |
| 6,131,999 | A | * | 10/2000 | Piekny et al. .......... 297/378.12 |
| 6,231,101 | B1 | * | 5/2001 | Kamida et al. ................ 296/63 |
| 6,435,589 | B1 | * | 8/2002 | Shimizu et al. .......... 296/65.09 |
| 6,464,297 | B1 | * | 10/2002 | Garrido et al. ........ 297/354.13 |
| 6,637,819 | B1 | * | 10/2003 | Tame ......................... 297/331 |
| 2005/0168035 | A1 | * | 8/2005 | Boudinot ................. 297/378.1 |

FOREIGN PATENT DOCUMENTS

JP 5-40029 5/1993

OTHER PUBLICATIONS

WO 00/12346, Method and Device for Automatically Folding Back the Back Seats of a Motor Vehicle, Publication Date: Mar. 9, 2000.
WO 03/039905, Power Folding Seat, Publication Date: May 15, 2003.

* cited by examiner

*Primary Examiner*—H. Gutman
(74) *Attorney, Agent, or Firm*—Rankin, Hill, Porter & Clark LLP

(57) ABSTRACT

An electric vehicle seat stowing structure having a swing drive mechanism for swinging a seat cushion between a seating position and a stowing position, the swing drive mechanism provided on a floor of a vehicle in the vicinity of a wheel house including a group of reduction gears disposed in a gear case or in a bracket and an actuator for driving the group of reduction gears placed vertically on a side of the gear case or the bracket and a striker for locking the seat cushion to the seating position.

13 Claims, 39 Drawing Sheets

COMPARISON EXAMPLE
Prior Art

EMBODIMENT EXAMPLE

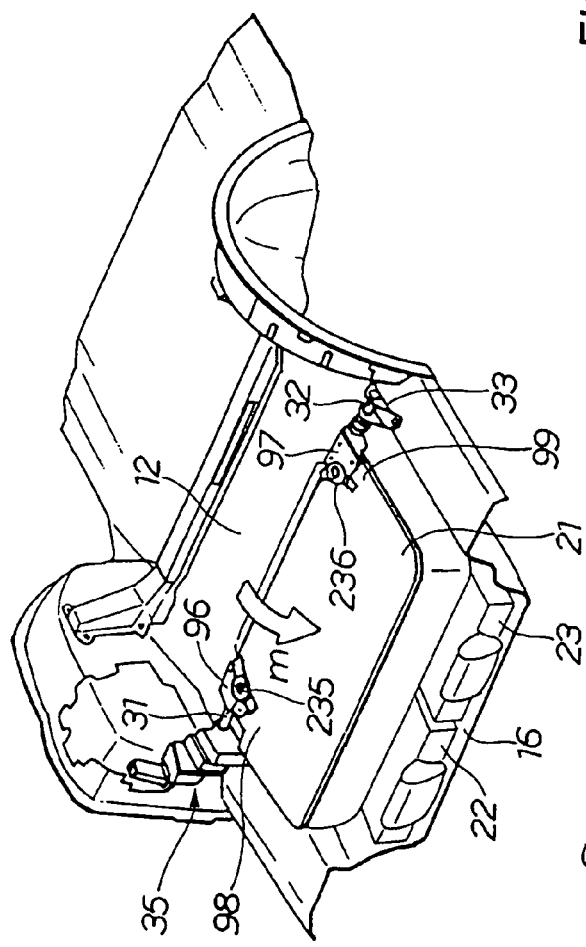
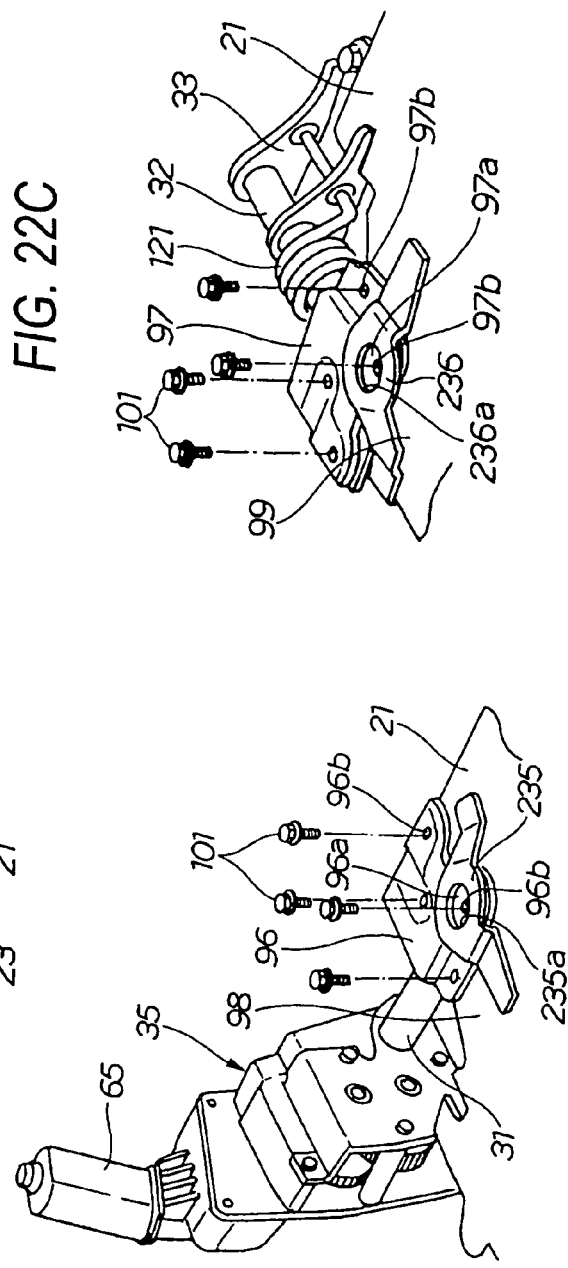
FIG. 22A
FIG. 22B
FIG. 22C

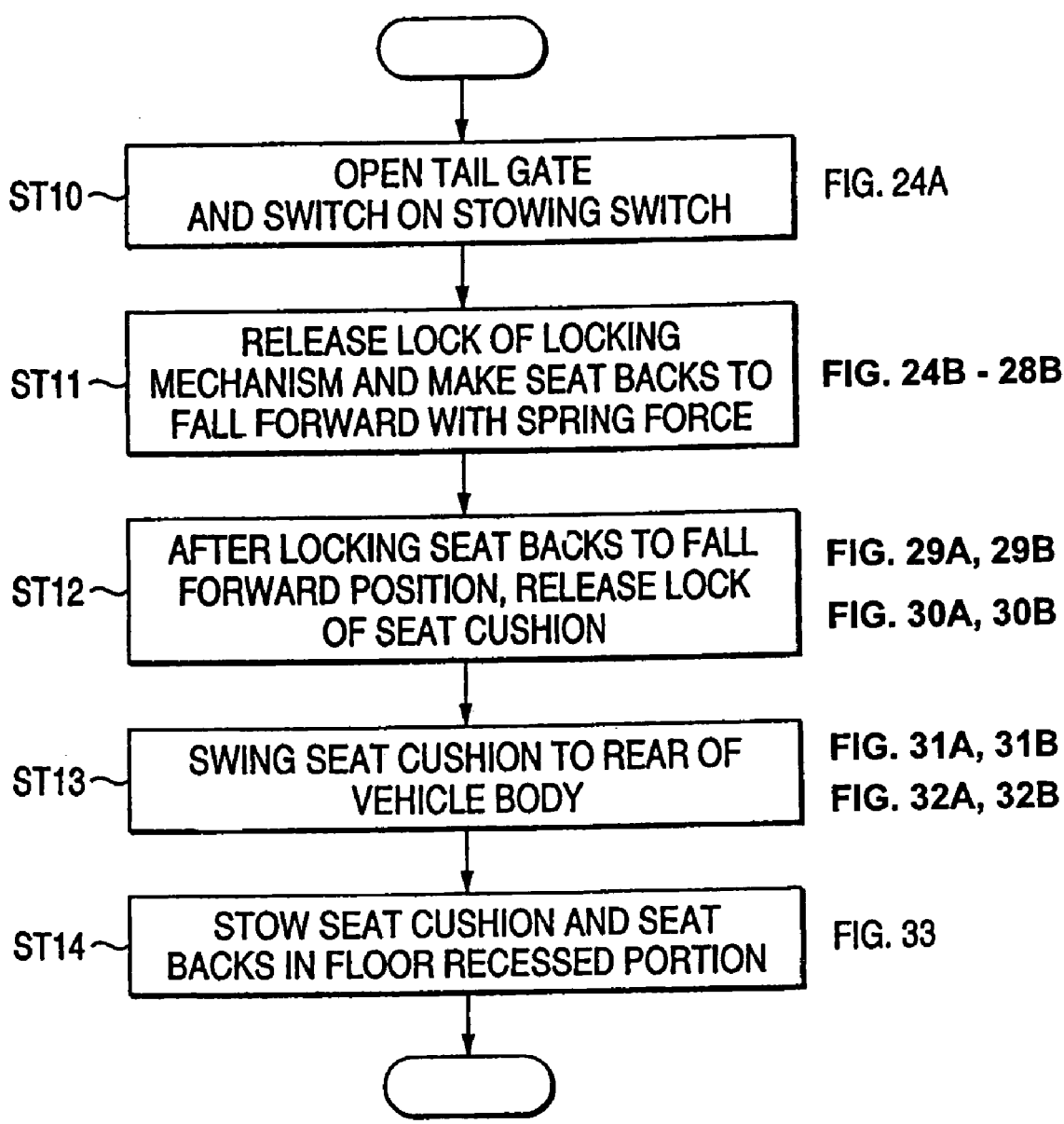

ELECTRIC VEHICLE SEAT STOWING STRUCTURE

The present invention claims foreign priority to Japanese patent application no. 2003-188909, filed on Jun. 30, 2004, the contents of which is incorporated herein by reference.

BACKGROUND OF THE INVENTION

1. Field of the Invention

The present invention relates to an electric vehicle seat stowing structure for electrically stowing and restoring to a previous position a rearmost seat disposed rearward of a front seat.

2. Description of the Related Art

Among vehicles, there are known vehicles of a type in which a first rear seat and a second rear seat are provided rearward of a front seat so as to secure a riding capacity of 6 to 7 people, the second rear seat, for example, being folded down to form a large space within a passenger compartment thereof (refer to Japanese Utility Model Unexamined Publication JP-UM-A-5-40029 (pages 5 to 6, FIG. 3))

FIG. 39 is a cross-sectional view which is shown in FIG. 3 of Japanese Utility Model Patent Unexamined Publication JP-UM-A-5-40029. Note that different reference numerals are imparted in FIG. 39.

A vehicle seat stowing structure 300 is constructed such that a second rear seat 301 disposed at a rearmost portion of an vehicle is normally disposed at a position indicated by solid lines so that an occupant 302 can be seated on it (hereinafter, referred to as a "seating position"), and when large cargo needs to be installed within a passenger compartment 303, for example, the second rear seat 301 is stowed in a recessed stowing portion formed in a floor at the rear of the vehicle.

An example of stowing the vehicle seat stowing structure 300 in the floor recessed stowing portion 304 will be described in detail in the following drawing.

FIGS. 40A to 40C are drawings which explain the function of the conventional vehicle seat stowing structure.

In FIG. 40A, when the second rear seat 301 of the vehicle seat stowing structure 300 is stowed in the floor recessed stowing portion 304, first of all, a seat back 306 is made to fall forward as indicated by an arrow so as to be overlie a seat cushion 307.

In FIG. 40B, head restraints 308 are removed from the seat back 306 which is made to fall forward to overlie the seat cushion 307 and are then stowed in a head restraint stowing portion 309 (refer to FIG. 40B) provided within the passenger compartment 303.

Next, the seat cushion 307 is swung to the rear together with the seat back 306 about a support shaft portion 310.

In FIG. 40C, the seat cushion 307 and the seat back 306 (the second rear seat 301) are then stowed in the floor recessed stowing portion 304.

Here, the second rear seat 301 itself is relatively heavy, and therefore, a large operating force is required to swing the second rear seat 301 to the rear of the vehicle body with the hands so as to stow it in the floor recessed stowing portion 304.

In addition, in stowing the second rear seat 301 in the floor recessed stowing portion 304, the second rear seat 301 needs to be swung with the hands while the seat is unlocked by hand.

Due to this, relatively more labor is required to stow the second rear seat 301 in the floor recessed stowing portion 304, and in this respect, an improvement has been demanded.

As a means for improving the inconvenient situation, it is considered, for example, to stow the second rear seat 301 in the floor recessed stowing portion 304 in an electric fashion.

Incidentally, in order to swing the second rear seat 301 to the rear around the support shaft portion 310 so as to electrically stow the seat in the floor recessed stowing portion 304, a driving actuator for driving the support shaft portion 310 needs to be mounted on the vehicle body side.

Since the support shaft portion 310 is provided in the vicinity of a rear end portion of the second rear seat 301, it is considered that the driving actuator protrudes from the rear end of the second rear seat 301 to the rear of the vehicle body.

In the event that the driving actuator protrudes to the rear of the vehicle body, the actuator and a garnish which constitutes a partition for a cargo space behind the second rear seat need to be moved to the rear.

Due to this, it is considered that the cargo space behind the second rear seat 301 becomes more limited.

SUMMARY OF THE INVENTION

Then, an object of the present invention is to provide an electric vehicle seat stowing structure which can secure a wide cargo space.

With a view to attaining the object, according to a first aspect of the invention, there is provided an electric vehicle seat stowing structure having a swing drive mechanism for swinging a seat cushion between a seating position and a stowing position, the swing drive mechanism provided on a floor of a vehicle in the vicinity of a wheel house including a group of reduction gears disposed in a gear case or in a bracket and an actuator for driving the group of reduction gears placed vertically on a side of the gear case or the bracket and a striker for locking the seat cushion to the seating position.

The group of reduction gears is disposed in the gear case or on the bracket and that the actuator is placed vertically on the side of the gear case or the bracket.

Consequently, the protrusion of the swing drive mechanism into the cargo space provided behind the seat cushion can be prevented.

By this construction, a large cargo space can be secured so that the cargo space can be utilized effectively to satisfy various applications.

According to a second aspect of the invention as set forth in the first aspect of the invention, there is provided an electric vehicle seat stowing structure, further having a rear member for reinforcing the floor, wherein the swing drive mechanism and the striker are mounted on the rear member.

Here, when swing back and force the seat cushion by means of the swing drive mechanism, a relatively large magnitude of force is applied to the swing drive mechanism. Due to this, the swing drive mechanism is preferably mounted on a relatively rigid location.

Then, according to the second aspect of the invention, the swing drive mechanism is provided on the rear member which reinforces the floor, whereby even if the relatively large magnitude of force is applied to the swing drive mechanism, the mounting accuracy of the swing drive mechanism can preferably be maintained.

On the other hand, in order to lock the seat cushion to the seating position, the seat cushion needs to be locked to the striker when the seat cushion is returned to the seating position. As this occurs, it is considered that a relatively large magnitude of force is applied to the striker.

Then, according to the second aspect of the invention, the striker is mounted on the rear member which reinforce the floor, whereby even if the relatively large magnitude of force is applied to the striker, the mounting accuracy of the striker can preferably be maintained.

According to a third and a fourth aspects of the invention as set forth in the first and second aspects of the present invention, there is provided the electric vehicle seat stowing structure further having a reinforcement cross member disposed on the floor in the vicinity of the striker, wherein an end portion of the cross member is connected to a gusset reinforcing the wheel house additionally.

Consequently, since the rigidity of a portion in the vicinity of the striker can be increased, even if a relatively large magnitude of force is applied to the striker, the mounting accuracy of the striker can be maintained more preferably.

According to a fifth aspect of the present invention as set forth in the first aspect of the present invention, the electric vehicle seat stowing structure is adopted to a vehicle of which riding capacity ranges from 6 to 7 occupants.

According to a sixth aspect of the present invention as set forth in the first aspect of the present invention, the electric vehicle seat stowing structure is adopted to a vehicle of which riding capacity ranges from 4 to 5 occupants.

According to a seventh aspect of the present invention, there is provided an assembling method of an electric vehicle seat stowing structure, having steps of mounting a cross member on a floor of a vehicle, mounting a first support shaft on the floor, and disposing a first mounting plate provided on the first support shaft so as to be inclined at the predetermined angle, mounting a second support shaft on the floor via a swing drive mechanism, and disposing a second mounting plate provided on the second support shaft so as to be inclined at the predetermined angle, mounting first and second strikers, respectively, at positions being spaced apart at the predetermined distance relative to the first and second support shafts, inclining the seat cushion according to an inclination angles of the respective first and second mounting plates, engaging first and second locking brackets of the seat cushion with the first and second mounting plate, respectively, swinging the seat cushion to a floor recessed stowing portion, and mounting the left and right mounting plates on a bottom portion of the seat cushion, wherein the swing drive mechanism includes a group of reduction gears disposed in a gear case or in a bracket and an actuator for driving the group of reduction gears placed vertically on a side of the gear case or the bracket.

According to an eighth aspect of the present invention as set forth in the seventh aspect of the present invention, the first support shaft and the first mounting plate are a right support shaft and a right mounting plate, respectively, and the second support shaft and the second mounting plate are a left support shaft and a left mounting plate, respectively.

According to a ninth aspect of the present invention as set forth in the seventh aspect of the present invention, the first support shaft and the first mounting plate are a left support shaft and a left mounting plate, respectively, and the second support shaft and the second mounting plate are a right support shaft and a right mounting plate, respectively.

According to a tenth aspect of the present invention as set forth in the first aspect of the present invention, further comprising a lock mechanism including a base mounted on a cushion frame, a plate mounted on the base via a rotational shaft portion, a first and second gears provided at an upper end portion of the base, a lower lever mounted on the plate via a pin so as to freely swing thereon, a lock gear formed on the lower lever, the lock gear meshing with the first and second gears, a intermediate lever mounted on the plate via an intermediate pin so as to freely swing thereon, the intermediate lever pressing a distal end of the lower swing lever, an upper lever mounted on the plate via an upper pin so as to freely swing thereon, and an a tension spring extended between the lower swing lever and the upper swing lever.

According to an eleventh aspect of the present invention as set forth in the tenth aspect of the present invention, further comprising an automatic lock release mechanism including a mounting bracket mounted on the cushion frame, a driving motor provided on the mounting bracket, a fluctuating shaft protruded from the driving motor, a magnet mounted on the fluctuating shaft, and an upper and lower sensor mounted, respectively, on locations which corresponds to upper and lower ends of the fluctuating shaft.

According to a twelfth aspect of the present invention as set forth in the eleventh aspect of the present invention, further comprising a manual lock release mechanism including a lever of which an lower end is mounted thereon via a pin in such a manner that the lever freely swings on the pin, an arm provided in such a manner as to extend to the lower end portion of the manual lever, an inner cable of which a proximal end portion is connected to the distal end portion of the arm, and a coil spring mounted on the pin.

According to a thirteenth aspect of the present invention as set forth in the twelfth aspect of the present invention, the cable branches to a first and second cable at a connecting portion, the first and second cable is connected to the automatic lock release mechanism and manual lock release mechanism, respectively.

BRIEF DESCRIPTION OF THE DRAWINGS

FIG. 22A is a fifth assembling process drawing explaining ST06 of the assembling procedure of the electric vehicle seat stowing structure according to the invention;

FIG. 22B is a fifth assembling process drawing explaining ST07 of the assembling procedure of the electric vehicle seat stowing structure according to the invention;

FIG. 22C is a fifth assembling process drawing explaining additional ST07 of the assembling procedure of the electric vehicle seat stowing structure according to the invention;

FIG. 23 is a flowchart explaining a stowing operation of the electric vehicle seat stowing structure according to the invention;

DETAILED DESCRIPTION OF THE PREFERRED EMBODIMENT

Figure 1:
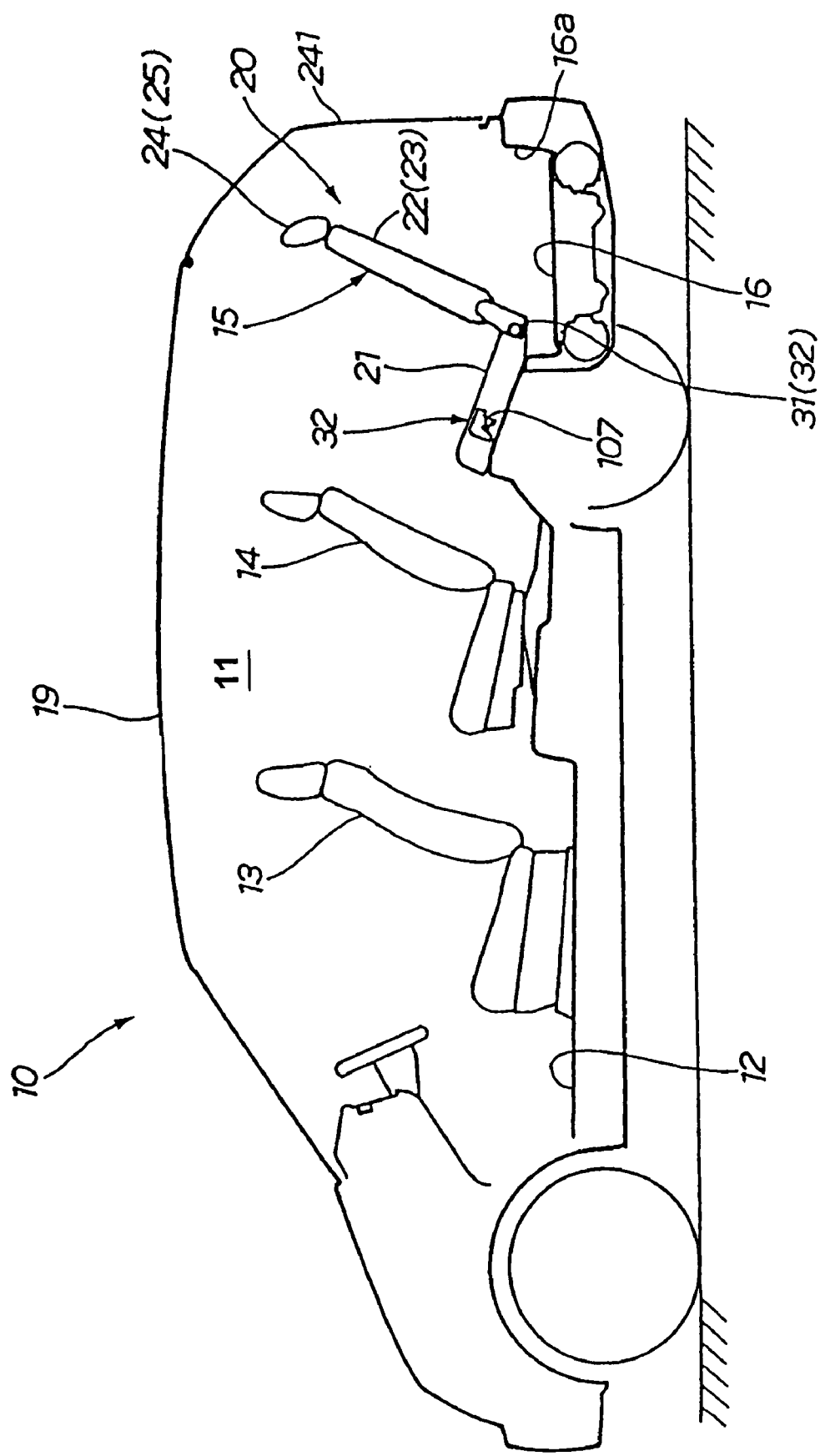
FIG. 1 is a schematic view showing a vehicle provided with an electric vehicle seat stowing structure according to the invention.

An embodiment of the invention will be described below based on the accompanying drawings. Note that the drawings are to be viewed in a direction in which reference numerals are viewed properly.

FIG. 1 is a schematic view showing a vehicle provided with an electric vehicle seat stowing structure according to the invention.

A vehicle 10 is provided on a floor 12 constituting a passenger compartment 11 thereof with a front seat 13 including a driver seat and a passenger seat, a first rear seat 14 disposed behind the front seat 13 and an electric vehicle seat stowing structure 20 disposed behind the first rear seat 14 for stowing a second rear seat (a vehicle seat) 15 in a floor recessed stowing portion 16 by changing the posture thereof.

The second rear seat 15 is such that a seat back is constructed to be divided into two transversely independent seat backs.

Hereinafter, the electric vehicle seat stowing structure 20 will be described in detail.

Figure 2:
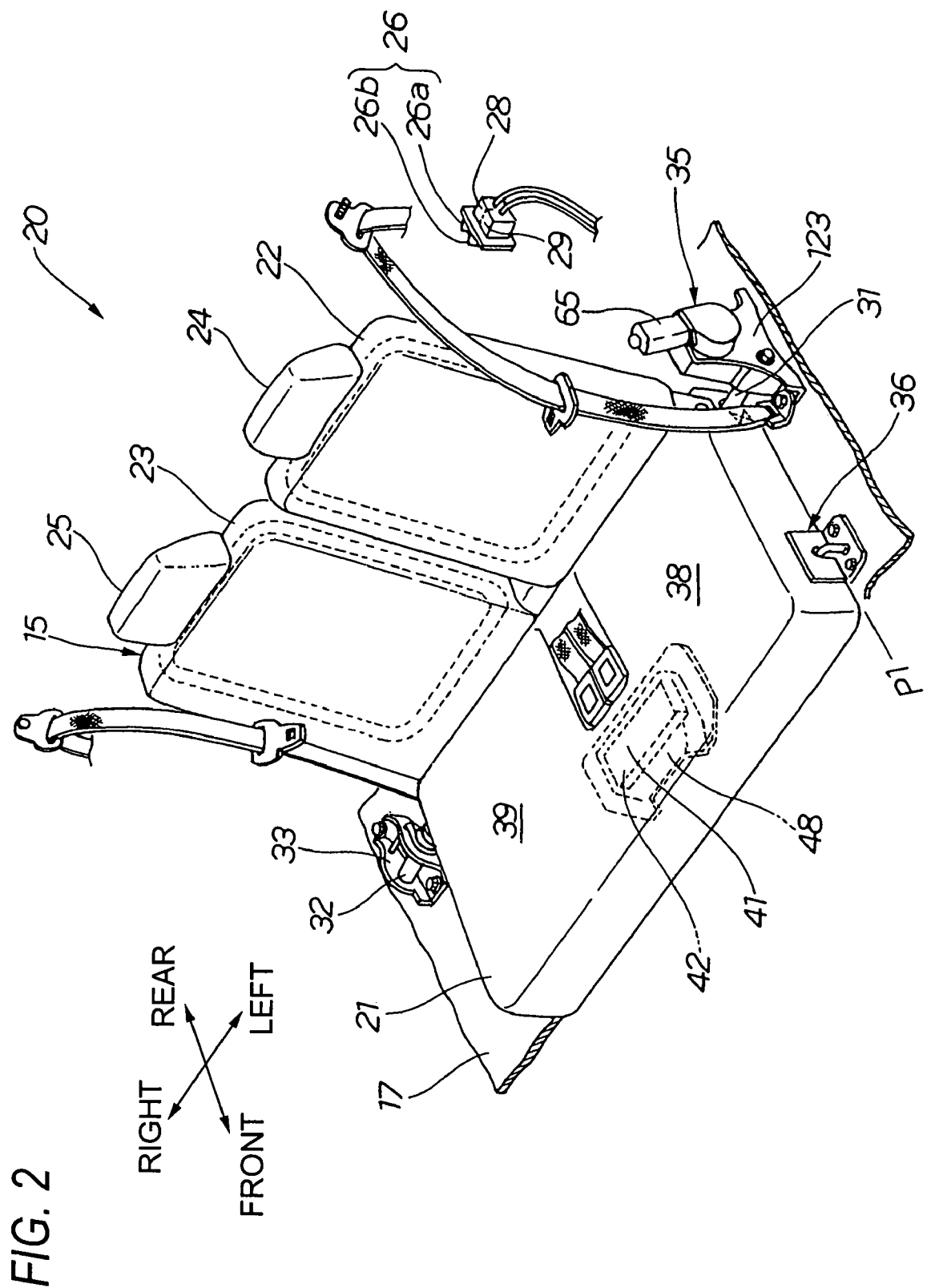
FIG. 2 is a perspective view showing the electric vehicle seat stowing structure according to the invention.

FIG. 2 is a perspective view showing the electric vehicle seat stowing structure according to the invention.

The electric vehicle seat stowing structure 20 is provided with the second rear seat 15. The second rear seat 15 is such that a seat cushion 21 is provided on the floor 12, left and right seat backs (seat backs) 22, 23 are provided at a rear portion of the seat cushion 21 in such a manner as to fall forward and rearward, a left head restraint 24 is provided at a top portion of the left seat back 22 in such a manner as to be tilted forward and rearward, and a right head restraint 25 is provided at a top portion of the right seat back 23 in such a manner as to be tilted forward and rearward.

Figure 7:
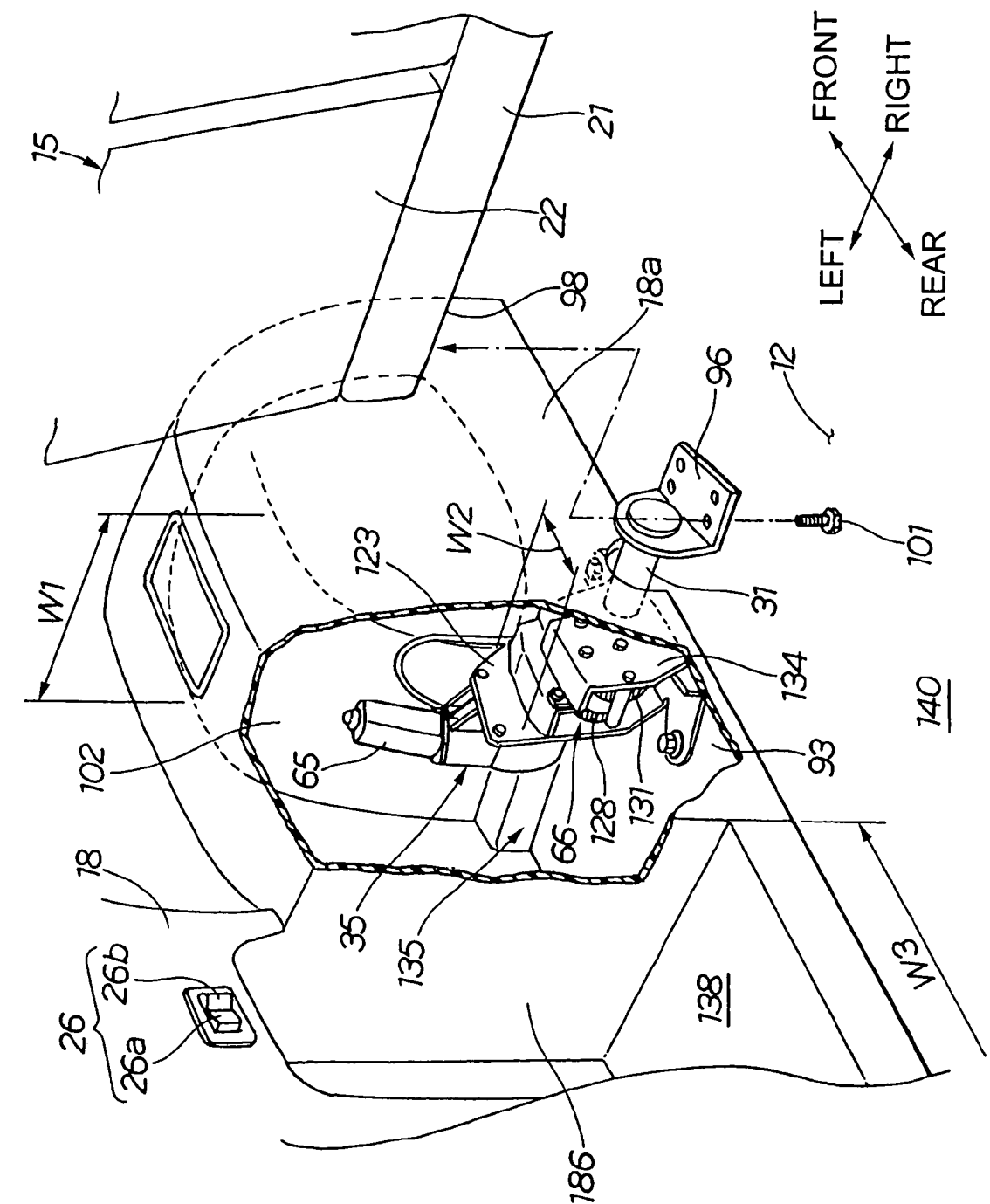
FIG. 7 is a perspective view showing a state where the swing drive mechanism of the electric vehicle seat stowing structure according to the invention is mounted on a floor.
Figure 8:
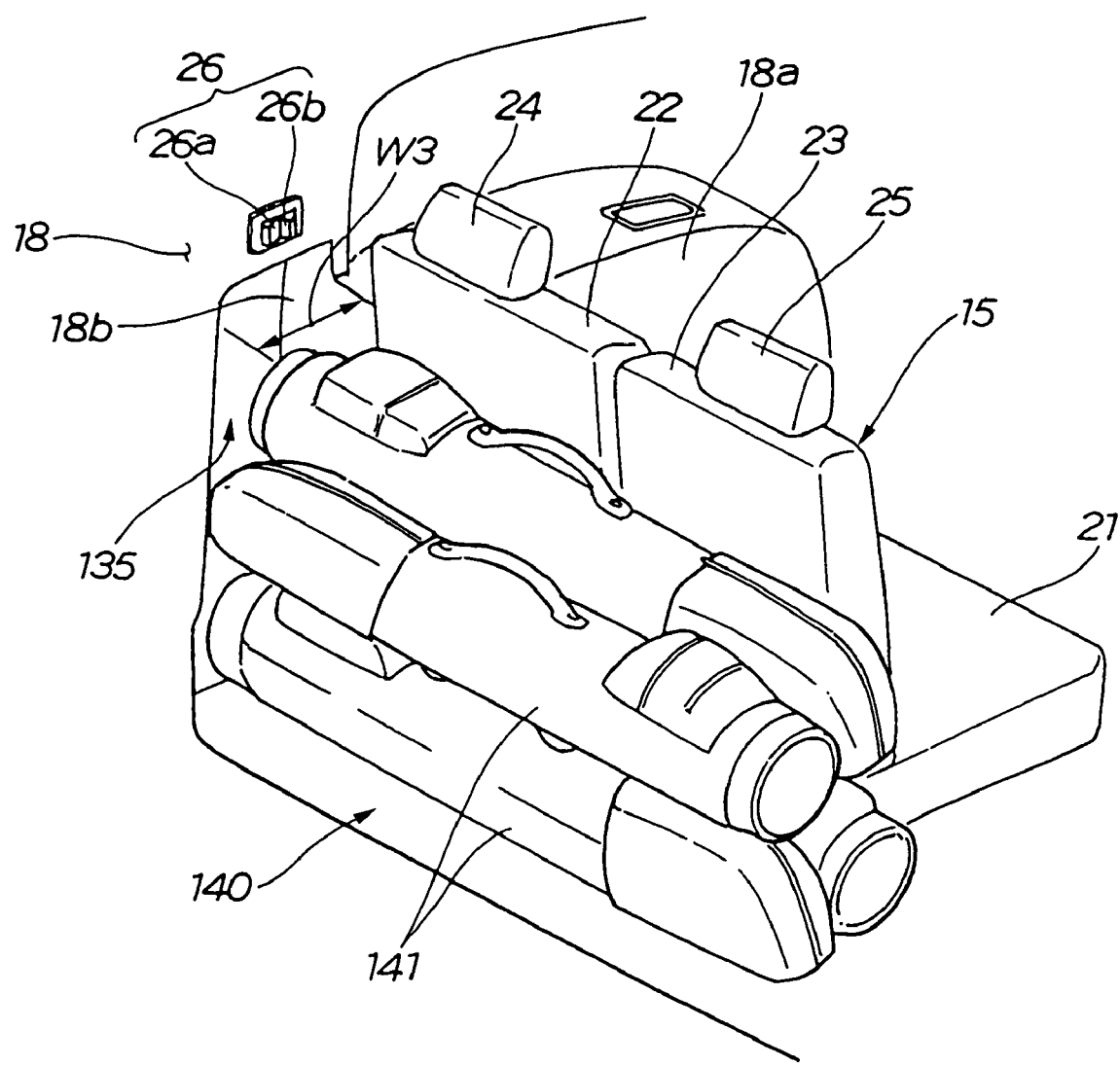
FIG. 8 is a perspective view showing a state where the swing drive mechanism of the electric vehicle seat stowing structure according to the invention is mounted on the floor.

A seat operating button 26 is provided at a location which is rearward of the second rear seat 15 and which is spaced apart from a side of the rear seat 15 (also refer to FIGS. 7, 8).

Figure 3:
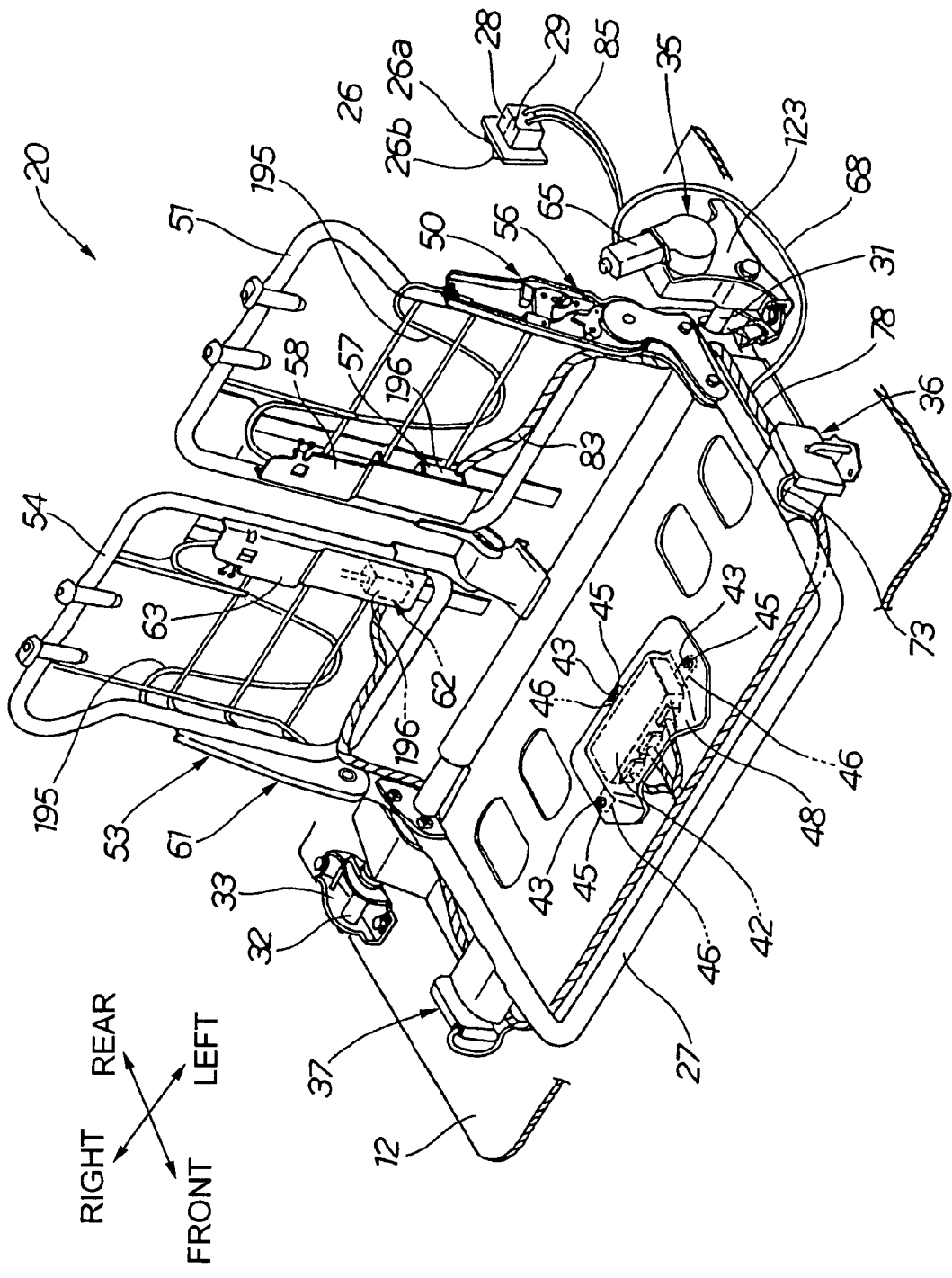
FIG. 3 is a perspective view showing in detail the electric vehicle seat stowing structure according to the invention.

FIG. 3 is a perspective view showing in detail the electric vehicle seat stowing structure according to the invention.

The electric vehicle seat stowing structure 21 is such that left and right support shafts (support shafts) 31, 32 are mounted at left and right rear end portions of a cushion frame 27 which constitutes the seat cushion 21 (refer to FIG. 2), respectively, the right support shaft 32 is rotationally mounted on the floor 12 via a mounting member 33, the left support shaft 31 is mounted on a swing drive mechanism 35, and the swing drive mechanism 35 is mounted on the floor 12.

In addition, the electric vehicle seat stowing structure 20 is such that left and right cushion locking mechanisms (cushion locking mechanisms) 36, 37 are provided at left and right front end portions of the cushion frame 27, respectively, and a control unit 42 is provided at a central location 41 (refer to FIG. 2) of the cushion frame 27 which deviates both from left and right seating locations 38, 39 thereof.

To be specific, three leg portions 46 . . . are caused to extend from the control unit 42, and the three leg portions 46 . . . are then attached to a substantially central portion of the cushion frame 27 with bolts 43 . . . and nuts 45 . . . ( . . . denote a plural number).

A dome-type frame 48 is provided above the control unit 42 as a cover member, so that the control unit 42 is covered with the dome-type frame 48, where by the control unit 42 is protected by the dome-type frame 48.

Note that the dome-type frame 48 is fastened also with the bolts 43 . . . and the nuts 45 . . .

This control unit 42 is such as to be formed into, as an example, a box-like body having a rectangular outer frame and to be, as shown in FIG. 2, installed in the seat cushion 21 at the central location 41.

Note that while, in the embodiment, the example where the control unit 42 is attached with the bolts 43 and the nuts 45 is explained, it is also possible to attach the control unit 42 using other means.

In addition, while, in the embodiment, the outer frame of the control unit 42 is described as a rectangular box-like body, the shape of the control unit 42 is not limited thereto, and it is also possible to adopt other shapes.

Since the control unit 42 is installed in the seat cushion 21 at the central location 41 (refer to FIG. 2) which deviates from the seating locations 38, 39 thereof, occupants can be seated on the locations (that is, the seating locations 38, 39) which are spaced apart from the control unit 42.

Consequently, when the occupants are seated on the second rear seat 15, there is no risk that the seated comfort of the occupants is disturbed by the control unit 42.

Furthermore, the electric vehicle seat stowing structure 20 is such that a left back frame 51 of the left seat back 22 (refer to FIG. 2) is mounted on a left-hand side of the rear end portion of the cushion frame 27 via a left reclining adjuster 50 in such a manner as to swing in longitudinal directions of the vehicle, and a right back frame 54 of the right seat back 23 (refer to FIG. 2) is mounted on a right-hand side of the rear end portion of the cushion frame 27 via a right reclining adjuster 53 in such a manner as to swing in the longitudinal directions of the vehicle.

In addition, the electric vehicle seat stowing structure 20 is such that a left lock releasing mechanism 57 for releasing a left lock mechanism (a lock mechanism) 56 of the left reclining adjuster 50 is provided on the left back frame 51 via a mounting bracket 58, a right lock releasing mechanism 62 for releasing a right lock mechanism (a lock mechanism) 61 of the right reclining adjuster 53 is provided on the right back frame 54 via a mounting bracket 63, and the seat operating button 26 is provided on a passenger compartment decorating garnish 18 (refer to FIGS. 7, 8) which is disposed rearward of the left seat back 22 (refer to FIG. 2).

Figure 6:
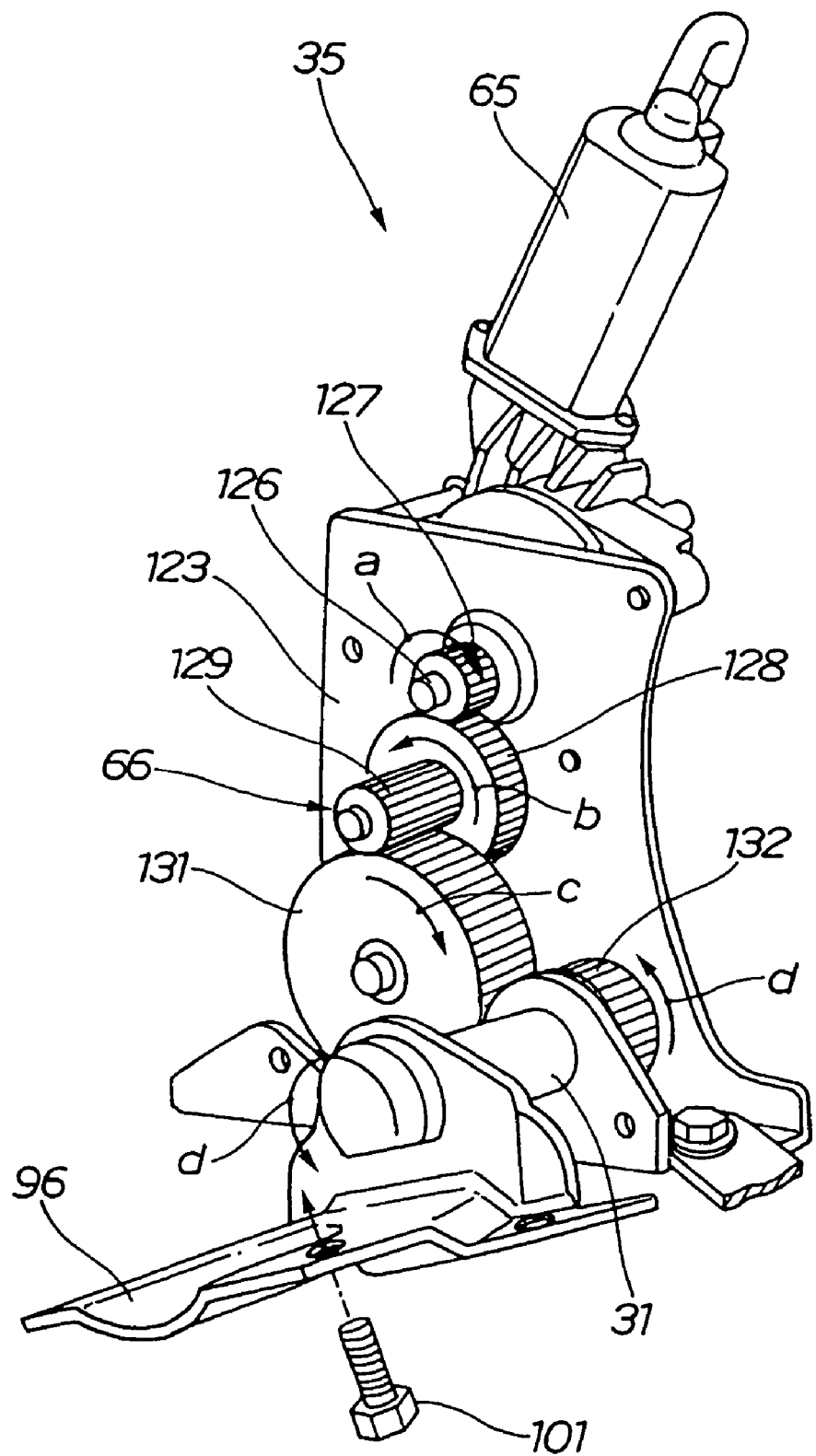
FIG. 6 is a perspective view showing a swing drive mechanism of the electric vehicle seat stowing structure according to the invention.

The swing drive mechanism 35 is designed to rotate the left support shaft 31 forwards by transmitting the rotation of a cushion driving motor (an actuator) 65 to the left support shaft 31 via a group of reduction gears 66 (refer to FIG. 6). This action will allow the cushion driving motor 65 to rotate, for example, backwards and thereby rotate the left support shaft 31 backwards by allowing the cushion driving motor 65 to rotate forwards.

The cushion driving motor 65 and the group of reduction gears 66 are mounted on the floor 12 via a bracket 123. The cushion driving motor 65 is connected to the control unit 42 via a first wiring harness 68.

Figure 12:
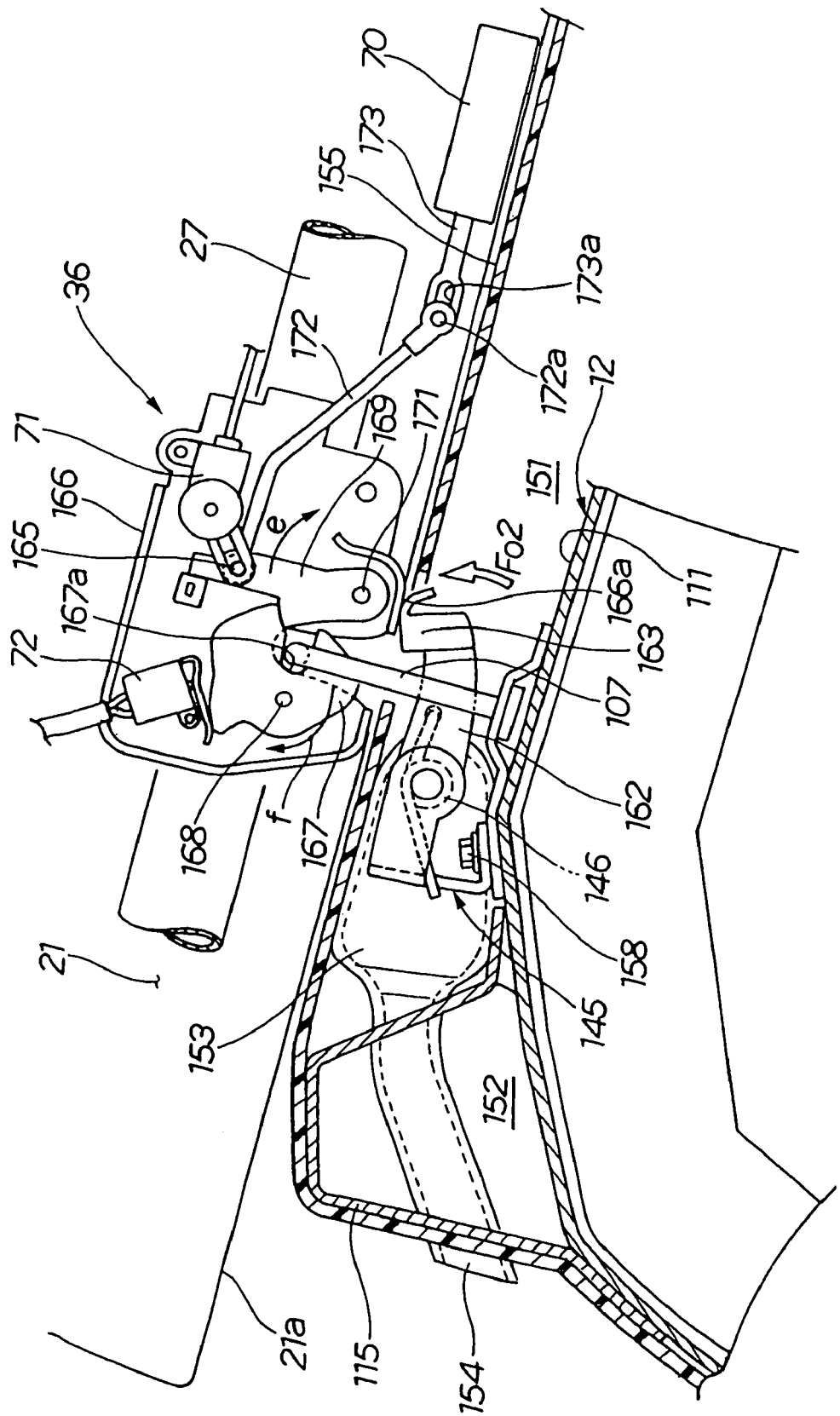
FIG. 12 is an explanatory drawing of a cushion lock mechanism and the seat cushion push-up mechanism of the electric vehicle seat stowing structure according to the invention.

The left cushion lock mechanism 36 includes a cushion lock actuator 70, a lock/release detection switch 71 and a latch switch 72, which are shown in FIG. 12.

The cushion lock actuator 70, the lock/release detection switch 71 and the latch switch 72 are connected to the control unit 42 via a second wiring harness 73.

Note that since the right cushion lock mechanism 37 has the same construction as that of the left cushion lock mechanism 36, like reference numerals to those imparted to constituent members of the left cushion lock mechanism 36 are imparted to constituent members of the right cushion lock mechanism 37, and the description of the constituent members of the right cushion lock mechanism 37 will be omitted.

Figure 13:
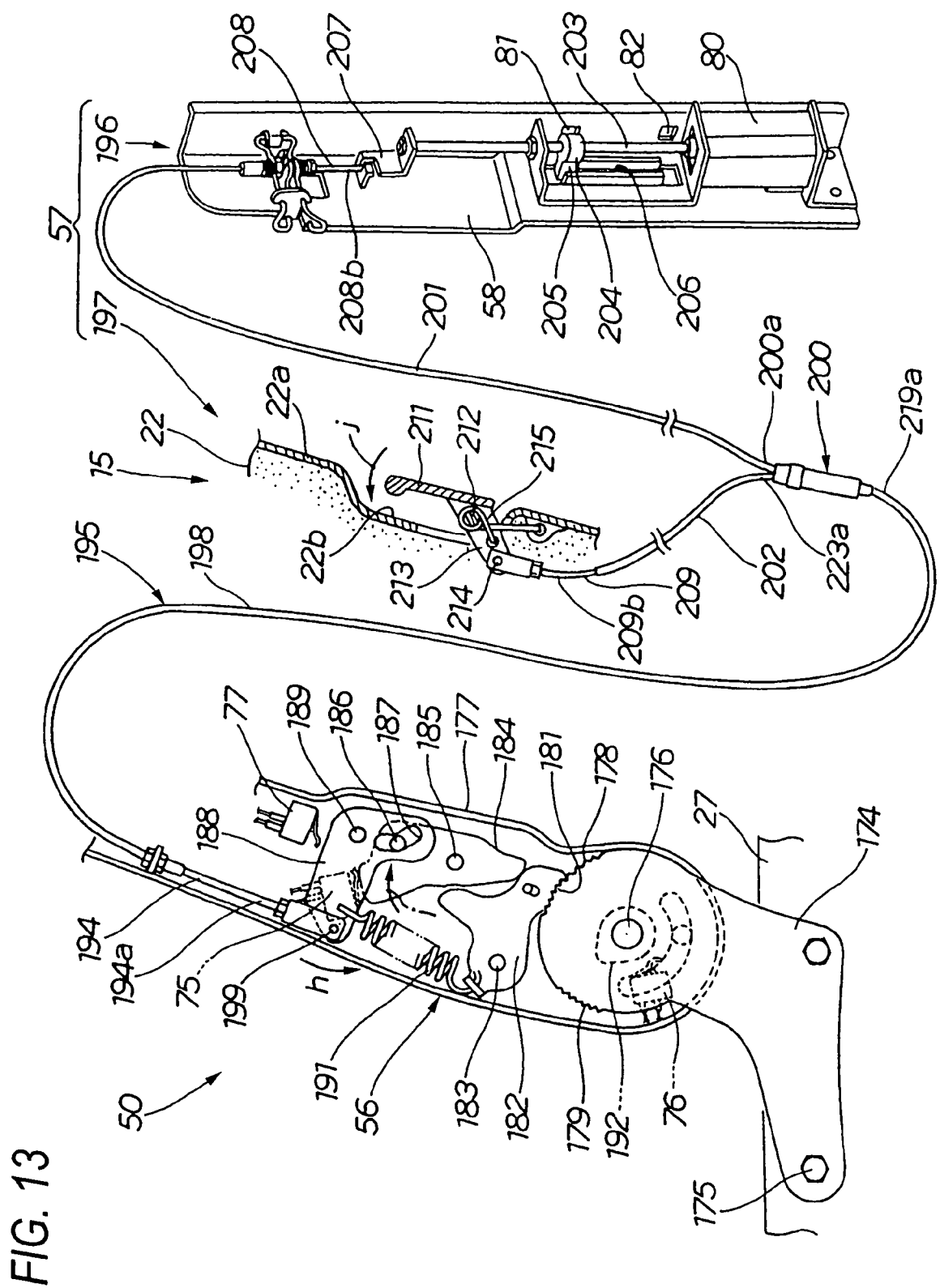
FIG. 13 is an explanatory drawing of a lock mechanism and a lock release mechanism of a reclining adjuster of the electric vehicle seat stowing structure according to the invention.

The left lock mechanism 56 of the left reclining adjuster 50 includes a lock-on detection switch 75, a fall-forward detection switch 76 and a lock-off detection switch 77, which are shown in FIG. 13.

The lock-on detection switch 75, the fall-forward detection switch 76 and the lock-off detection switch 77 are connected to the control unit 42 via a third wiring harness 78.

Note that since the right lock mechanism 61 has the same construction as that of the left lock mechanism 56, like reference numerals to those imparted to constituent members of the left lock mechanism 56 are imparted to constituent members of the right lock mechanism 61, and the description of the constituent members of the right cushion lock mechanism 61 will be omitted.

The left lock release mechanism 57 includes a driving motor (an actuator) 80 and upper and lower Hall sensors 81, 82, which are shown in FIG. 13.

Note that since the lock release mechanism 62 has the same construction as that of the left lock release mechanism 57, like reference numerals to those imparted to constituent members of the left lock release mechanism 57 are imparted to constituent members of the right lock release mechanism 62, and the description of the constituent members of the right lock release mechanism 62 will be omitted.

The driving motor 80 and the upper and lower Hall sensors 81, 82 are connected to the control unit 42 via a fourth wiring harness 83.

A stowing switch 28 and a restoring switch 29 which are operated via the seat operating button 26 are connected to the control unit 42 via a fifth wiring harness 85. The fifth wiring harness 85 is such as to extend to the control unit 42 after being made as an integral part of the first wiring harness 68 from and onward an intermediate portion along the length thereof.

The seat operating button 26 includes a stowing operation part 26*a* and a restoration operating part 26*b*. The stowing switch 28 can be switched on by depressing the stowing operation part 26*a*, and the restoring switch 29 can be switched on by depressing the restoration operating part 26*b*.

Figure 4:
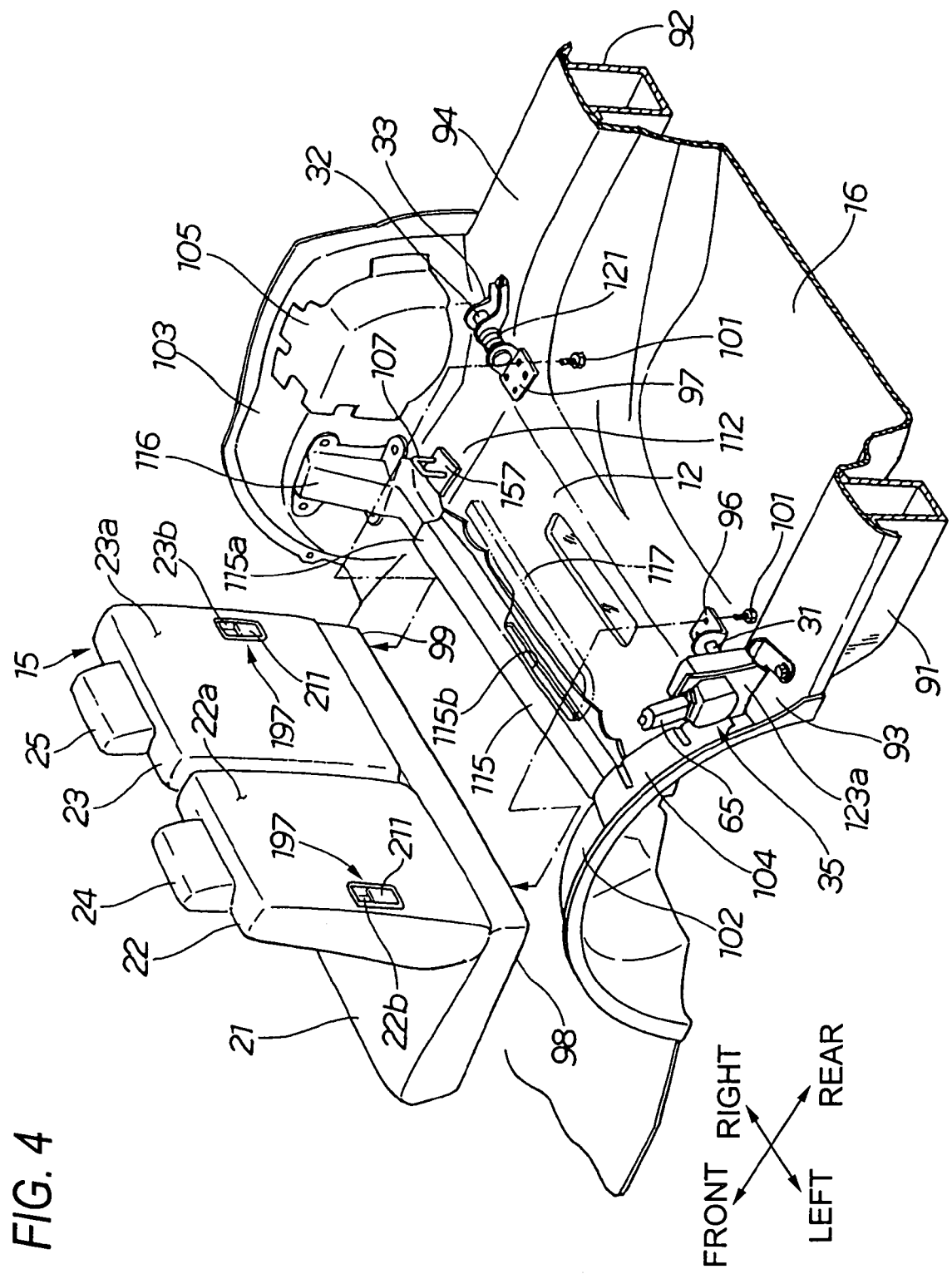
FIG. 4 is a perspective view showing a state where a vehicle seat of the electric vehicle seat stowing structure according to the invention is disassembled from a vehicle body.

FIG. 4 is a perspective view showing a state in which the vehicle seat of the electric vehicle seat stowing structure is disassembled from the vehicle body.

Left and right rear members (a rear member) 91, 92 are disposed at a predetermined interval in a transverse direction of the vehicle, the floor 12 is provided between the rear members 91, 92 so disposed, the swing drive mechanism 35 is mounted at a location 93 on the floor 12 which is on the left rear member 91, the left support shaft 31 is made to extend inwardly from the swing drive mechanism 35 towards the center of the vehicle body, the mounting member 33 is mounted at a location 94 on the floor 12 which is on the right rear member 92, the right support shaft 32 is made to extend inwardly from the mounting member 33 towards the center of the vehicle body, and the left and right support shafts 31, 32 are disposed on the same axis.

Left and right mounting plates 96, 97 are mounted at end portions of the left and right support shafts 31, 32, respectively, and the left and right plates 96, 97 are then mounted on bottom portions (bottom portions) 98, 99 which are located on left- and right-hand sides of the seat cushion, respectively, with mounting bolts 101 . . .

By this construction, the seat cushion 21 can be swung back and forth around the left and right support shafts 31, 32.

Since the seat cushion 21 is swung back and forth around the left and right support shafts 31, 32, a relatively large magnitude of force is applied to the left and right support shafts 31, 32. Due to this, it is preferable that the left and right support shafts 31, 32 or the swing drive mechanism 35 and the mounting member 33 are mounted on locations which have high rigidity.

Then, a left reinforcement plate 104 is provided on a left rear wheel house (a wheel house) 102 at a location in the vicinity of the swing drive mechanism 35, and a right reinforcement plate 105 is provided on a right rear wheel house (a wheel house) 103 at a location in the vicinity of the mounting member 33, whereby the rigidity of the rear wheel houses 102, 103 at the locations in the vicinity of the left and right support shafts 31, 32 is increased.

In addition, the left and right rear members 91, 92 are highly rigid members.

Thus, the mounting accuracy of the left and right support shafts 31, 32 can preferably be maintained by increasing the rigidity of the rear wheel houses 102, 103 at the locations in the vicinity of the swing drive mechanism 35 and the mounting member 33 and mounting the swing drive mechanism 35 and the mounting member 33 on the left and right rear members which are highly rigid.

Figure 33:
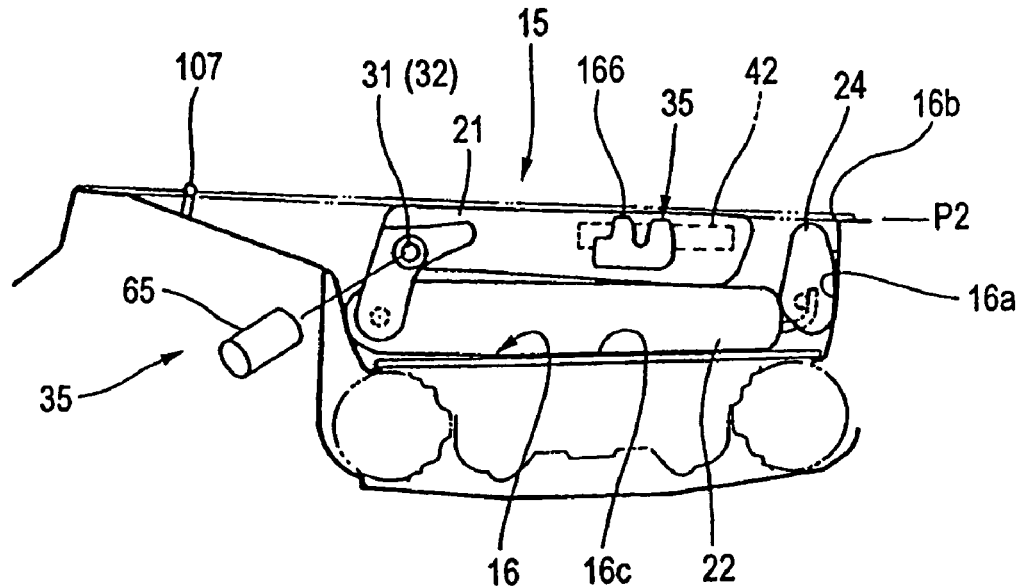
FIG. 33 is a tenth operation explanatory drawing explaining ST14 of the stowing operation of the electric vehicle seat stowing structure according to the invention.

By this construction, the seat cushion 21 can be swung smoothly between a seating position P1 (a position shown in FIG. 2) and a stowing position P2 (refer to FIG. 33).

Incidentally, in order to lock the seat cushion 21 to the seating position P1 when the seat cushion 21 is restored to the seating position P1, latches 167, 167 (refer to FIG. 12 for one facing the viewer, and the other disposed on the other side of the seat cushion is not shown) are provided on the seat cushion 21, and left and right strikers 107, 107 (refer to FIGS. 10, 12 for a left striker) are provided on the floor 12, whereby the latches 167, 167 need to be locked to the left and right strikers 107, 107, respectively, when the seat cushion 21 is restored to the seating position P1.

However, it is considered that the latches 167, 167 are brought into abutment with the left and right strikers 107, 107, respectively, with a relatively stronger force when the seat cushion 21 is restored to the seating position P1 electrically than when the seat cushion 21 is restored to the same position with the hands.

Figure 10:
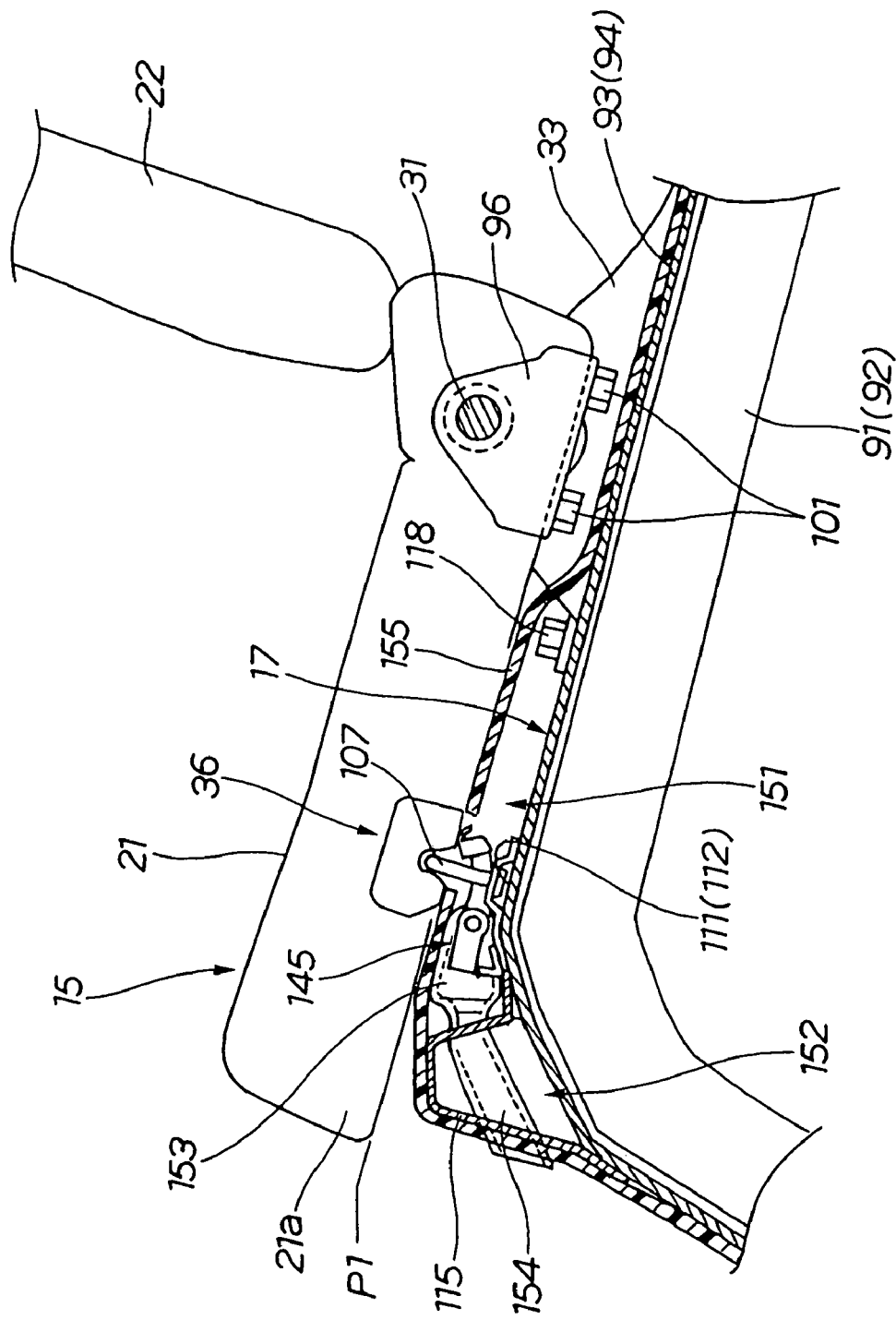
FIG. 10 is a cross-sectional view of the vehicle provided with the electric vehicle seat stowing structure according to the invention.

Then, the right striker 107 is mounted on the floor 12 at a location 112 which is on the rear member 92 and is forward of the mounting member 33, and the left striker 107 is mounted on the floor 12 at a location 111 which is on the left rear member 91 (refer to FIGS. 10, 12) and is forward of the swing drive mechanism 35 (refer to FIGS. 10, 12).

Furthermore, a cross member 115 is provided in the vicinity of the left and right strikers 107, 107. This cross member 115 is disposed on the floor 12 and is connected at left and right end portions (an end portion) 115*a*, 115*a* (refer to FIG. 18 for a left end portion 115*a*) thereof to left and right gussets (a gusset) 116, 116 (refer to FIG. 18 for a left gusset 116) which additionally function to reinforce the left and right rear wheel houses 102, 103, respectively.

Forces applied to the left and right gussets 116, 116 are preferably dispersed by forming the left and right gussets 116, 116 relatively larger. Furthermore, the left and right rear wheels houses can be reinforced by attaching the relatively larger left and right gussets 116, 116 to the left and right rear wheel houses 102, 103.

Consequently, the rigidity of the left and right rear wheel houses 102, 103 can be increased.

Since the left and right rear members 91, 92 are the highly rigid members and, furthermore, the cross member 115 is provided in the vicinity of the left and right strikers 107, 107 as a reinforcement member, the rigidity of the peripheries of the left and right strikers 107, 107 can be increased.

Furthermore, the rigidity of the left and right rear wheel houses 102, 103 at the locations in the vicinity of the left and right strikers 107, 107 can be increased by the left and right gussets 116, 116 by allowing the left and right ends 115*a*, 115*a* of the cross member 115 to be connected, respectively to the left and right gussets 116, 116 which also function to reinforce the left and right rear wheel houses 102, 103.

Consequently, even in the event that the latches 167, 167 (refer to FIG. 12) are brought into abutment with the left and right strikers 107, 107, respectively, with the relatively stronger force, the left and right strikers 107, 107 can be retained at the predetermined preferred positions.

An opening 115*b* is formed in the cross member 115 at a center thereof, and an air duct 117 (indicated by imaginary lines) of a rear-seat air conditioner (not shown) is mounted in the opening 115*b* so formed.

Note that the air duct 117 will be described later on.

Figure 5:
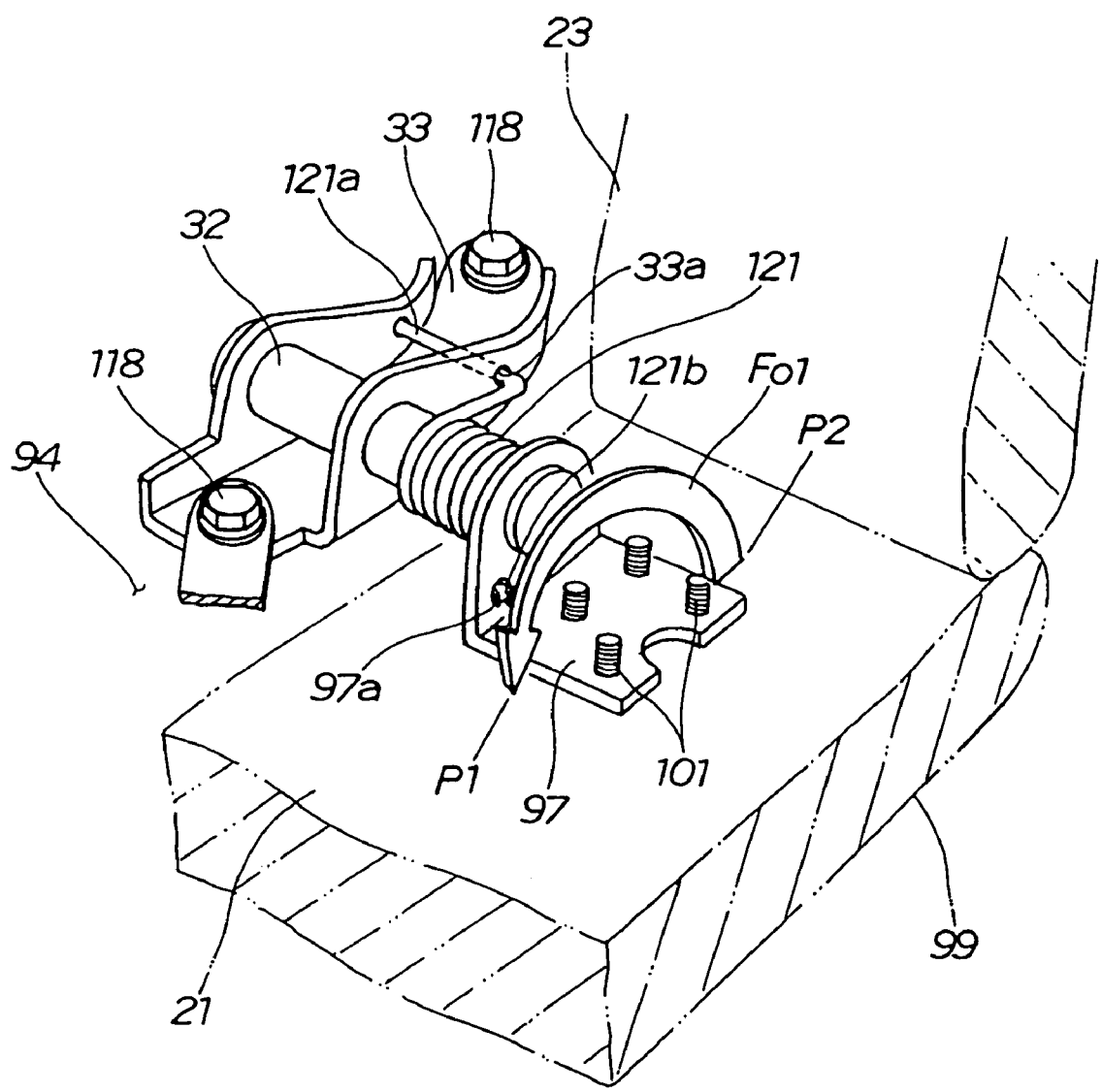
FIG. 5 is a perspective view showing a state where a spring is mounted on a right support shaft of the electric vehicle seat stowing structure according to the invention.

FIG. 5 is a perspective view showing a state in which a spring is mounted on the right support shaft of the electric vehicle seat stowing structure according to the invention.

The mounting member 33 is mounted at the location 94 of the floor 12 shown in FIG. 4 which is on the right rear member 92 with mounting bolts 118, 118, the right support shaft 32 is rotationally mounted on the mounting member 33, the right mounting plate 97 is fixed to a distal end portion of the right support shaft 32, a coil-like spring 121 is mounted on the right support shaft 32 which protrudes from the mounting member 33, one end portion 121*a* of the spring 121 is inserted through insertion holes 33*a*, 33*a* in the mounting member 33, and the other end portion 121*b* of the spring 121 is inserted through an insertion hole 97*a* in the right mounting plate 97.

Note that the right mounting plate 97 is mounted on the right bottom portion 99 (also refer to FIG. 4) of the seat cushion 21 with the mounting bolts 101 . . . the seat cushion 21 can be swung around the right support shaft 32 between the seating position P1 (refer to FIG. 24A) where occupants can be seated and the stowing position P2 (refer to FIG. 33).

Thus, by attaching the spring 121 to the right support shaft 32, a repulsive force of the spring 121 increases gradually as the seat cushion 21 is moved from the seating position P1 to the stowing position P2 as indicated by an arrow Fo1.

Namely, the repulsive force of the spring 121 becomes minimum as indicated by the arrow Fo1 in a state (a position shown in FIG. 5) where the seat cushion 121 is disposed at the seating position P1.

On the other hand, when the seat cushion 21 is swung to the rear stowing position P2, the repulsive force of the spring 121 becomes maximum as indicated by the arrow Fo1.

The reason why the spring 121 is attached to the right support shaft 33 will be explained in detail by reference to FIGS. 31B to 32.

Note that the adjustment of the repulsive force of the spring 121 is not limited to what has been described above. For example, by providing a spring which exerts a repulsive force in an opposite direction to the direction of the repulsive force of the spring 121 in addition to the spring 121, the repulsive force may be adjusted such that the repulsive force becomes substantially zero in a state where the seat cushion 21 is swung backwards from the seating position P1 to an intermediate position and the repulsive force becomes maximum as indicated by the arrow Fo1 when the seat cushion 21 is swung from the intermediate position to the stowing position P2.

FIG. 6 is a perspective view showing the swing drive mechanism of the electric vehicle seat stowing structure according to the invention.

In the swing drive mechanism 35, the group of reduction gears 66 is disposed on the bracket 123, and the cushion driving motor 65 (the actuator) for driving the group of reduction gears 66 is disposed vertically on an outer side (a side) of the bracket 123 at a position above the group of reduction gears 66.

This swing drive mechanism 35 is designed to transmit the rotation of the cushion driving motor 65 to the left support shaft 31 via the group of reduction gears 66.

In the group of reduction gears 66, a pinion gear 127 is mounted on a drive shaft 126 of the cushion driving motor 65, a first intermediate gear 128 is brought into mesh engagement with the pinion gear 127, a second intermediate gear 129 is provided coaxially with the first intermediate gear 128, a third intermediate gear 131 is brought into mesh engagement with the second intermediate gear 129, a fourth intermediate gear 132 is brought into mesh engagement with the third intermediate gear 131, and the fourth intermediate gear 132 is attached to the left support shaft 31.

The left mounting plate 96 is mounted on the end portion of the left support shaft 31, and the left mounting plate 96 is mounted on the left-hand side bottom portion 98 (refer to FIG. 4) of the seat cushion 21.

By this construction, the seat cushion 21 (refer to FIGS. 2, 4) can be swung around the left support shaft 31 between the seating position P1 (refer to FIG. 24A) and the stowing position P2 (refer to FIG. 33).

According to the swing drive mechanism 35, the pinion gear 127 is rotated in a direction indicated by an arrow a by allowing the cushion driving motor 65 to rotate backwards, and the first intermediate gear is rotated in a direction indicated by an arrow b by virtue of the rotation of the pinion gear 127.

The second intermediate gear 129 is also rotated in the direction indicated by the arrow b by virtue of the rotation of the first intermediate gear 128, and the third intermediate gear 131 is rotated in a direction indicated by an arrow c by virtue of the rotation of the second intermediate gear 129. The fourth intermediate gear 132 is rotated in a direction indicated by an arrow d by virtue of the rotation of the third intermediate gear 131, whereby the left support shaft 31 is rotated together with the fourth intermediate gear 132 in the direction indicated by the arrow d.

By this construction, the seat cushion 21 (refer to FIGS. 2, 4) is swung around the left support shaft 31 to the rear.

On the other hand, the seat cushion 21 (refer to FIGS. 2, 4) is swung around the left support shaft 131 to the front by allowing the cushion driving motor 65 to rotate forwards.

The pinion gear 127, the first intermediate gear 128, the second intermediate gear 129, the third intermediate gear 131 and the fourth intermediate gear 132 are covered with a cover 134 (refer to FIG. 7).

Note that while, in this embodiment, the example is described where the cover 134 is assembled to the bracket 123 so as to cover the pinion gear 127, the first intermediate gear 128, the second intermediate gear 129, the third intermediate gear 131 and the fourth intermediate gear 132 therewith, the cover 134 may be made to be an integral part of the bracket 123 so as to constitute a gear case.

FIG. 7 is a perspective view showing a state where the swing drive mechanism of the electric vehicle seat stowing structure according to the invention is mounted on the floor.

The swing drive mechanism 35 is mounted on the floor 12 at the location 93 which is rearward of the left rear wheel house 102 and is on the left rear member 91 (refer to FIG. 4), the left support shaft 31 is made to extend inwardly from the swing drive mechanism 35 towards the center of the vehicle body, the mounting plate 96 is mounted on the distal end portion of the left support shaft 31, and the left mounting plate 96 is mounted on the left-hand side bottom portion 98 of the seat cushion 21 with the mounting bolts 101 . . . (every . . . means that there are plurality of ones).

Here, since the width W1 of the left rear wheel house 102 is relatively wide, a relatively larger space 135 can be secured rearward of the left rear wheel house 102.

Then, as shown in FIG. 6, the cushion driving motor 65 of the swing drive mechanism 35 is disposed at the location which is on the outer side (the side) 123a (refer to FIG. 4) of the bracket 123 which faces outwardly of the vehicle body and which is above the group of reduction gears 66 in such a manner as to be oriented upwardly, so that the cushion driving motor 65 is accommodated in the relatively larger space 135.

Thus, by disposing the cushion driving motor 65 outwardly of the group of reduction gears 66, the cushion driving motor 65 can be disposed by making use of the relatively larger space 135.

Furthermore, by mounting the cushion driving motor 65 of the swing drive mechanism 35 at the location which is on the outer side 123a of the bracket 123 and which is above the group of reduction gears 66, a longitudinal width W2 of the swing drive mechanism 35 can be limited.

In addition, by disposing the cushion driving motor 65 vertically or upwardly, the driving motor 65 can be mounted in such a manner as not to protrude rearward.

Consequently, when the left rear wheel house 102 and the swing drive mechanism 35 are covered with a cover portion 18a of the garnish 18, a rear wall surface 18b of the cover portion 18a can be disposed so as to become close to the left rear wheel house side.

Thus, the width W3 of an accommodation space 138 provided rearward of the swing drive mechanism 35 can be largely secured.

The accommodation space 138 is a space which constitutes a left-hand side portion of a cargo space 140 provided behind the second rear seat 15. Consequently, by increasing the width W3 of the accommodation space 138, the cargo space 140 can be largely secured.

FIG. 8 is a perspective view showing a state in which the swing drive mechanism of the electric vehicle seat stowing structure according to the invention is mounted on the floor.

Long cargo such as golf bags 141 . . . Cane disposed transversely in the cargo space 140 by securing largely the longitudinal width W3 of the accommodation space 135 provided behind the swing drive mechanism 35 (refer to FIG. 7).

Loading and unloading cargo is facilitated by enabling the transverse placement of long cargo such as the golf bags 141 . . . in the cargo space, thereby making it possible to improve the convenience in handling.

In addition, by securing the large cargo space 140, the cargo space 140 can be used effectively to satisfy various applications, thereby making it possible to improve further the convenience in handling.

Figure 9A:
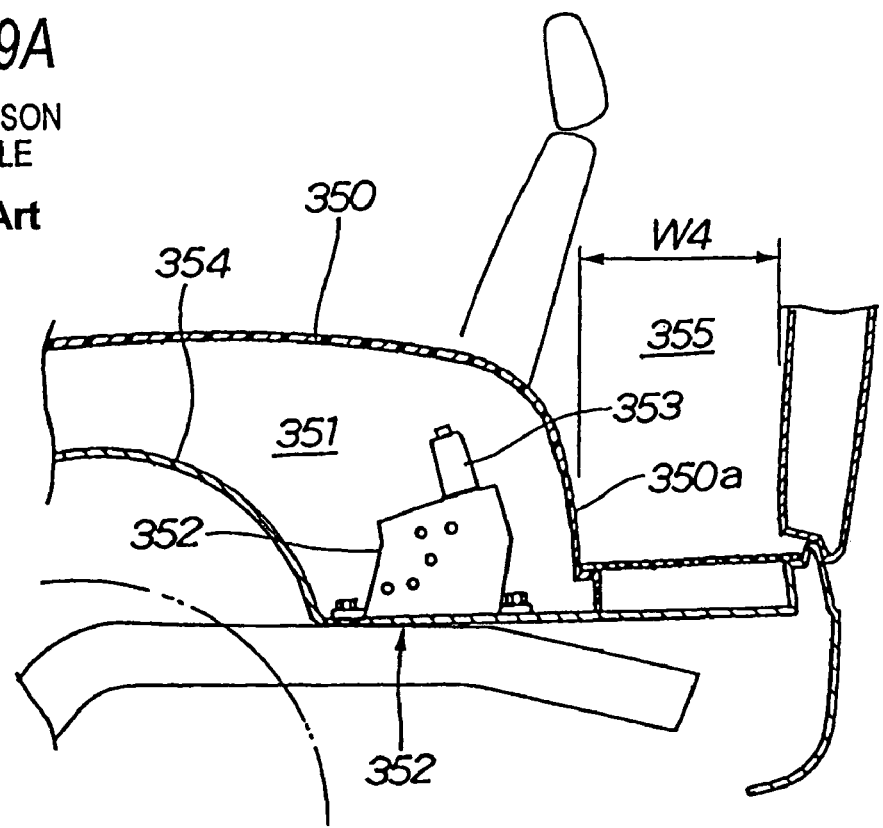
FIG. 9A is an explanatory drawing of a comparison example of the swing drive mechanism of the electric vehicle seat stowing structure according to the invention.
Figure 9B:
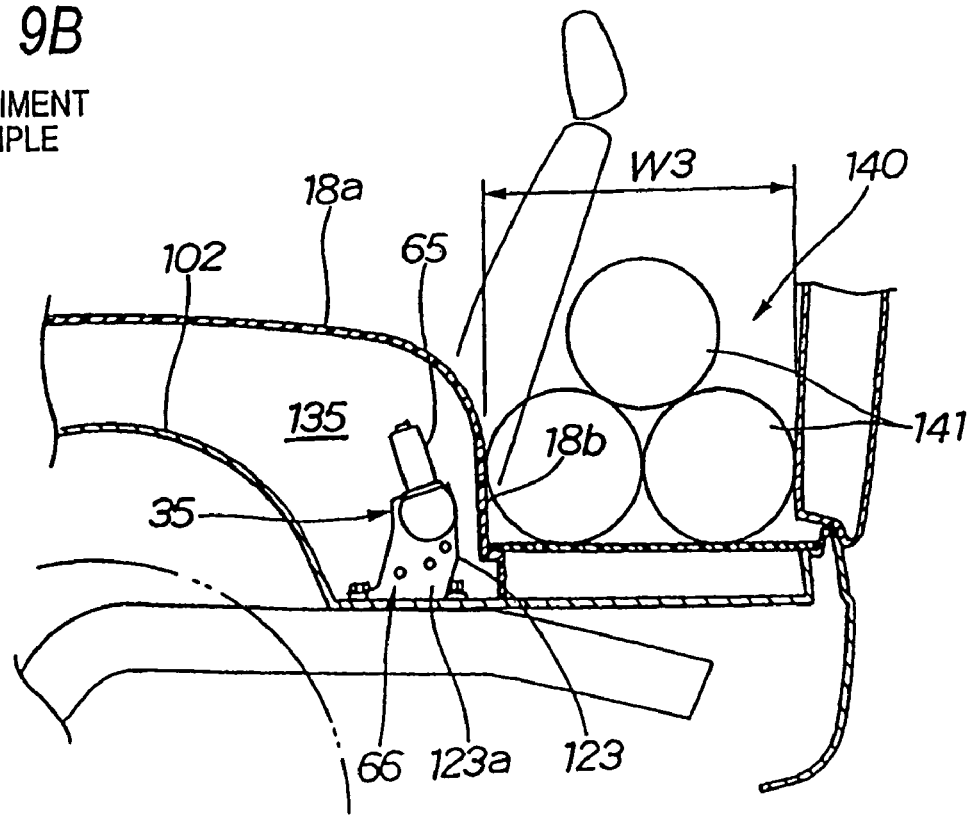
FIG. 9B is an explanatory drawing of an embodiment example of the swing drive mechanism of the electric vehicle seat stowing structure according to the invention.

FIG. 9 shows explanatory diagrams of the swing drive mechanism of the electric vehicle seat stowing structure according to the invention, in which FIG. 9A shows a comparison example, and FIG. 9B shows the embodiment of the invention.

In FIG. 9A, in order to expand the space within the passenger compartment, for example, it is considered that of a space 351 formed between a cover portion 350 of a passenger compartment decorating garnish and a rear side panel (not shown), a transverse space is narrowed.

In order to mount a swing drive mechanism 352 in the narrow space, in the swing drive mechanism 352, a driving motor 353 is normally disposed rearward of a group of reduction gears 352.

When the drive motor 353 is disposed rearward of the group of reduction gears 352, a rear wall surface 350a of the cover portion 350 needs to be spaced apart largely from a left rear wheel house 354.

Consequently, the longitudinal width W4 of a cargo space 355 behind the rear wall surface 350a of the cover portion 350 is reduced.

Due to this, it becomes difficult to load transversely long cargo such as a golf bag in the cargo space 355, and therefore, from the perspective of convenience in handling, an improvement has been demanded.

In FIG. 9B, keeping in mind the fact that the relatively larger space 135 can be secured behind the left rear wheel house 102, the cushion driving motor 65 of the swing drive mechanism 35 is disposed vertically or upwardly at the location which is on the outer side 123*a* of the bracket 123 and which is above the group of reduction gears 66 (refer to FIGS. 6, 7).

By this construction, the cushion diving motor 65 can be mounted in such a manner as not to protrude rearward, and the rear wall surface 18*b* of the cover portion 18*a* is allowed to approach the left rear wheel house 102 side.

Thus, the longitudinal width W3 of the cargo space 140 resulting behind the rear wall surface 18*b* of the cover portion 18*a* can be secured largely.

Due to this, since the long cargo such as the golf bags 141 . . . can be loaded in the cargo space 140 transversely, loading and unloading cargo is facilitated, thereby making it possible to attempt to improve the convenience in handling.

FIG. 10 is a cross-sectional view of a vehicle provided with the electric vehicle seat stowing structure according to the invention.

The swing drive mechanism 35 (refer to FIG. 4) and the mounting member 33 are mounted, respectively, on the locations 93, 94 on the floor 12 which are on the left and right rear members 91, 92 (refer to FIG. 4 with respect to the left rear member 92), respectively, and the left and right mounting plates 96, 97 (refer to FIG. 4 with respect to the right mounting plate 97) are mounted, respectively, on the left- and right-hand side bottom portions 98, 99 (refer to FIG. 4 with respect to the right-hand side bottom portion 98) of the seat cushion 21 with the mounting bolts 101 . . .

By this construction, the seat cushion 21 is mounted in such a manner as to be swung around the left and right support shafts 31, 32 (refer to FIG. 4 with respect to the left support shaft 32) at the rear portion thereof.

In addition, the left and right strikers 107, 107 (refer to FIG. 4 with respect to the right striker 107) are mounted, respectively, on the locations 111, 112 which are forward of the swing drive mechanism 35 (refer to FIG. 4) and the mounting member 33 and are on the left and right rear members 91, 92, respectively.

The left and right cushion lock mechanisms 36, 37 (refer to FIG. 3 with respect to the right cushion lock mechanism 37) are locked, respectively, to the left and right strikers 107, 107, whereby the seat cushion 21 can be locked to the seating position P1.

Left and right seat cushion push-up mechanisms 145, 145 (a right seat cushion push-up mechanism 145 is not shown) which function as seat cushion push-up mechanisms are provided in the vicinity of the left and right strikers 107, 107, or, to be specific, at the locations 111, 112 on the floor 12 which are on the left and right rear members 91, 92, respectively.

The left and right seat cushion push-up mechanisms 145, 145 are members designed to push up the seat cushion 21 which is disposed at the seating position P1 so that the seat cushion 21 is separated apart from the floor by virtue of the spring force of metallic springs functioning as lift-up springs 146.

Note that since the left and right seat cushion push-up mechanisms 145, 145 are the same members, hereinafter, only the left seat cushion push-up mechanism 145 will be described, and the description of the right seat cushion push-up mechanism 145 will be omitted.

In order to dispose the left seat cushion push-up mechanism 145 in an underneath-the-seat space 151 formed between the seat cushion 21 and the floor 12, the underneath-the-seat space 151 is set relatively largely.

Due to this, a space 152 between a front end portion 21*a* of the seat cushion 21 and the floor 12 can be secured relatively largely. Then, it is configured that the cross member 115 is mounted by making use of the relatively large space 152.

The cross member 115 is a reinforcement member disposed on the floor 12.

Furthermore, by making the underneath-the-seat space 151 relatively large, the air duct 153 of the rear seat air conditioner (not shown) is configured to be mounted by making use of the relatively large space 151.

An outlet 154 of the air duct 153 is made to extend towards the front of the vehicle body via the opening 115*b* (refer to FIG. 4) in the cross bar 115.

Thus, even if the underneath-the-seat space 151 is made relatively large by using the metallic spring functioning as the lift-up spring 146 of the left seat cushion push-up mechanism 145, the space 152 and the underneath-the-seat space 151 can effectively used by mounting the cross member 115 in the space 152 and mounting the air duct 153 in the underneath-the-seat space 151.

In the drawing, reference numeral 155 denotes a floor sheet which constitutes the surface of the floor of the passenger compartment.

Figure 11:
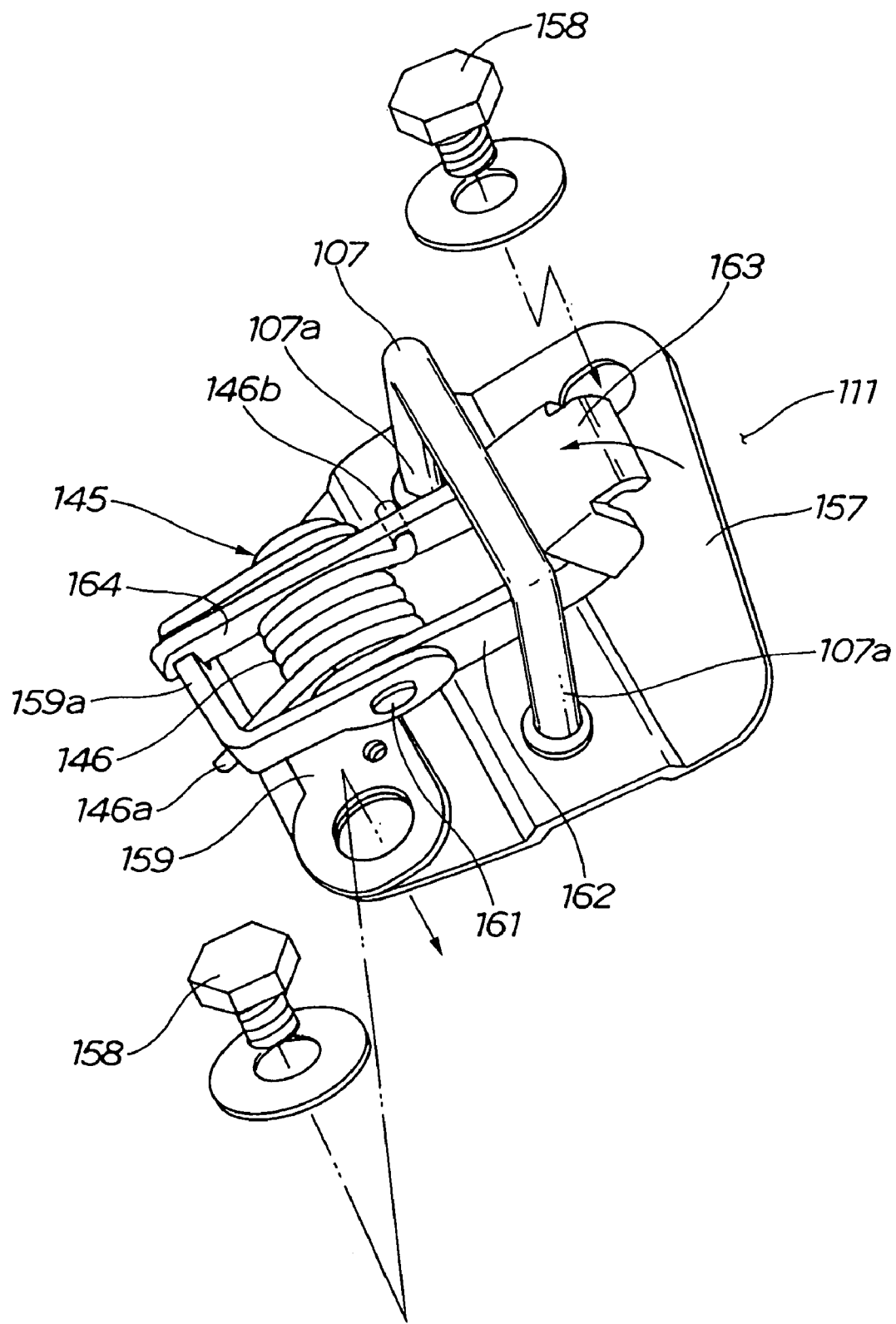
FIG. 11 is a perspective view of a right seat cushion push-up mechanism of the electric vehicle seat stowing structure according to the invention.

FIG. 11 is a perspective view showing the left seat cushion push-up mechanism of the electric vehicle seat stowing structure according to the invention.

The left striker 107 is formed substantially into a U-shape, a pair of lower end portions 107*a*, 107*a* of the left striker 107 so formed are mounted on a base 157, and the left seat cushion push-up mechanism 145 is mounted on he base 157 with mounting bolts 158 as an example.

Note that the base 157 is mounted on the location 111 of the floor 12 which is on the left rear member 91 (refer to FIG. 4) with the pair of bolts as an example.

The left seat cushion push-up mechanism 145 is such that a push-up member 162 is mounted on a support member 159 via a support pin 161 in such a manner as to be swung freely, the coil-like lift-up spring (the metallic spring) 146 is mounted on the support pin 161, one end portion 146*a* of the lift-up spring 146 is locked in the support member 159, and the other end 146*b* of the lift-up spring 146 is mounted to the push-up member 162.

The push-up member 162 is swung around the support pin 161 in a direction indicated by an arrow by virtue of the spring force of the lift-up spring 146 so as to lift a distal end portion 163 of the push-up member 162 upwardly.

Here, when the push-up member 146 is swung in the direction indicated by the arrow through a predetermined angle, a proximal end 164 of the push-up member 162 is brought into abutment with an abutment portion 159*a* of the support member 159, whereby the rising amount of the distal end portion 163 of the push-up member 162 is restricted to a predetermined position.

Spring materials formed, for example, of spring steel, piano wire and stainless steel can be raised as spring materials for the lift-up spring 146.

Note that while the example is described where the coil-like spring is used as the lift-up spring 146, the type of spring is not limited thereto, and for example, other types of springs such as a leaf spring and a spiral spring can be used.

As has been described above, the left seat cushion push-up mechanism 145 can be made simple and compact by constructing the left seat cushion push-up mechanism 145 by compact members such as the support member 159, the support pin 161, the push-up member 162 and the lift-up spring 146.

Consequently, the left seat cushion push-up mechanism 145 can be disposed in a relatively small space.

FIG. 12 is an explanatory diagram showing the cushion lock mechanism and the seat cushion push-up mechanism of the electric vehicle seat stowing structure according to the invention.

The left cushion lock mechanism 36 is such that a bracket 166 is mounted on the cushion frame 27 which constitutes the seat cushion 21, the latch 167 is rotationally mounted on the bracket 166 via a latch pin 168, and a ratchet 169 is rotationally mounted at a location confronting the latch 167 via a ratchet pin 171.

In addition, the left cushion lock mechanism 36 is such that a front end portion of an operating rod 172 is connected to the ratchet 169 via a connecting pin 165 and a rear end of the operating rod 172 is connected to an elongate hole 173a in a drive rod 173 via a slide pin 172 in such a manner as to freely slide in the elongate hole 173a, whereby the ratchet 169 is connected to the cushion lock actuator 70 via the operating rod 172.

Note that the reason why the rear end portion of the operating rod 172 is connected to the elongate hole 173a in the drive rod 173 in such a manner as to freely slide in the elongate hole 173a will described later on.

Furthermore, the left cushion lock mechanism 36 includes the lock/release detection switch 71 for detecting the movement of the ratchet 169 and the latch switch 72 for detecting the movement of the latch 167.

According to the left cushion lock mechanism 36, the ratchet 169 is swung around the ratchet pin 171 in a direction indicated by an arrow e so as to release the lock of the latch 167 (to bring the latch into an unlocked state) to thereby cause the seat cushion 21 to be separated apart from the floor 12 by pulling the operating rod 172 by the cushion lock actuator 70.

The latch 167 rotates around the latch pin 168 in a direction indicated by an arrow f to thereby cause the left striker 107 to be dislocated from an engagement groove in the latch 167 by lifting the bracket 166 upwardly together with the seat cushion 21.

On the other hand, the latch 167 is locked to the left striker 107 to thereby produce a locked state when the seat cushion 21 is restored to the seating position P1 (refer to FIG. 10), whereby the floor 12 is linked with the seat cushion 21, so that the seat cushion 21 is retained at the seating position P1.

In this state, the distal end portion 163 of the push-up member 162 which constitutes the left seat cushion push-up mechanism 145 is brought into abutment with a lower portion 166a of the bracket 166.

The spring force Fo2 of the lift-up spring 146 is applied to the push-up member 162 in a direction indicated by an arrow, whereby the seat cushion 21 is pushed up so as to be separated apart from the floor 12 by virtue of this spring force Fo2.

Here, the metallic spring is adopted as the lift-up spring 146 for the left seat cushion push-up mechanism 145, whereby the seat cushion 21 is pushed up so as to be separated apart from the floor by means of this lift-up spring 146.

By using the metallic spring as the lift-up spring 146, the lift-up spring 146 can avoid a risk that the spring-back force is damaged even in a low temperature area, which happens with an elastic rubber.

Thus, even in a case where the occupants are not seated on the seat cushion 21, the latch 167 and the striker 107 are locked to each other in an ensured fashion so as to eliminate looseness between the latch 167 and the striker 107 as an example.

By this construction, since the state can be maintained in which the seat cushion 21 is held at the seating position P1 (refer to FIG. 10), the generation of vibration noise can be prevented which would otherwise be generated when there occurs an interference between the latch 167 and the left striker 107 while the vehicle is running.

Here, when the seat cushion 21 is returned to the seating position P1, the seat cushion 21 is brought into the abutment with the left seat cushion push-up mechanism 145, whereby an abutment force is generated in the left seat cushion push-up mechanism 145.

The abutment force so applied to the left seat cushion push-up mechanism 145 can be absorbed by the lift-up spring 146 by providing the left seat cushion push-up mechanism 145 with the lift-up spring 146.

By this construction, the exertion of a relatively large magnitude of force onto the floor can be prevented.

Incidentally, the operating rod 172 can be pulled backwards by the hand without driving the cushion lock actuator 70 by connecting the rear end portion of the operating rod 172 of the left cushion lock mechanism 36 to the elongate hole 173a in the drive rod 173 via the slide pin 172a in such a manner as to freely slide in the elongate hole 173a.

By pulling the operating rod 172 backwards by the hand, as when the cushion rod actuator 70 is driven, the ratchet 169 is swung about the ratchet pin 171 in the direction indicated by the arrow e to thereby release the lock of the latch 167.

Note that while, in the embodiment, the example is described where the left and right seat cushion push-up mechanisms 145 are mounted on the floor 12 side, the left and right seat cushion push-up mechanisms 145 can be provided on the seat cushion 21 side.

In this case, too, a similar advantage to that obtained by the embodiment can be obtained.

Here, a cross member can be removed from a lower side of the floor 12 by mounting the cross member 115 on the floor 12 in front of the left seat cushion push-up mechanism 145, whereby a large mounting space can be secured on the lower side of the floor 12 so that a fuel tank (not shown), for example, can be disposed.

By this construction, the degree of freedom in layout when a fuel tank is mounted on the lower side of the floor 12 can be increased.

Note that the air duct 153 of the rear seat air conditioner (not shown) is mounted rearward of the cross member 115.

FIG. 13 is an explanatory diagram explaining the lock mechanism and the lock release mechanism of the reclining adjuster of the electric vehicle seat stowing structure according to the invention.

The left lock mechanism 56 of the left reclining adjuster 50 is such that a base 174 is mounted on the cushion frame 27 with mounting bolts 175 . . . , a plate 177 is mounted on the base 174 via a rotational shaft portion 176 in such a manner as to swing in the longitudinal directions of the vehicle body, first and second lock gears 178, 179 are provided at an upper end portion of the base 174, a lock gear 181 which can mesh with the first and second gears 178, 179 is formed on a lower swing lever 182, the lower swing lever 182 is mounted on the plate 177 via a lower pin 183 in such a manner as to freely swing thereon, an intermediate swing lever 184 for pressing a distal end of the lower swing lever 182 is mounted on the plate 177 via an intermediate pin 185 in such a manner as to freely swing thereon, an upper swing lever 188 in which an operating pin 186 of the intermediate swing lever 184 is fitted in a fitting hole 187 is mounted on the plate 177 via an upper pin 189 in such a manner as to freely swing thereon, and a tension spring 191 is extended between the lower swing lever 182 and the upper swing lever 188.

The upper swing lever 188 is biased abut the upper pin 189 in a direction indicated by an arrow h by virtue of the spring force of the tension spring 191, whereby the operating pin 186 in the fitting hole 187 is pressed against in a direction indicated by an arrow i by the upper swing lever 188.

By this construction, a distal end of the lower swing lever 182 is pushed down by a distal end of the intermediate swing lever 184, whereby the lock gear 181 of the lower swing lever 182 is made to mesh with the first gear 178, thereby making it possible to retain the plate 177 at a predetermined position.

In addition, the left lock mechanism 56 of the left reclining adjuster 50 includes the lock-off detection switch 77 for detecting the movement of the upper swing lever 188, the fall-forward detection switch 76 which is activated by a cam 192 which is provided on the plate 177 side and the lock-on detection switch 75 for detecting the movement of the intermediate swing lever 184.

The left lock release mechanism 57 is connected to the upper swing ever 188 of the left lock mechanism 56 via an operating cable 195.

The left lock release mechanism 57 is such that the mechanism includes the operating cable 195 which operates the upper swing lever 188 of the left lock mechanism 56 so as to release the lock thereof, the operating cable 191 is bifurcated at a connecting portion 200, one cable (a second cable) 201 of the bifurcated cables is connected to a left automatic lock release portion 196, and the other cable (a third cable) 202 is connected to a left manual lock release portion 197, whereby releasing the lock of the left lock mechanism 56 can be implemented either automatically or manually.

The operating cable 195 is such that a distal end portion 194a of a first inner cable 194 which constitutes a first cable 198 is connected to the upper swing lever 188 via a connecting pin 199, and a second inner cable 208 of the second cable 201 and a third inner cable 209 of the third cable 202 are connected to the first inner cable 194 via the connecting portion 200 in a bifurcated fashion.

In addition, the operating cable 195 is such that the second inner cable 208 of the second cable 201 is connected to the left automatic lock release portion 196, and the third inner cable 209 of the third cable 202 is connected to the left manual lock release portion 197.

The left automatic lock release portion 196 is such that the mounting bracket 58 is mounted on the left back frame 51 (refer to FIG. 3), the driving motor 80 is provided on the mounting bracket 58, a fluctuating shaft 203 is caused to protrude from the driving motor 80, a magnet 204 is mounted on the fluctuating shaft 203, an extension 205 of the magnet 204 is inserted into a guide 206, and the upper and lower Hall sensors 81, 82 are mounted, respectively, on locations which corresponds to upper and lower ends of the fluctuating shaft 203.

In addition, the left automatic lock release portion 196 is such that a connecting piece 207 is mounted on a distal end of the fluctuating shaft 203, and a proximal end portion 208b of the second inner cable 208 is connected to the connecting piece.

The left manual lock release portion 197 is such that a recessed portion 22b (refer to FIG. FIG. 4 as well) is formed in a back side 22a of the left seat back 22, a manual lever (a manual operating portion) 211 is disposed in the recessed portion 22b, a lower end portion of the manual lever 211 is mounted therein via pin 212 in such a manner that the manual lever 211 freely swings on the pin 212, an arm 213 is provided in such a manner as to extend to the lower end portion of the manual lever 211, a proximal end portion 209b of the third inner cable 209 is connected to a distal end portion of the arm 213, and a coil spring 215 is mounted on the pin 212, whereby the manual lever 211 is biased in a direction indicated by an arrow j by virtue of the spring force of the coil spring 215.

Here, while, in the embodiment, the example has been described where the manual lever 211 of the left manual lock release portion 197 is provided in the back side 22a of the left seat back 22, the location where the manual lever 211 is provided is not limited to the back side 22a of the left seat back 22, and the manual lever 211 can be provided at other locations appropriately.

Figure 14:
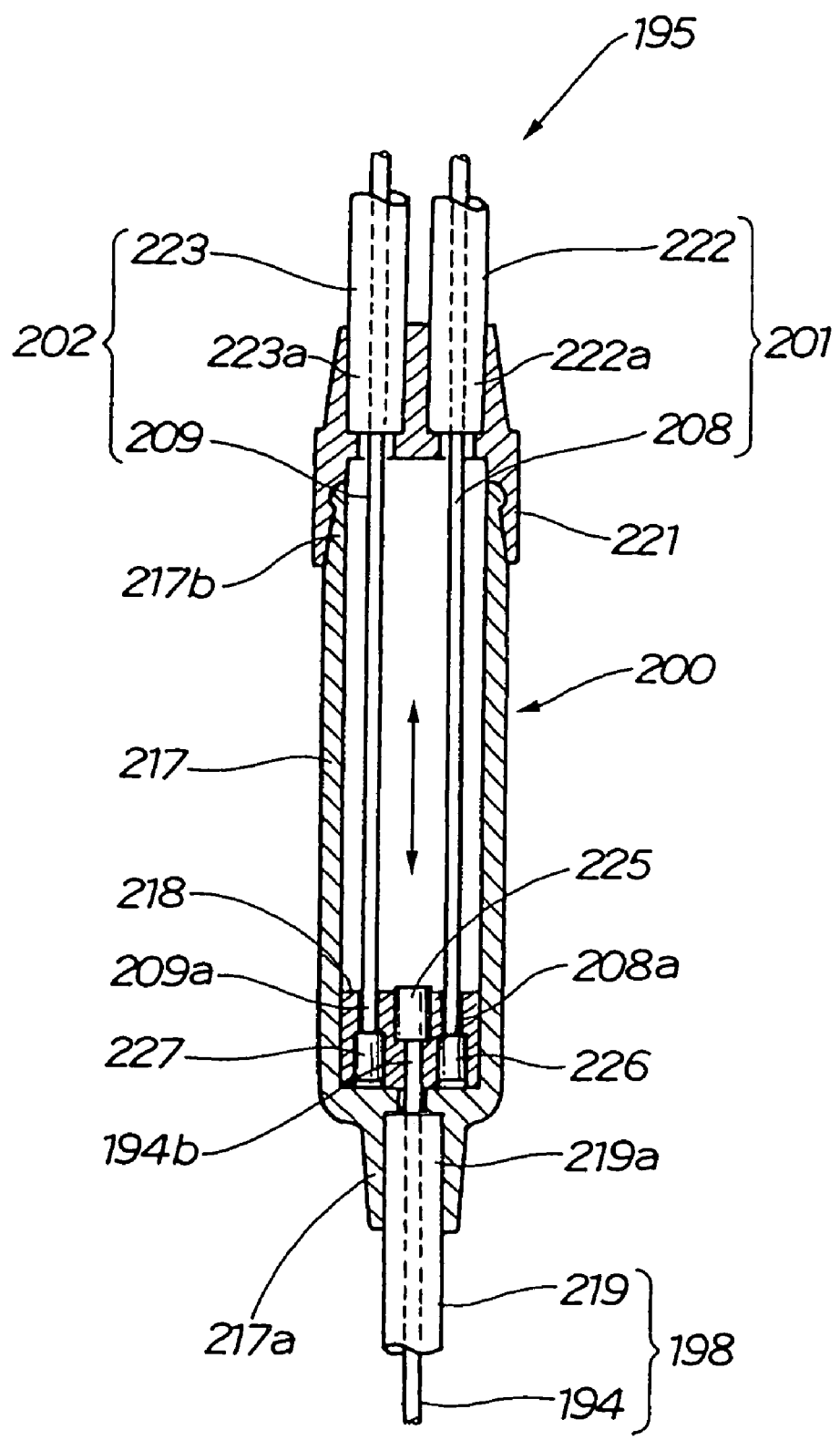
FIG. 14 is a cross-sectional view showing a connecting portion of the electric vehicle seat stowing structure according to the invention.

FIG. 14 is a cross-sectional view showing the connecting portion of the electric vehicle seat stowing structure according to the invention.

The connecting portion 200 is such that a slider 218 is disposed within a tubular casing 217 in such a manner as to slide in directions indicated by arrows, a proximal end portion 194b of the first inner cable 194 is connected to the center of the slider 218 by means of a first stopper 225, a distal end portion 208a of the second inner cable 208 is connected to a right end portion of the slider 218 by means of a second stopper 226, and a distal end portion 209a of the third inner cable 209 is connected to a left end portion of the slider 218 by means of a third stopper 227, whereby the second and third inner cables 208, 209 are connected to the first inner cable 104 in the bifurcated fashion.

Note that the second and third stoppers 226, 227 are mounted in mounting holes in the slider 218 in such a manner as to be pulled thereout freely.

In addition, the connecting portion 200 is such that a proximal end portion 219a of a first outer cable 219 is attached to one end portion (a lower end portion) 217a of a casing 217, a cap 221 is placed on the other end portion (an upper end portion) 217b of the casing 217, a distal end portion 222a of a second outer cable 222 is mounted in the cap 221, and a distal end portion 223a of a third outer cable 223 is mounted in the cap 221.

Here, the first cable 198 is constituted by the first outer cable 219 and the first inner cable 194, and the second cable 201 is constituted by the second outer cable 222 and the second inner cable 208. In addition, the third cable 202 is constituted by the third outer cable 223 and the third inner cable 209.

Returning to FIG. 13, according to the left lock release mechanism 57, the second and third cables 201, 202 can be connected to the first cable 198 via the connecting portion 200 in the bifurcated fashion, the left automatic lock release portion 196 can be connected to the second cable 201, and the left manual lock release portion 197 can be connected to the third cable 202.

Note that while, in FIG. 13, the example has been described where the left automatic lock release portion 196 and the left manual lock release portion 197 of the left lock release mechanism 57 are connected to the left lock mechanism 56 via the operating cable 195, as with the left lock release mechanism 57, the right lock release mechanism 62 shown in FIG. 3 is also such that the right automatic lock release portion 196 and the right manual lock mechanism 197 (refer to FIG. 4) are connected to the left rock mechanism 62 via the operating cable 195.

Note that since the right lock release mechanism 62 has the same constituent members as those of the left lock release mechanism 57, like reference numerals to those imparted to the left lock release mechanism 57 are imparted, and the description of the right lock release mechanism 62 will be omitted.

In addition, in FIG. 3, to facilitate the understanding thereof, as the left and right lock release mechanisms 57, 62, only the left and right automatic lock release portions 196, 196 are shown, and the left and right manual lock release portions 197, 197 are omitted.

Figure 15:
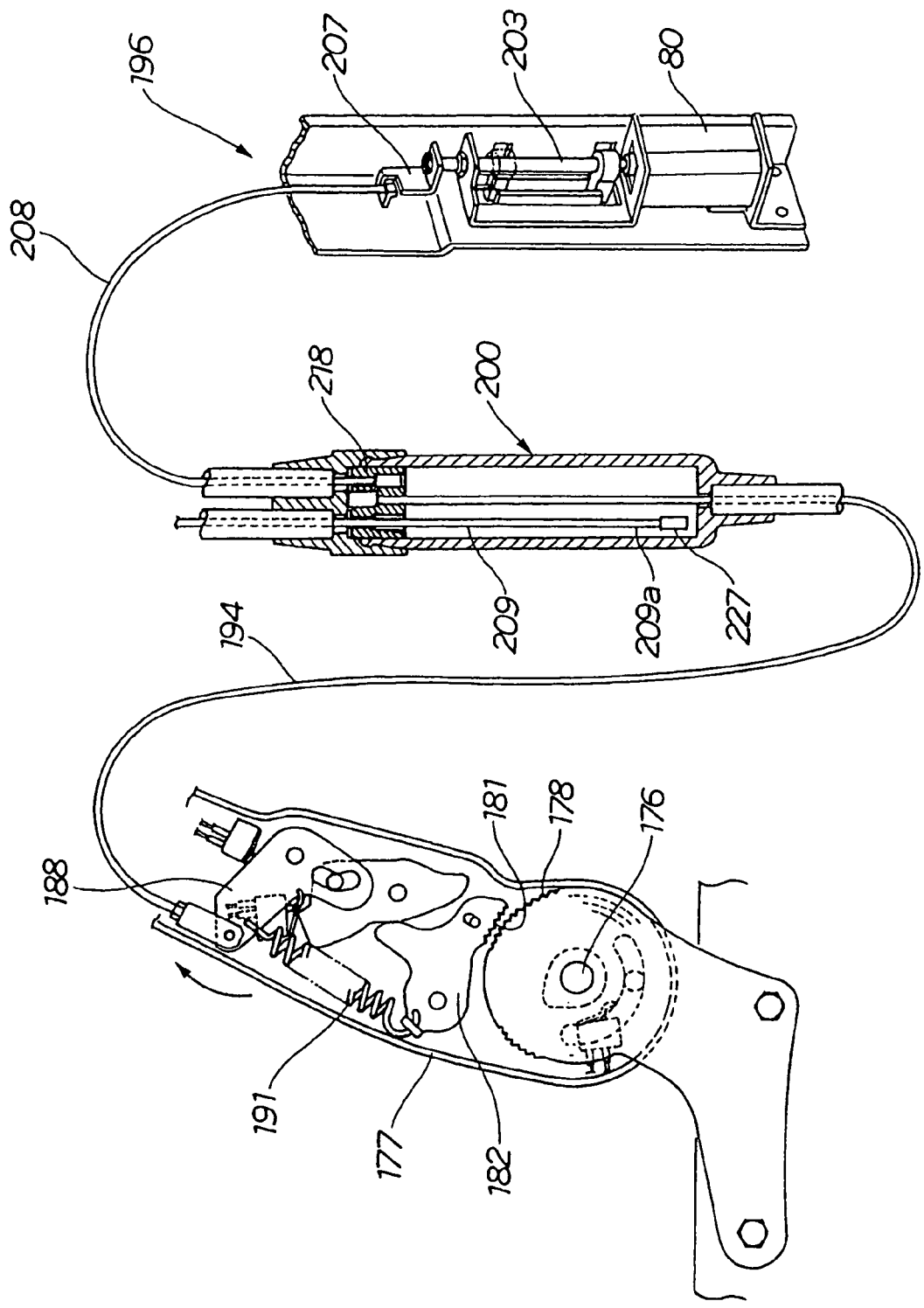
FIG. 15 is an explanatory drawing explaining an example where the lock mechanism of the reclining adjuster of the electric vehicle seat stowing structure according to the invention is released by a left automatic lock release mechanism.

FIG. 15 is an explanatory diagram which explains an example where the lock mechanism of the reclining adjuster of the electric vehicle seat stowing structure according to the invention is released by the left automatic lock release portion.

According to the left automatic lock release portion 196, by driving the drive motor 80, the fluctuating shaft 203 is lowered, and the slider 218 of the connecting portion 200 is raised upwardly by the second inner cable 208.

As this occurs, the third stopper 227 is dislocated from the mounting hole of the slider 218 to thereby maintain the third inner cable 209 in a stationary state.

The first cable 194 is pulled up by pulling up the slider 218 so as to rotate the upper swing lever 188 in a clockwise direction (a direction indicated by an arrow) against the spring force of the tension spring 191.

By this operation, the lock gear 181 of the lower swing lever 182 is separated apart from the first gear 178 so that the plate 177 is allowed to fall about the rotational shaft portion 176 in the longitudinal directions of the vehicle body.

Figure 16:
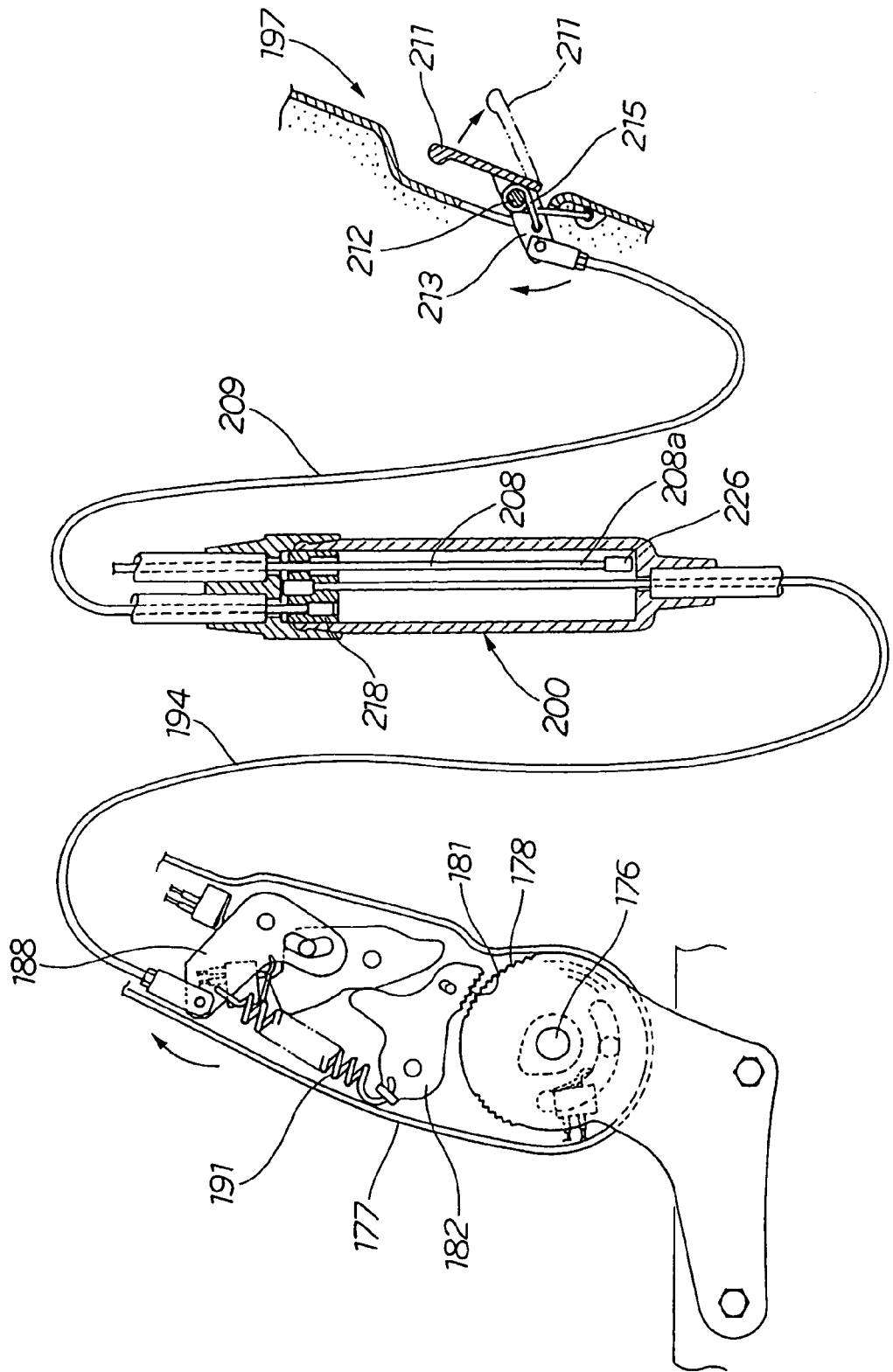
FIG. 16 is an explanatory drawing explaining an example where the lock mechanism of the reclining adjuster of the electric vehicle seat stowing structure according to the invention is released by a left manual lock release mechanism.

FIG. 16 is an explanatory diagram which explains the release of the lock mechanism of the reclining adjuster of the electric vehicle seat stowing structure according to the invention by the left manual lock release portion.

According to the left manual lock release portion 197, the manual lever 211 is swung in a direction indicated by an arrow against the spring force of the coil spring 215, so that the arm 213 is raised in a direction indicated by an arrow. The slider 218 of the connecting portion 200 is pulled upwardly by the third inner cable 209.

As this occurs, the second stopper 226 is dislocated from the mounting hole, whereby the stationary state of the second inner cable 208 is maintained.

The first cable 194 is pulled up by pulling up the slider 218 so as to rotate the upper swing lever 188 in the clockwise direction (the direction indicated by an arrow) against the spring force of the tension spring 191.

By this operation, the lock gear 181 of the lower swing lever 182 is separated apart from the first gear 178 so that the plate 177 is allowed to fall about the rotational shaft portion 176 in the longitudinal directions of the vehicle body.

Returning to FIG. 13, according to the left lock release mechanism 57, the second and third cables 201, 202 can be connected to the first cable 198 via the connecting portion 200 in the bifurcated fashion, the left automatic lock release portion 196 is connected to the second cable 201, and the left manual lock release portion 197 is connected to the third cable 202, whereby the lock release of the left lock mechanism 56 of the left reclining adjuster 50 can be implemented either manually or automatically.

By this construction, normally, the lock of the lock mechanism 56 is released using the left automatic lock release portion 196, so that the left seat back 22 can be folded down.

On the other hand, for example, with a main switch of the vehicle being switched off or with the driving motor 80 of the left automatic lock release portion 196 being not driven, it can be considered that there occurs a case where the left seat back 22 needs to be folded down.

In this case, by using the left manual lock release portion 197, the lock of the left lock mechanism 56 is released so that the left seat back 22 can be folded down back and forth manually.

Returning to FIG. 3, the operating cable 195 of the left lock release mechanism 57 is installed in the left seat back 22 (refer to FIG. 2) and is loosened in an S-like shape.

In the event that the left seat back 22 is deformed when the occupant leans back against the left seat back 22, the deformation of the left seat back 22 can be absorbed by virtue of the looseness of the operating cable 195 when the operating cable 195 is installed in the left seat back 22 while being loosened substantially in the S-like shape, where by the operating cable 195 is prevented from being pulled with an external force.

In FIG. 3, while the example is explained where the operating cable 195 is loosened substantially in the S-like shape so that the operating cable 195 is prevented from being pulled with the external force, the shape in which the operating cable 195 is loosened is not limited to the S-like shape, but the operating cable 195 can be loosened in other shapes including, for example, a U-like shape in order to obtain the same effect as that described above.

Note that while the operating cable 195 of the left lock release mechanism 57 is described, the operating cable 195 of the right lock release mechanism 62 can be loosened in the S-lie or U-like shape as with the operating cable 195 of the left lock release mechanism 57 so as to obtain the same effect as that obtained with the operating cable 195 of the left lock release mechanism 57.

Next, with reference to FIGS. 17 to 22, an assembling procedure of the electric vehicle seat stowing structure 20 will be described.

Figure 17:
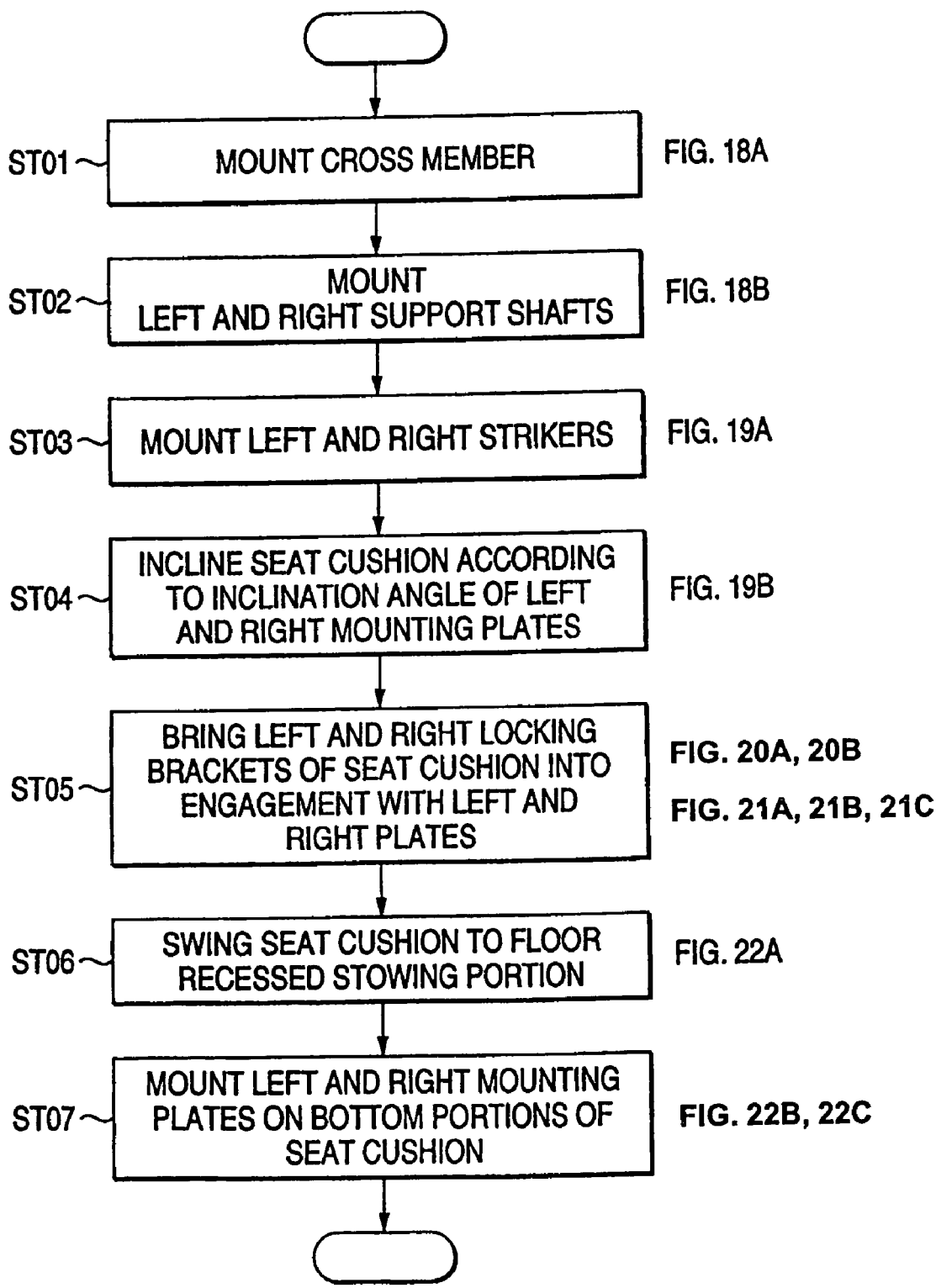
FIG. 17 is a flowchart explaining an assembling procedure of the electric vehicle seat stowing structure according to the invention.

FIG. 17 is a flowchart showing an assembling procedure of the electric vehicle seat stowing structure according to the invention, and in the drawing, numbers which follow ST denote step numbers.

ST01: The cross member is mounted on the floor, and the left and right reinforcement plates are mounted on the left and right rear wheel houses, respectively.

ST02: The right support shaft is mounted on the floor, the right mounting plate provided on the right support shaft is disposed in such a manner as to be inclined at the predetermined angle, the left support shaft is mounted on the floor via the swing drive mechanism, and the left mounting plate provided on the left support shaft is disposed in such a manner as to be inclined at the predetermined angle.

ST03: The left and right strikers are mounted, respectively, at the positions which are spaced apart at the predetermined distance relative to the left and right support shafts.

ST04: With the seat back being folded towards the seat cushion side, the seat cushion is inclined according to the inclination angles of the left and right mounting plates. In this state, the seat cushion is moved towards the left and right mounting plates.

ST05: The left locking bracket provided on the left-hand side bottom portion of the seat cushion is brought into engagement with the left mounting plate, and the right locking plate provided on the right-hand side bottom portion is brought into engagement with the right mounting plate.

By this construction, the left and right mounting plates are temporarily fastened to the bottom portion of the seat cushion.

ST06: With the left and right mounting plates being temporarily fastened to the bottom portion of the seat cushion, the seat back and the seat cushion are swung to the floor recessed stowing portion while being supported on the left and right support shafts.

ST07: The left and right mounting plates are mounted on the left- and right-hand side bottom portions of the seat cushion with the mounting bolts.

Hereinafter, what has been described in ST01 to ST07 will be described in detail.

Figure 18A:
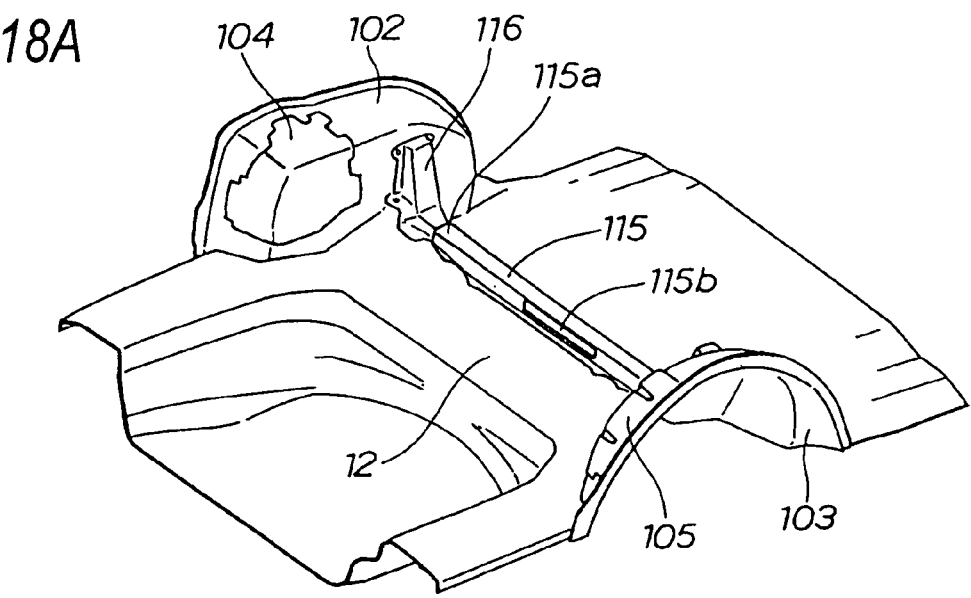
FIG. 18A is a first assembling process drawing explaining ST01 of an assembling procedure of the electric vehicle seat stowing structure according to the invention.
Figure 18B:
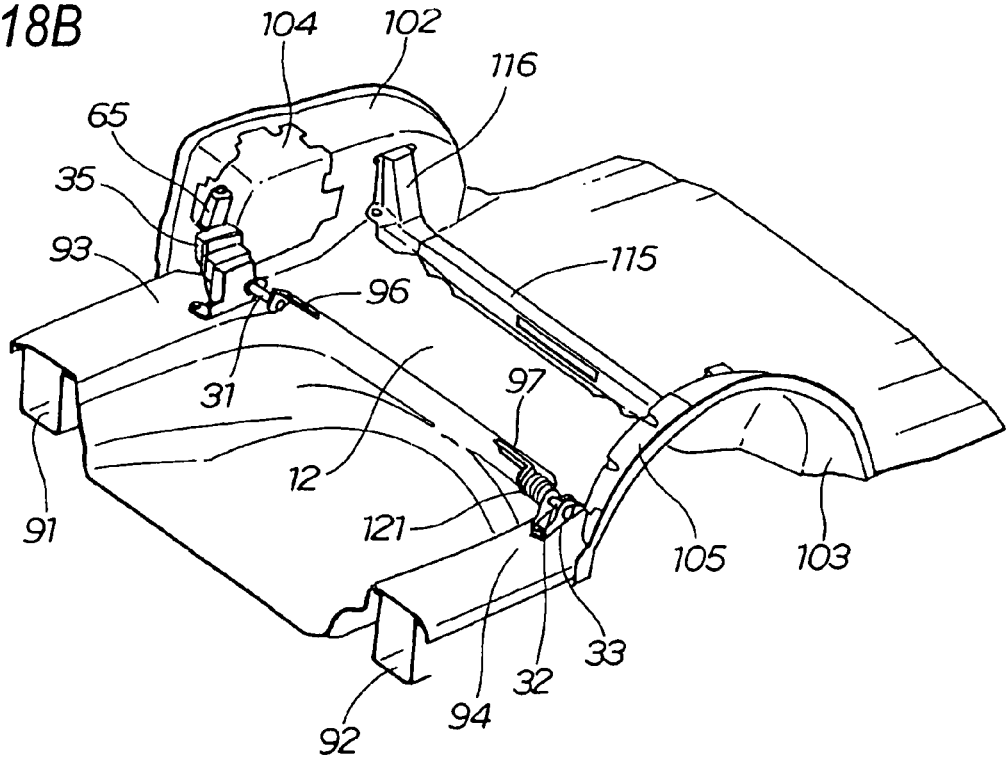
FIG. 18B is a first assembling process drawing explaining ST02 of an assembling procedure of the electric vehicle seat stowing structure according to the invention.

FIGS. 18A, 18B are first assembling process diagrams explaining the assembling procedure of the electric vehicle seat stowing structure according to the invention.

In FIG. 18A, the cross member 115 is disposed on the floor 12 and is then attached to the left and right rear wheel houses 102, 103 via the left and right gussets 116, 116, respectively.

In addition, the left and right reinforcement plates 104, 105 are attached to the left and right rear wheel houses 102, 105, respectively.

In FIG. 18B, the swing drive mechanism 35 is mounted on the location 93 of the floor 12 which is on the left rear member 91, and the left support shaft 31 is provided on the swing drive mechanism 35. The left mounting plate 96 is attached to the end portion of the left support shaft 31.

Furthermore, the mounting member 33 is mounted on the location 94 of the floor 12 which is on the right rear member 92, and the right support shaft 12 is provided on the mounting member 33. The right mounting plate 97 is attached to the end portion of the right support shaft 32.

The left and right mounting plates 96, 97 are held in the state where those mounting plates are inclined at the predetermined inclination angle.

Here, it is preferable that the state where the left and right mounting plates 96, 97 are inclined at the predetermined angle, respectively, means, for example, a state where the left and right mounting plates 96, 97 are made to rest at a position resulting when the seat cushion 21 is swung to an intermediate position, and the resting positions are inclined at the predetermined inclination angle.

As a method for maintaining the left and right mounting plates 96, 97 in the state where the plates are inclined at the predetermined inclination angle, a method can be considered for example in which the spring force of the coil-like spring 121 is adjusted. Specifically speaking, for example, a method can be considered in which a spring is mounted which provides a spring force which applies in an opposite direction to that in which the spring force of the coil-like spring 121 applies, but the adjustment of spring force is not limited thereto.

Note that it is possible to maintain the left and right mounting plates 96, 97 in the state where they are inclined at the predetermined inclination angle using a jig.

Figure 19A:
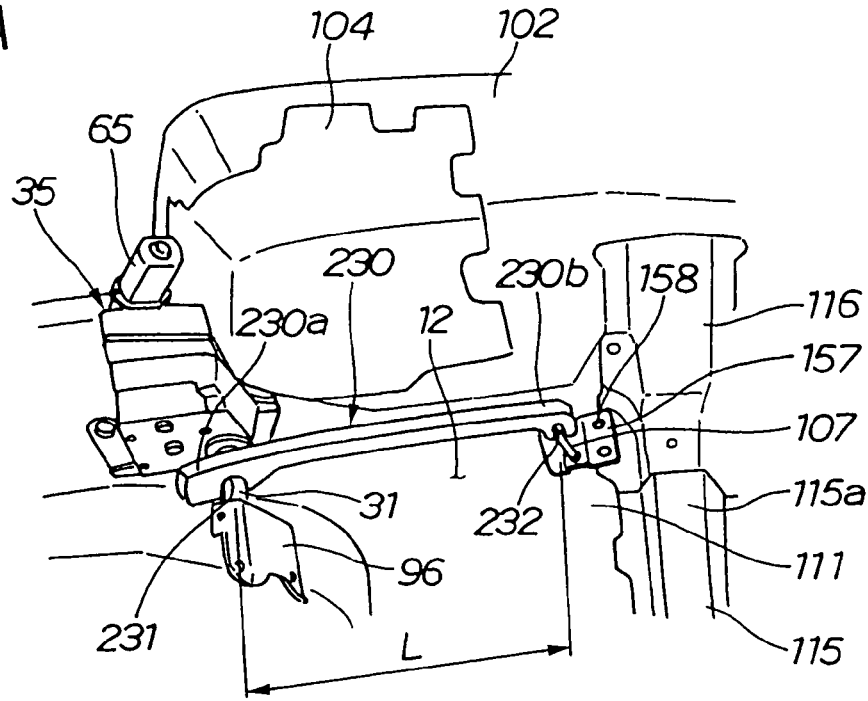
FIG. 19A is a second assembling process drawing explaining ST03 of the assembling procedure of the electric vehicle seat stowing structure according to the invention.
Figure 19B:
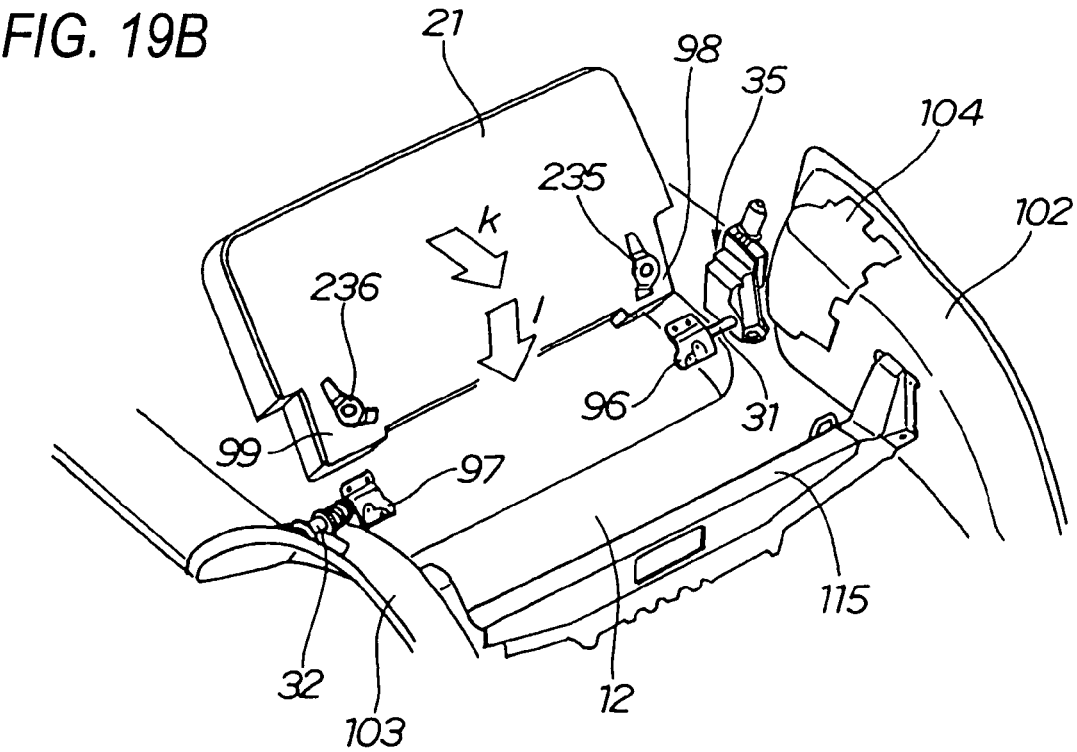
FIG. 19B is a second assembling process drawing explaining ST04 of the assembling procedure of the electric vehicle seat stowing structure according to the invention.

FIGS. 19A, 19B are second assembling process diagrams that explain the assembling procedure of the electric vehicle seat stowing structure according to the invention. FIG. 19A explains ST03, and FIG. 19B explains ST04.

In FIG. 19A, the left and right strikers 107, 107 are mounted using a positioning jig 230. The position jig 230 is such that a rear end recessed portion 231 is formed in a rear end portion 230a, a front end recessed portion 232 is formed in a front end portion 230b, and an interval between the rear end recessed portion 231 and the front end recessed portion 232 is set to a predetermined interval L.

To be specific, the left striker 107 is made to rest on the floor 12 at the location 111 which is on the left rear member 91 (refer to FIG. 18B) and which is forward of the swing drive mechanism 35.

Note that the pair of lower end portions 107a, 107a (refer to FIG. 11) of the striker 107 are mounted on the base 157, when the base 157 is placed on the location 111, the striker 107 can be disposed in a state where the striker is erected on the location 111.

Next, the rear end recessed portion 231 of the positioning jig 230 is fitted on the left support shaft 31, and the front end recessed portion 232 of the positioning jig 230 is fitted on the striker 107. By this construction, the left striker 107 can be positioned at the position which is spaced apart the predetermined interval L from the left support shaft 31.

In this state, the base 157 is mounted on the location 111 with the mounting bolts 158 (refer to FIG. 11 as well), whereby the left striker 107 is secured.

As with the left striker 107, the right striker 107 is fixed to the floor 12 at the location 112 (refer to FIG. 4) which is on the right rear member 92 and which is forward of the mounting member 33.

In FIG. 19B, with the left and right seat backs 22, 23 (refer to FIG. 2) being folded over the seat cushion 21 side, the seat cushion 21 is inclined according to the inclination angle of the left and right mounting plates 96, 97.

In this state, the seat cushion 21 is moved in a horizontal direction as indicated by an arrow k, and the left and right bottom portions 98, 99 of the seat cushion 21 are brought into abutment with the left and right mounting plates 96, 97, respectively.

In this state, the seat cushion 21 is lowered as indicated by an arrow i.

The seat cushion 21 has left and right locking brackets 235, 236 on the left and right bottom portions 98, 99, respectively.

Figure 20A:
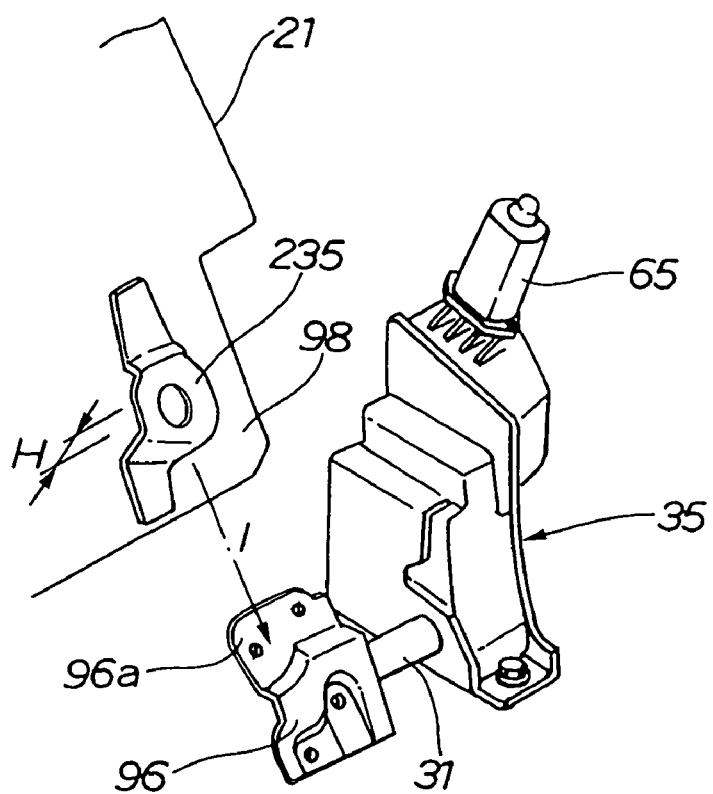
FIG. 20A is a third assembling process drawing explaining left side of ST05 of the assembling procedure of the electric vehicle seat stowing structure according to the invention.
Figure 20B:
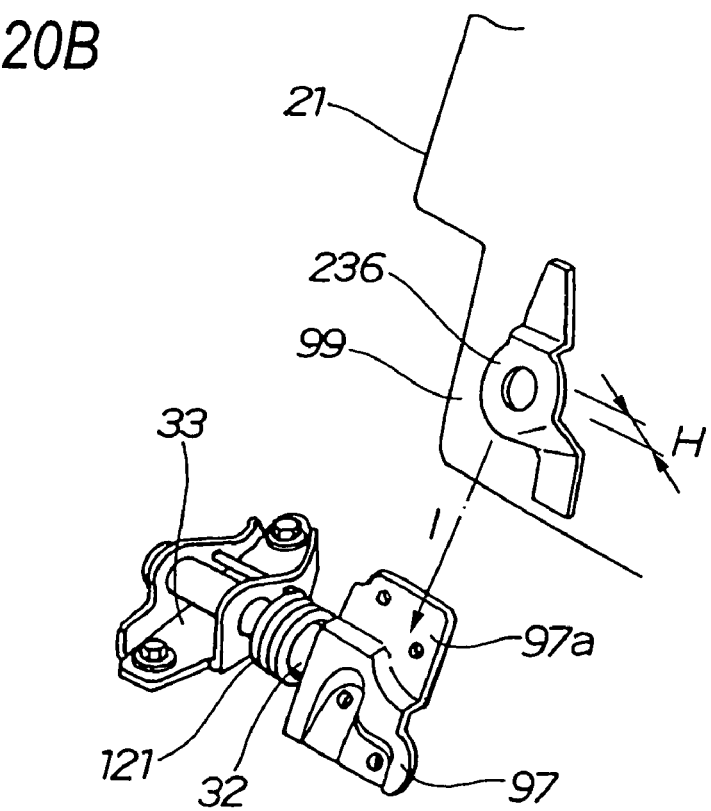
FIG. 20B is a third assembling process drawing explaining right side of ST05 the assembling procedure of the electric vehicle seat stowing structure according to the invention.

FIGS. 20A, 20B are third assembling process diagrams which explain the assembling procedure of the electric vehicle seat stowing structure according to the invention.

In FIG. 20A, the left locking bracket 235 of the seat cushion 21 is moved as indicated by an arrow l towards an engaging portion 96a of the left mounting plate 96.

The left locking bracket 235 is raised by a height H from the right-hand side bottom portion 99 of the seat cushion 21. Consequently, the engaging portion 96a of the left mounting plate 96 can be inserted into a space between the left-hand side bottom portion 98 and the left locking bracket 235.

In FIG. 20B, the right locking bracket 236 of the seat cushion 21 is moved as indicated by an arrow l towards an engaging portion 97a of the right mounting plate 97.

The right locking bracket 236 is raised by the height H from the right-hand side bottom portion 99 of the seat cushion 21. Consequently, the engaging portion 97a of the right mounting plate 97 can be inserted into a space between the right-hand side bottom portion 99 and the locking bracket 236.

Figure 21A:
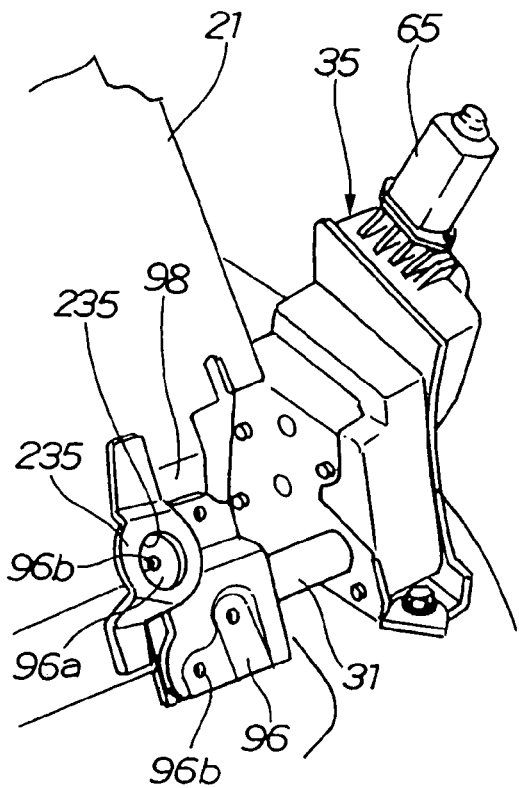
FIG. 21A is a fourth assembling process drawing explaining left side of ST05 of the assembling procedure of the electric vehicle seat stowing structure according to the invention.
Figure 21B:
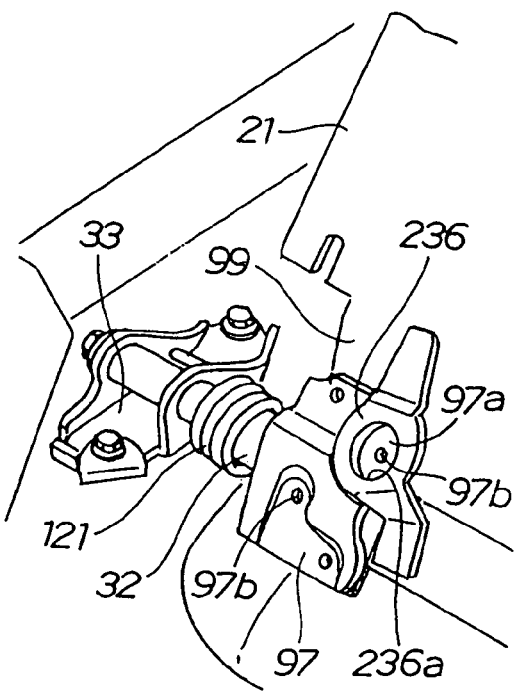
FIG. 21B is a fourth assembling process drawing explaining right side of ST05 of the assembling procedure of the electric vehicle seat stowing structure according to the invention.
Figure 21C:
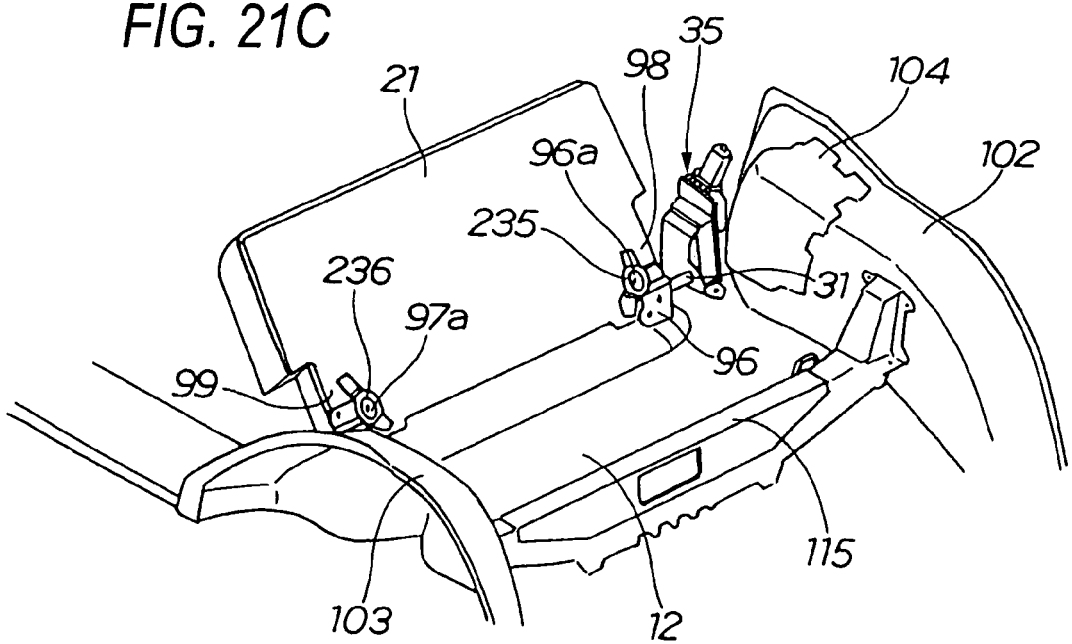
FIG. 21C is a fourth assembling process drawing explaining last step of ST05 the assembling procedure of the electric vehicle seat stowing structure according to the invention.

FIGS. 21A to 21C are fourth assembling process diagrams which explain the assembling procedure of the electric vehicle seat stowing structure according to the invention.

In FIG. 21A, the engaging portion 96a of the left mounting plate 96 is inserted into the space between the left-hand side bottom portion 98 of the seat cushion 21 and the left locking bracket 235, where by the left locking bracket 235 is brought into engagement with the engaging portion 96a of the left mounting plate 96.

By this construction, the left mounting plate 96 can temporarily be fastened to the left-hand side bottom portion 98 of the seat cushion 21.

As this occurs, an opening 235a in the left locking bracket 235 is aligned with one of mounting holes 96b . . . in the left mounting plate 96.

In FIG. 21B, the engaging portion 97a of the right mounting plate 97 is inserted into the space between the right-hand side bottom portion 99 of the seat cushion 21 and the right locking bracket 236, whereby the right locking bracket 236 is brought into engagement with the engaging portion 97a of the right mounting plate 97.

By this construction, the right mounting plate 97 can temporarily be fastened to the right-hand side bottom portion 99 of the seat cushion 21.

As this occurs, an opening 236a in the right locking bracket 236 is aligned with one of mounting holes 97b . . . in the right mounting plate 97.

In FIG. 21C, the left and right bottom portions 98, 99 of the seat cushion 21 are supported by the left and right support shafts 31, 32 (the left support shaft 32 is shown in FIG. 21B) via the left and right mounting plates 96, 97 (the right mounting plate 97 is shown in FIG. 21B).

FIGS. 22A, 22B are fifth assembling process diagrams that explain the assembling procedure of the electric vehicle seat stowing structure according to the invention. FIG. 22A explains ST06, and FIG. 22B explains ST07.

In FIG. 22A, while the left and right seat backs 22, 23 and the seat cushion 21 are being supported by the left and right support shafts 31, 32, the seat cushion 21 is swung as indicated by an arrow m to the floor recessed stowing portion 16.

By this construction, the left and right seat backs 22, 23 and the seat cushion 21 can be stowed in the floor recessed stowing portion 16.

As this occurs, the state is maintained where the engaging portion 96a of the left mounting plate 96 is in engagement with the left locking bracket 235, and the state is maintained where the engaging portion 97a of the right mounting plate 93 is in engagement with the right locking bracket 236.

Consequently, the state can be maintained where the left and right mounting plates 96, 97 are temporarily fastened to the left- and right-hand side bottom portions 98, 99 of the seat cushion 21, respectively.

In FIG. 22B, the left mounting plate 96 can be attached to the left-hand side bottom portion 98 of the seat cushion 21 by inserting the mounting bolts 101 . . . into the mounting holes 96b . . . and screwing the bolts into the left-hand side bottom portion 98 of the seat cushion 21.

Here, by stowing the seat cushion 21 in the floor recessed stowing portion 16 (refer to FIG. 22A) so as to make the left-hand side bottom portion 98 of the seat cushion 21 face upwardly, the seat cushion 21 can be prevented from constituting an interruption to a fixing operation of the left mounting plate 96 when the operation actually occurs.

In FIG. 22C, the right mounting plate 97 can be attached to the right-hand side bottom portion 99 of the seat cushion 21 by inserting the mounting bolts 101 . . . into the mounting holes 97b . . . and screwing the bolts into the right-hand side bottom portion 99 of the seat cushion 21.

Here, by stowing the seat cushion 21 in the floor recessed stowing portion 16 (refer to FIG. 22B) so as to make the right-hand side bottom portion 99 of the seat cushion 21 face upwardly, the seat cushion 21 can be prevented from constituting an interruption to a fixing operation of the right mounting plate 97 when the operation actually occurs.

This completes the assembling process of the electric vehicle seat stowing structure 20.

According to the method for assembling the electric vehicle seat stowing structure 20, the left and right locking brackets 235, 236 are provided on the left- and right-hand side bottom portions 98, 99 of the seat cushion 21, so that the left and right locking brackets 235, 236 are allowed to be brought into engagement with the left and right mounting plates 96, 97, respectively.

The left and right mounting plates 96, 97 can temporarily be fastened to the left- and right-hand side bottom portions 98, 99 of the seat cushion 21 with ease by bringing the left and right locking brackets 235, 236 into engagement with the left and right mounting plates 96, 97.

Furthermore, the seat cushion 21 is swung rearward about the left and right support shafts 31, 32 so as to bestowed in the floor recessed stowing portion 16, whereby the seat cushion 21 can easily be positioned to the stowing position P2 (refer to FIG. 33) with the left and right mounting plates 96, 97 being temporarily fastened to the left- and right-hand side bottom portions 98, 99.

In addition, the seat cushion can be prevented from constituting an interruption to an operation of fixing the left and right mounting plates 96, 97 when the operation really happens by stowing the seat cushion 21 in the floor recessed stowing portion 16 with the left- and right-hand side bottom portions 98, 99 being made to face upwardly.

By this construction, the assembling operation of the seat cushion 21 can be performed with ease without spending much time.

Incidentally, the electric vehicle seat stowing structure 20 has the left and right strikers 107, 107 provided on the floor 12 in order to lock the seat cushion 21 to the seating position P1 (refer to FIG. 10). In order to bring the seat cushion 21 into engagement with the strikers 107, 107, the left and right strikers 107, 107 need to be mounted on the positions which are spaced apart the predetermined distance L (refer to FIG. 19A) from the left and right support shafts 31, 32, respectively.

However, for example, the left and right rear wheel houses 102, 103 are provided in the vicinity of the left and right strikers 107, 107 or the left and right support shafts 31, 32, and it is considered that these members 102, 103 constitute interruptions to mounting operations of the left and right strikers 107, 107 when the operations really happen.

In the event that it is the case, there may be caused a risk that it takes much time to mount the left and right strikers 107, 107 and that heavy burden is exerted on those who are involved in the mounting operations.

Then, positioning the left and right strikers 107, 107 using the positioning jig 130 makes it possible for the left and right strikers 107, 107 to be mounted with ease without spending much time, and furthermore, load can be alleviated which would otherwise be exerted on those who are involved in the mounting operation.

Next, the operation of the electric vehicle seat stowing structure 20 will be described based on FIGS. 23 to 37. Note that while the left and right seat backs 22, 23 and the left and right head restraints 24, 25 operate similarly as the electric vehicle seat stowing structure 20 operates, here, only the left seat back 22 and the left head restraint 24 will be described and the description of the right seat back 23 and the right head restraint 25 will be omitted for the purpose of easing understanding.

First of all, a stowing operation of the electric vehicle seat stowing structure 20 will be described based on FIGS. 23 to 33.

FIG. 23 is a flowchart which explains a stowing operation of the electric vehicle seat stowing structure according to the invention.

ST10: A tailgate is opened, and the seat operating button is depressed so as to turn on the stowing switch.

ST11: The lock of the lock mechanism is released, and the seat back is made to fall forward by virtue of the spring force.

ST12: After the seat back has been locked to the fall-forward position, the lock of the seat cushion is released.

ST13: The seat cushion is swung to the rear of the vehicle body.

ST14: The second rear seat (the seat cushion and the left seat back) is stowed into the floor recessed stowing portion.

Figure 24A:
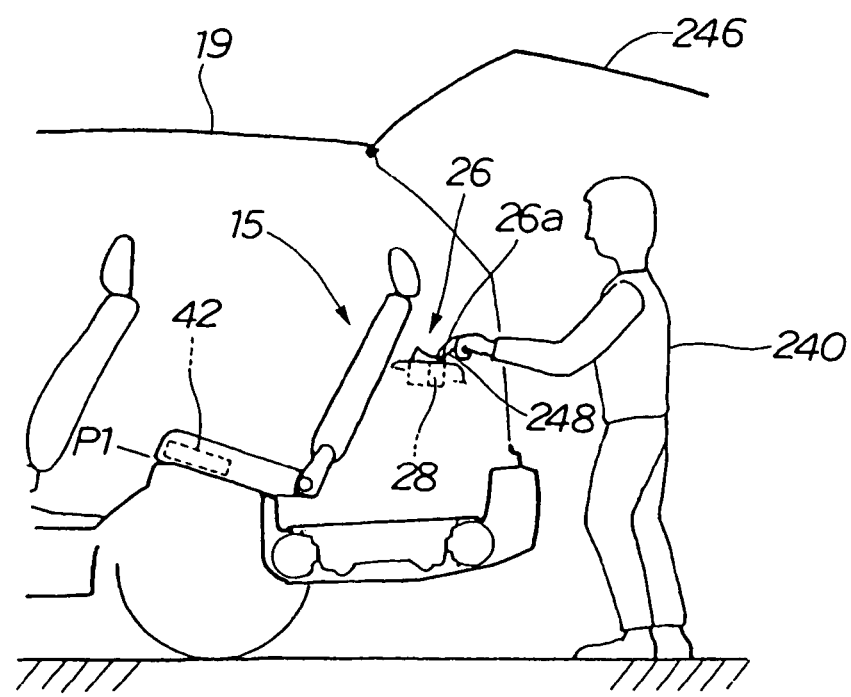
FIG. 24A is a first operation explanatory drawing explaining ST10 of the stowing operation of the electric vehicle seat stowing structure according to the invention.
Figure 24B:
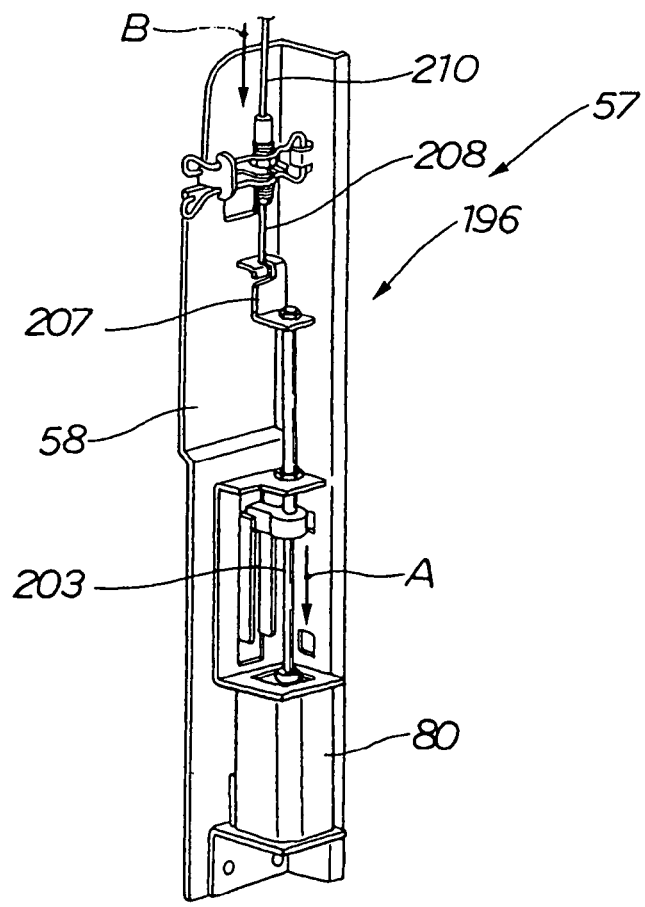
FIG. 24B is a first operation explanatory drawing explaining former half part of ST11 of the stowing operation of the electric vehicle seat stowing structure according to the invention.

FIGS. 24A, 24B are first operation explanatory diagrams. FIG. 24A explains ST10, and FIG. 24B explains a former half part of the process in ST11.

In FIG. 24A, a user 240 opens upwardly a tailgate 241 provided at the rear of the vehicle body 19. A tailgate opening switch (not shown) is turned on when the tailgate 241 is so opened.

Next, the stowing operation part 26a of the seat operating button 26 provided rearward of the second rear seat 15 is depressed with the finger 242 so as to turn on the stowing switch 28.

In FIG. 24B, after the control unit 42 (refer to FIG. 24A) has detected that the tailgate opening switch has been turned on, the driving motor 80 of the left automatic lock release portion 196 is driven. When the driving motor 80 is driven, the fluctuating shaft 203 is moved downwardly as indicated by an arrow A.

When the fluctuating shaft 230 moves downwardly, the second inner cable 208 of the second cable 201 is pulled by a connecting piece 207 in a direction indicated by an arrow B.

Figure 25A:
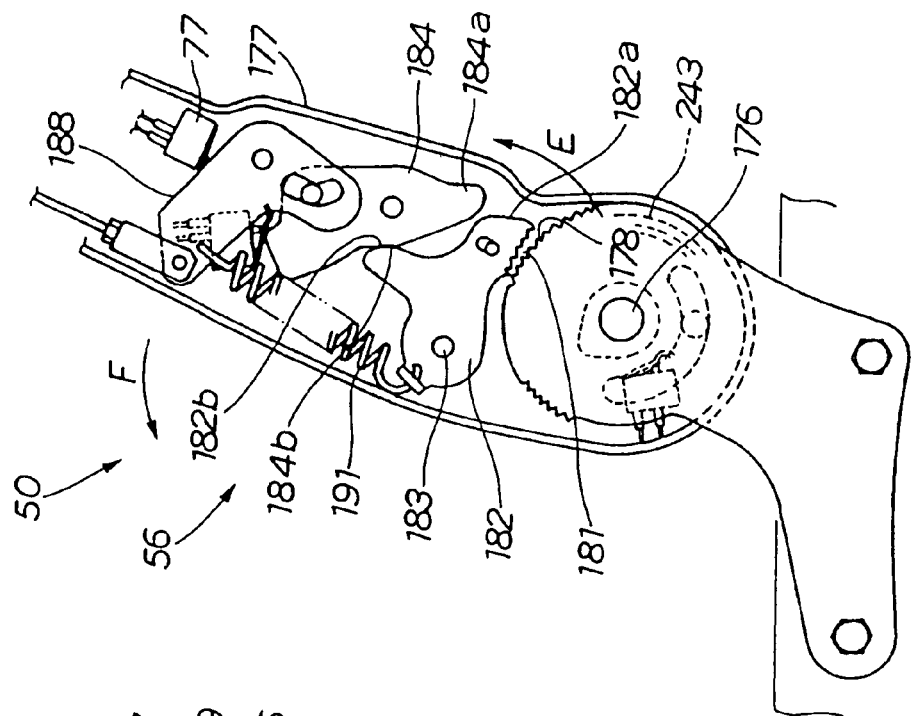
FIG. 25A is a second operation explanatory drawing explaining intermediate part of ST11 of the stowing operation of the electric vehicle seat stowing structure according to the invention.
Figure 25B:
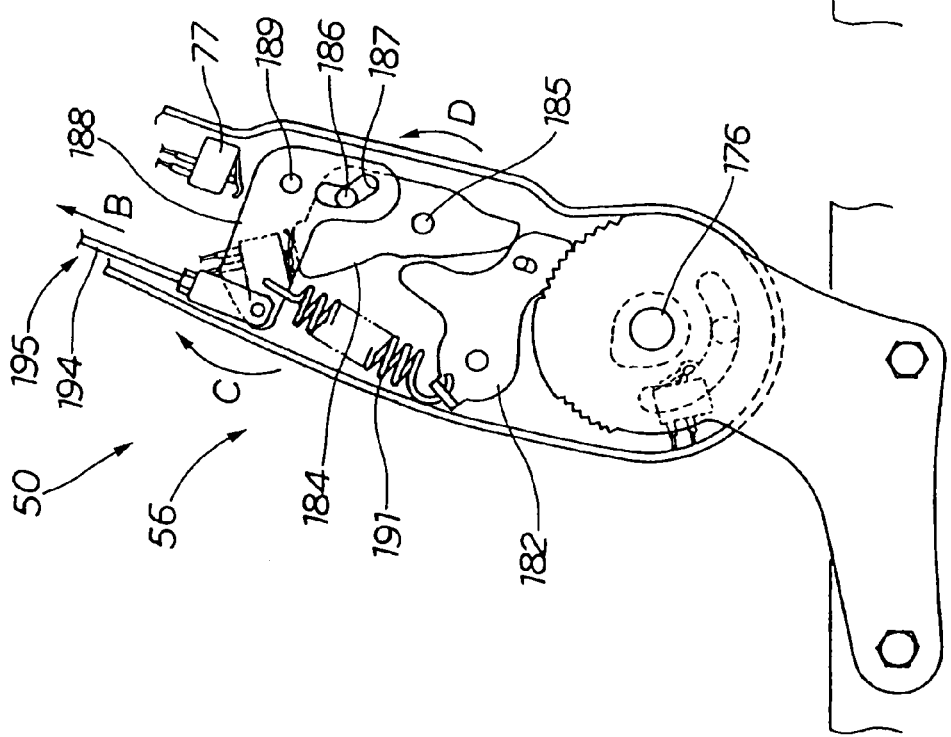
FIG. 25B is a second operation explanatory drawing explaining intermediate part of ST11 of the stowing operation of the electric vehicle seat stowing structure according to the invention.

FIGS. 25A, 25B are second operation explanatory diagrams which explain the stowing operation of the electric vehicle seat stowing structure according to the invention, the diagrams being such as to explain an intermediate part of the process in ST11.

In FIG. 25A, by pulling the second inner cable 208 (refer to FIG. 24B) of the second cable 201, the first inner cable 194 is pulled up as indicated by an arrow B via the connecting portion 200 shown in FIG. 15.

By pulling up the first inner cable 194 as indicated by an arrow B, the upper swing lever 188 is rotated around the upper pin 189 as indicated by an arrow C, whereby the operating pin 186 within the fitting hole 187 is moved by the upper swing lever 188, and the intermediate swing lever 184 is rotated about the intermediate pin 185 in a direction indicated by an arrow D.

In FIG. 25B, a distal end 184a of the intermediate swing lever 184 is disengaged from a distal end 182a of the lower swing lever 182, and a projection 182b of the lower swing lever 182 is pressed against by an intermediate cam surface 184b of the intermediate swing lever 184.

By pressing against the projection 182b of the lower swing lever 182, the lower swing lever 182 is rotated about the lower pin 183 as indicated by an arrow E, so that the lock gear 181 of the lower swing lever 182 is pushed upwardly.

By this operation, the mesh engagement of the lock gear 181 with the first gear 178 is released, whereby the locked state of the left locking mechanism 56 is released.

By releasing the locked state of the left locking mechanism 56, the plate 177 is made to fall forward about the rotational shaft portion 176 to the front of the vehicle body as indicated by an arrow F by virtue of the spring force of a spiral spring 243 provided on the left reclining adjuster 50.

As this occurs, the lock-off detection switch 77 is switched on by the upper swing lever 188.

Note that the spiral spring 243 is identical with springs used to fold forward a normal seat back, and therefore, the detailed description thereof will be omitted here.

Figure 26:
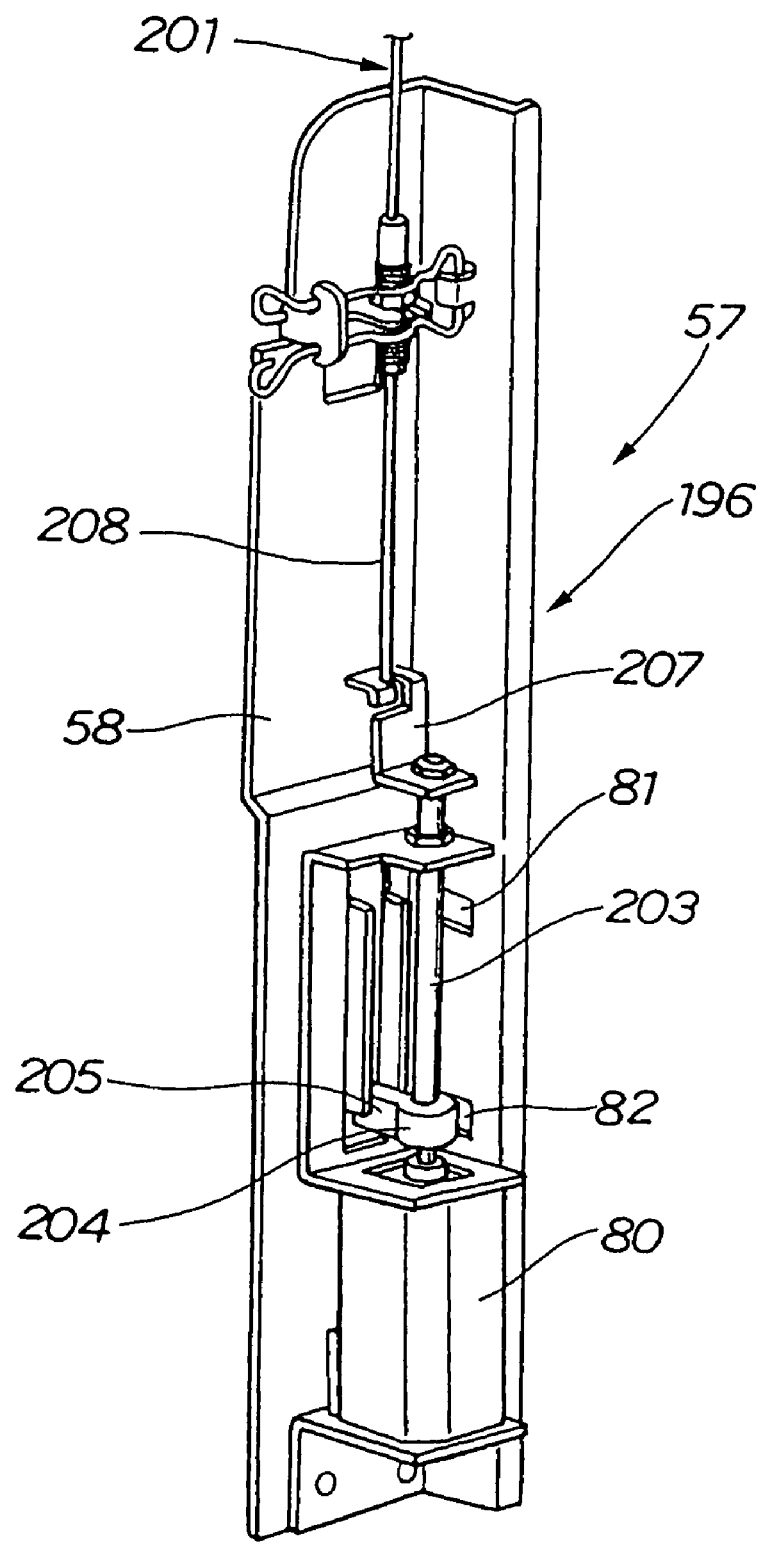
FIG. 26 is a third operation explanatory drawing explaining the stowing operation of the electric vehicle seat stowing structure according to the invention.

FIG. 26 is a third operation explanatory drawing which explains the stowing operation of the electric vehicle seat stowing structure according to the invention, the drawing being such as to explain the intermediate part of the process in ST11.

When the lock-off detection switch 77 shown in FIG. 25B is switched on, the control unit 42 detects that the lock-off switch 77 has been switched on, and the driving motor 80 of the left automatic lock release portion 196 is stopped.

By this operation, the second inner cable 208 of the second cable 201 is maintained as being pulled downwardly.

Note that should a failure occur in the lock-off detection switch 77, when the magnet 204 reaches the lower Hall sensor 82, the lower Hall sensor 82 detects the magnet 204, and the control unit 42 stops the driving motor 80 based on a detection signal of the lower Hall sensor 82.

By this operation, the excessive descend of the fluctuating shaft 203 can prevented to thereby protect the driving motor 80.

Figure 27A:
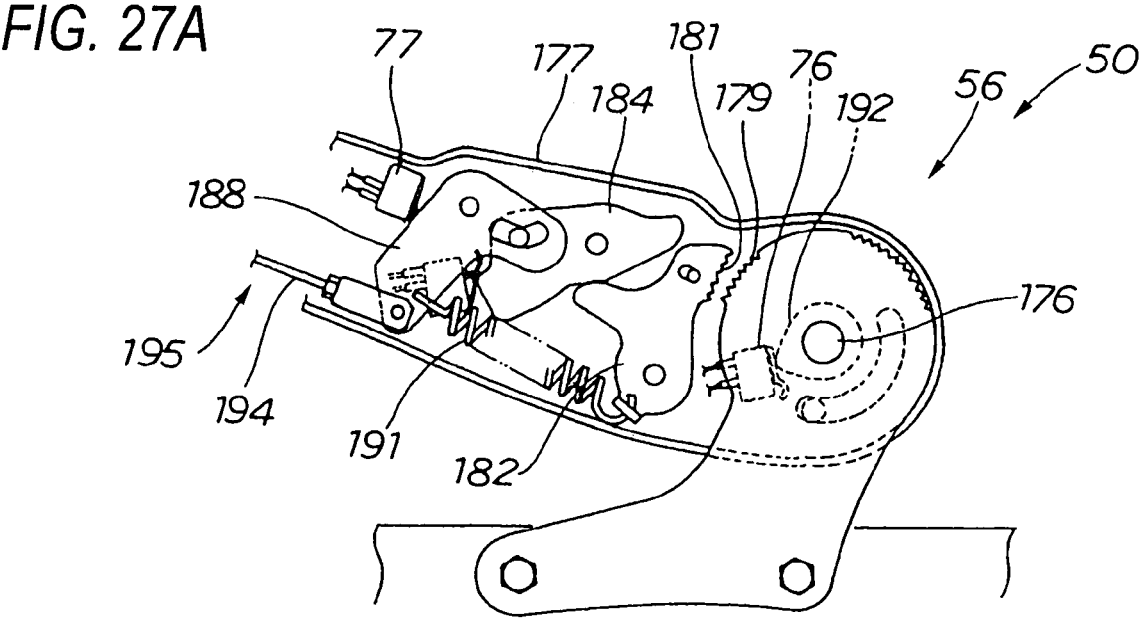
FIG. 27A is a fourth operation explanatory drawing explaining intermediate part of ST11 of the stowing operation of the electric vehicle seat stowing structure according to the invention.
Figure 27B:
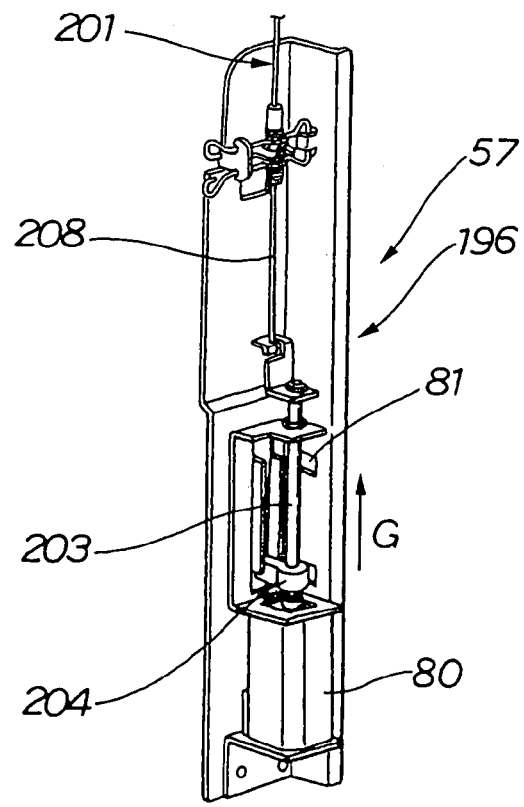
FIG. 27B is a fourth operation explanatory drawing explaining intermediate part of ST11 of the stowing operation of the electric vehicle seat stowing structure according to the invention.

FIGS. 27A, 27B are fourth operation explanatory diagrams which explain the stowing operation of the electric vehicle seat stowing structure according to the invention, the diagrams being such as to explain the intermediate part of the process in ST11.

In FIG. 27A, when the plate 177 has completely fallen forward, the fall-forward detection switch 76 is pushed by the cam 192 to thereby be turned on.

In FIG. 27B, the control unit 42 (refer to FIG. 3) detects that the fall-forward detection switch 76 shown in FIG. 27A has been switched on, and the driving motor 80 of the left automatic lock release portion 196 is driven, whereby the fluctuating shaft 203 is moved upwardly as indicated by an arrow G.

When the fluctuating shaft 203 ascends upwardly to a predetermined position and the magnet 204 has reached the upper Hall sensor 81, the upper Hall sensor 81 detects the magnet 204. The control unit 42 stops the driving motor 80 based on a detection signal from the upper Hall sensor 81.

By this operation, the downward tensile force of the second inner cable 208 of the second cable 201 is released.

Figure 28A:
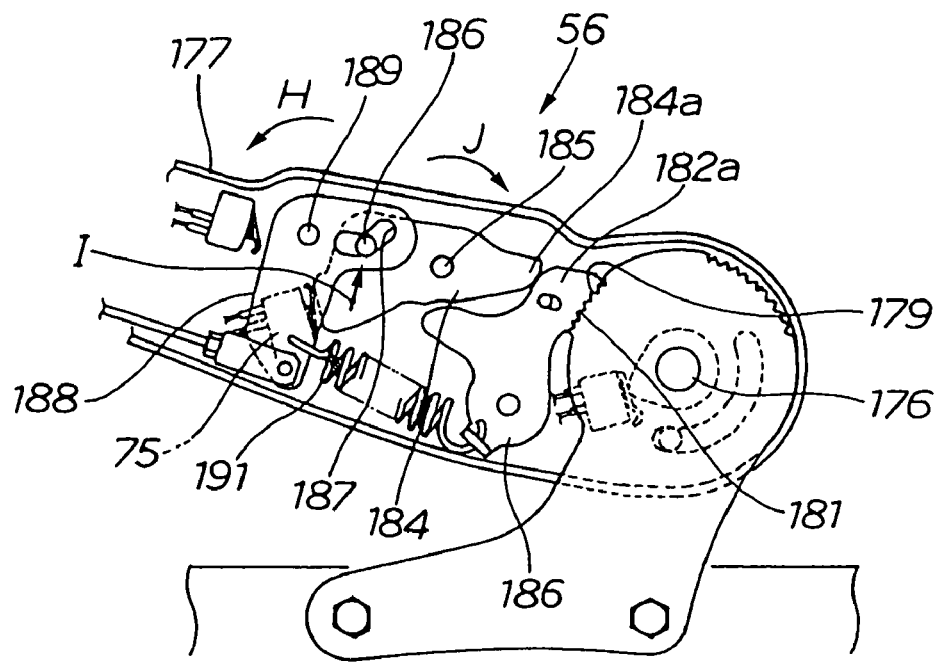
FIG. 28A is a fifth operation explanatory drawing explaining last half part of ST11 of the stowing operation of the electric vehicle seat stowing structure according to the invention.
Figure 28B:
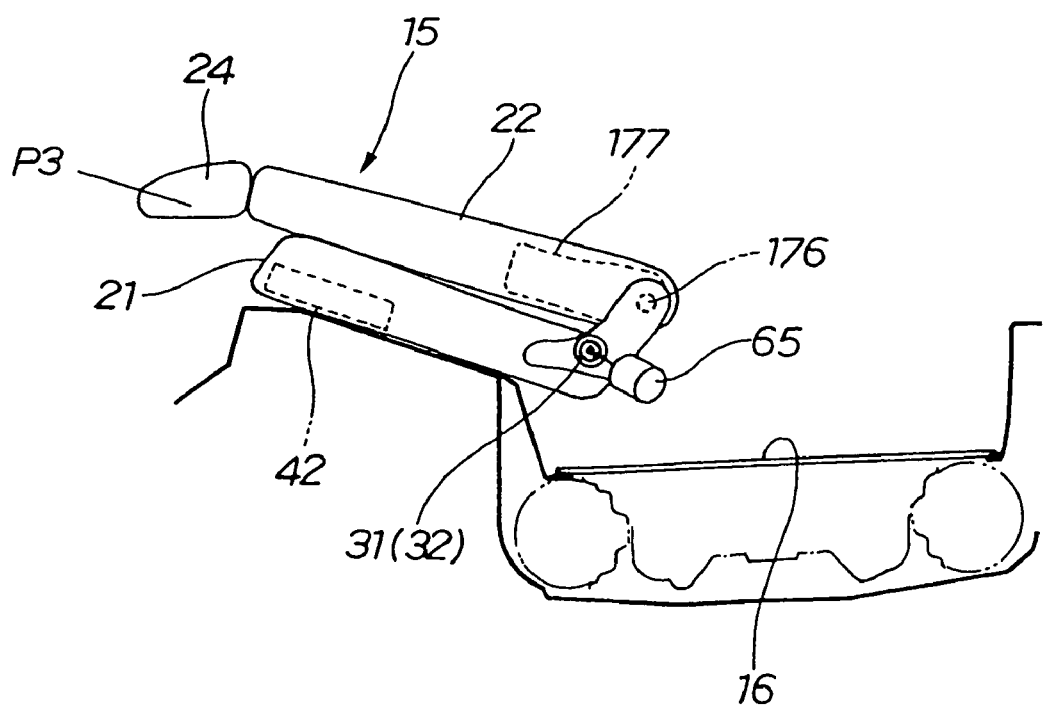
FIG. 28B is a fifth operation explanatory drawing explaining last half part of ST11 of the stowing operation of the electric vehicle seat stowing structure according to the invention.

FIGS. 28A, 28B are fifth operation explanatory diagrams which explain the stowing operation of the electric vehicle seat stowing structure according to the invention, the diagrams being such as to explain a latter half part of the process in ST11.

In FIG. 28A, by releasing the downward tensile force of the second inner cable 208 of the second cable 201, the upper swing lever 188 is made to rotate about the upper pin 189 as indicated by an arrow H by virtue of the spring force of the tension spring 191.

By this operation, the operating pin 186 within the fitting hole 187 is pressed against as indicated by an arrow I by the upper swing lever 188, whereby the intermediate swing lever 182 is made to rotate about the intermediate pin 185 as indicated by an arrow J, and the distal end 182a of the lower swing lever 182 is pushed downward by the distal end 184a of the intermediate swing lever 184.

By pressing against the distal end 182a of the lower swing lever 182, the lock gear 181 of the lower swing lever 182 is made to mesh with the second gear 179, whereby the left lock mechanism 56 is put in a locked state, and the plate 177 is held at the fall-forward position.

FIG. 28B illustrates a state in which the left seat back 22 is moved to the fall-forward position P3 together with the plate 177, so that the left seat back 22 is locked to the fall-forward position P3 by putting the left lock mechanism 56 (refer to FIG. 28A) in the locked state.

Returning to FIG. 28A, the lock-on detection switch 75 is switched on by rotating the intermediate pin 185 of the intermediate swing lever 184 as indicated by the arrow J.

Figure 29A:
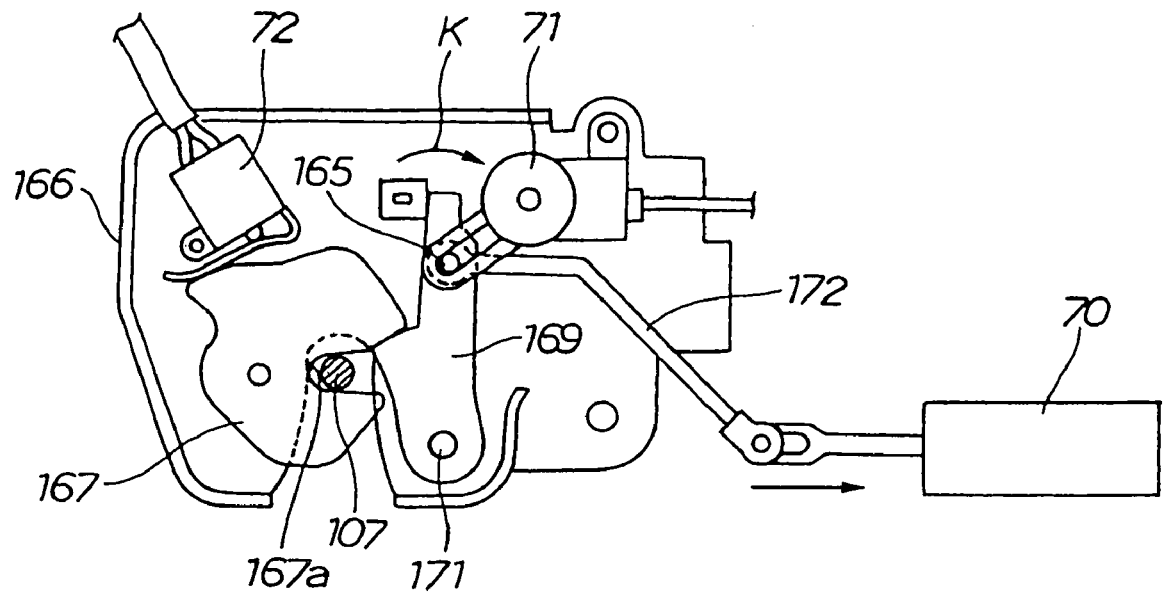
FIG. 29A is a sixth operation explanatory drawing explaining former half part of ST12 of the stowing operation of the electric vehicle seat stowing structure according to the invention.
Figure 29B:
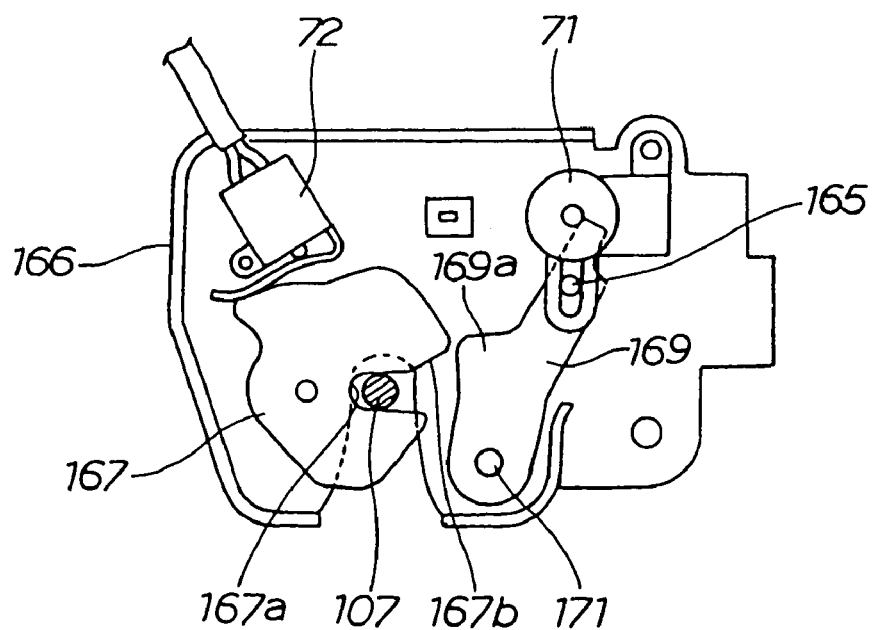
FIG. 29B is a sixth operation explanatory drawing explaining former half part of ST12 of the stowing operation of the electric vehicle seat stowing structure according to the invention.

FIGS. 29A, 29B are sixth operation explanatory diagrams which explain the stowing operation of the electric vehicle seat stowing structure according to the invention, the diagrams being such as to explain a first half part of the process in ST12.

In FIG. 29A, the control unit 42 (refer to FIG. 3) detects that the lock-on detection switch 75 (refer to FIG. 28A) has been switched on, and the cushion lock actuator 70 is activated to thereby move the operating rod 172 as indicated by an arrow.

By this operation, the ratchet 169 is swung about the ratchet pin 171 as indicated by an arrow K.

In FIG. 29B, a lock piece 169a of the ratchet 169 is disengaged from a lock pawl 167b of the latch 167 so as to release the lock of the latch 167. At the same time, the lock/release detection switch 71 is operated by the pin 165 so as to switch on the lock/release detection switch 71.

Figure 30A:
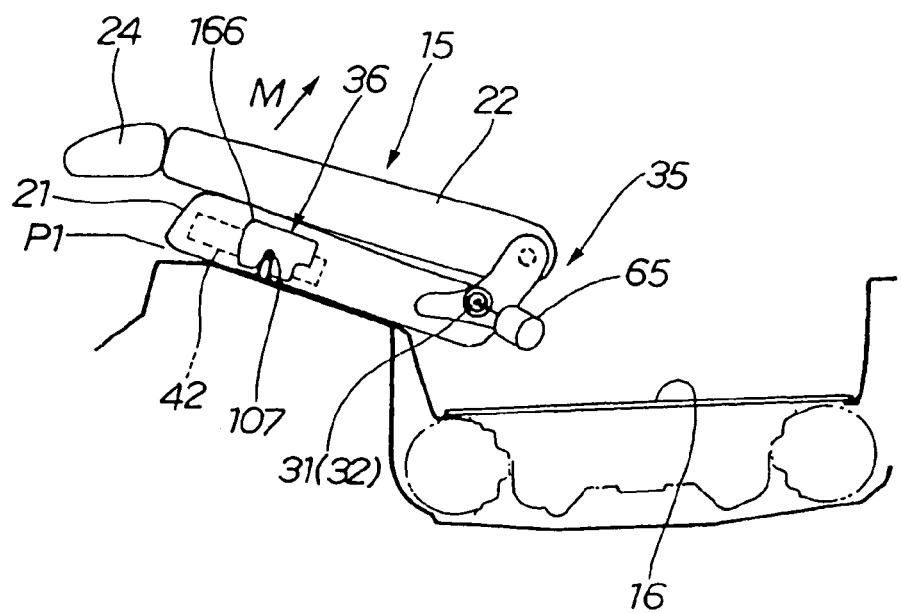
FIG. 30A is a seventh operation explanatory drawing explaining last half of ST12 of the stowing operation of the electric vehicle seat stowing structure according to the invention.
Figure 30B:
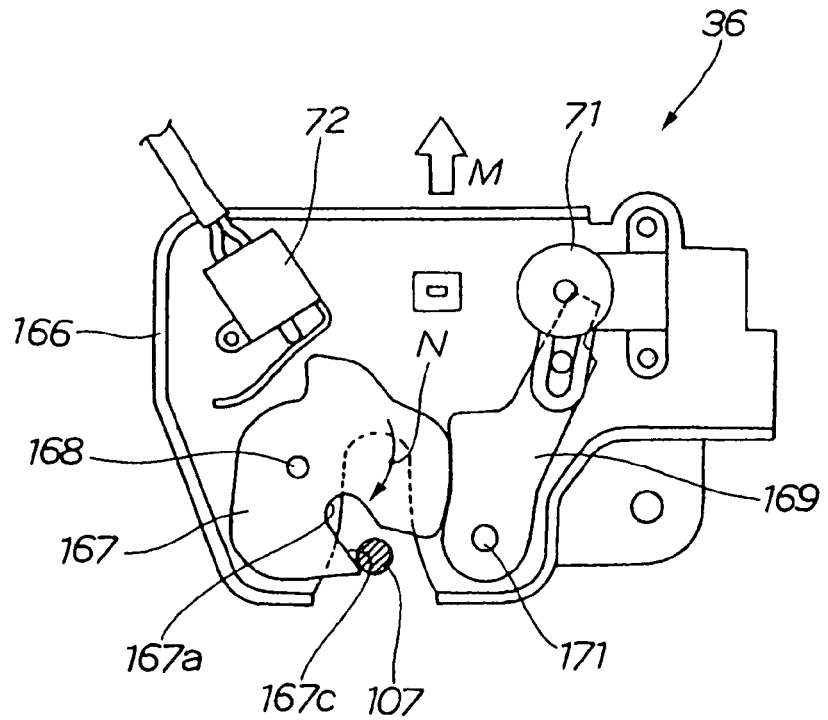
FIG. 30B is a seventh operation explanatory drawing explaining last half of ST12 of the stowing operation of the electric vehicle seat stowing structure according to the invention.

FIGS. 30A, 30B are seventh operation explanatory diagrams which explain the stowing operation of the electric vehicle seat stowing structure, the diagrams being such as to explain a latter half part of the process in ST12.

In FIG. 30A, the control unit 42 detects that the lock/release switch 71 (refer to FIG. 29A) has been switched on, and the control unit 42 stops the cushion lock actuator 70 (refer to FIG. 29A) and drives the cushion driving motor 65 of the swing drive mechanism 35.

In a state in which the cushion driving motor 65 is driven to thereby rotate the left support shaft 32 forward, and the left seat back is locked to the fall-forward position, the seat cushion 21 is swung from the seating position P1 to the rear of the vehicle body as indicated by an arrow M.

In FIG. 30B, as the bracket 166 of the left cushion lock mechanism 36 rises as indicated by an arrow m together with the seat cushion 21 (refer to FIG. 30A), the latch 167 provided on the bracket 166 rises.

Since the striker 107 is disposed within an engagement groove 167a in the latch 167, as the latch 167 rises, a lower side 167c of the engagement groove 167a interferes with the striker 107, whereby the latch 167 rotates about the latch pin 168 as indicated by an arrow N.

Figure 31A:
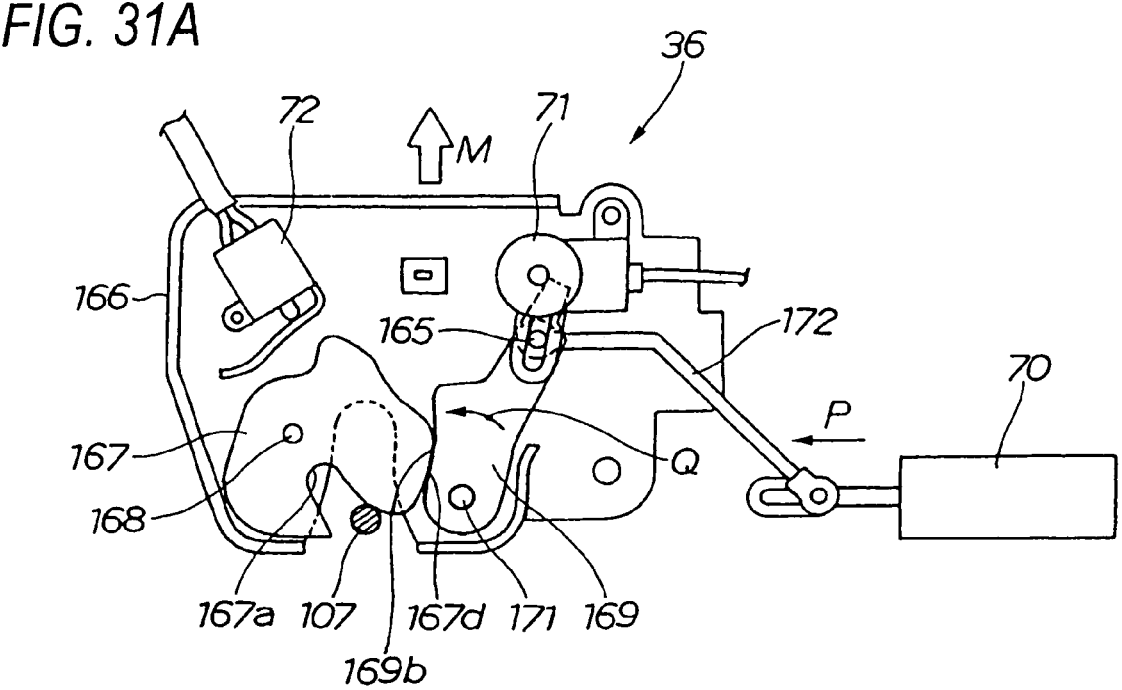
FIG. 31A is an eighth operation explanatory drawing explaining former half part of ST13 of the stowing operation of the electric vehicle seat stowing structure according to the invention.
Figure 31B:
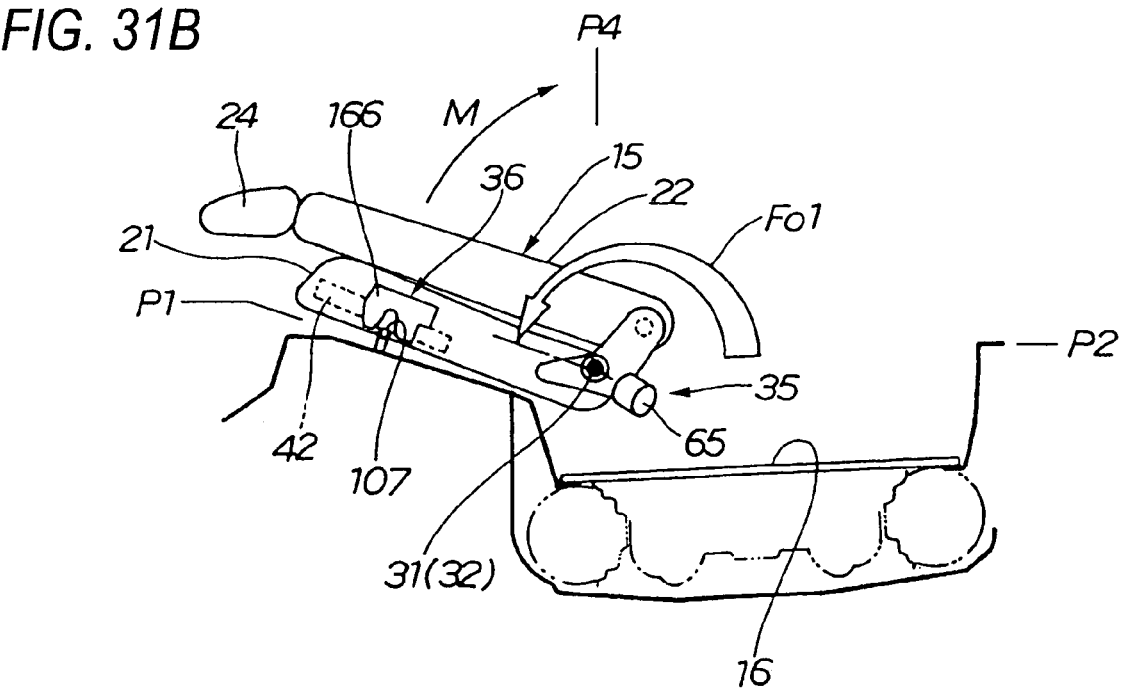
FIG. 31B is an eighth operation explanatory drawing explaining former half part of ST13 of the stowing operation of the electric vehicle seat stowing structure according to the invention.

FIGS. 31A, 31B are eighth operation explanatory diagrams which explain the stowing operation of the electric vehicle seat stowing structure according to the invention, the diagrams being such as to explain a first half part of the process in ST13.

In FIG. 31A, the latch switch 72 is switched on, and the striker 107 is dislocated from the engagement groove 167a of the latch 167, the lock of the left cushion lock mechanism 36 is released (is put to an unlocked state).

The control unit 42 (refer to FIG. 3) detects that the latch switch 72 has been switched on, and the control unit 42 activates the cushion lock actuator 70 so as to move the operating rod 172 as indicated by arrow P.

The ratchet 169 is swung about the ratchet pin 171 as indicated by an arrow Q, whereby a cam surface 169b of the ratchet 169 is pressed against a cam surface 137d of the latch 167.

By this operation, the latch 167 can be held at a position where the striker 107 has been disengaged from the engagement groove 167a.

In FIG. 31B, by releasing the lock of the left cushion lock mechanism 36, the seat cushion 21 can continue to be swung about the left and right support shafts 31, 32 to the rear of the vehicle body as indicated by an arrow M.

As this occurs, the control unit 42 detects a motor current of the cushion driving motor 65 and determines whether or not a detection value exceeds a threshold value.

Should the seat cushion 21 interfere with an obstacle (not shown), whereby the motor current value exceeds the threshold, the cushion driving motor 65 is stopped.

On the other hand, in the event that the seat cushion 21 does not interfere with the obstacle, since the motor current value is smaller than the threshold, the seat cushion 21 can continue to be swung to the rear of the vehicle body as indicated by an arrow M.

Here, as shown in FIG. 5, by additionally providing the spring 121 on the right support shaft 32, the repulsive force of the spring 121 increases gradually as indicated by the arrow Fo1 as the seat cushion 21 moves from the seating position P1 to the stowing position P2.

Consequently, the repulsive force Fo1 of the spring is small within a range where the seat cushion 21 moves from a position in the vicinity of the seating position P1 to a vertical position P4.

By this construction, the seat cushion 21 can smoothly be swung from the seating position P1 to the rear of the vehicle as indicated by the arrow M by the cushion driving motor 65.

Figure 32A:
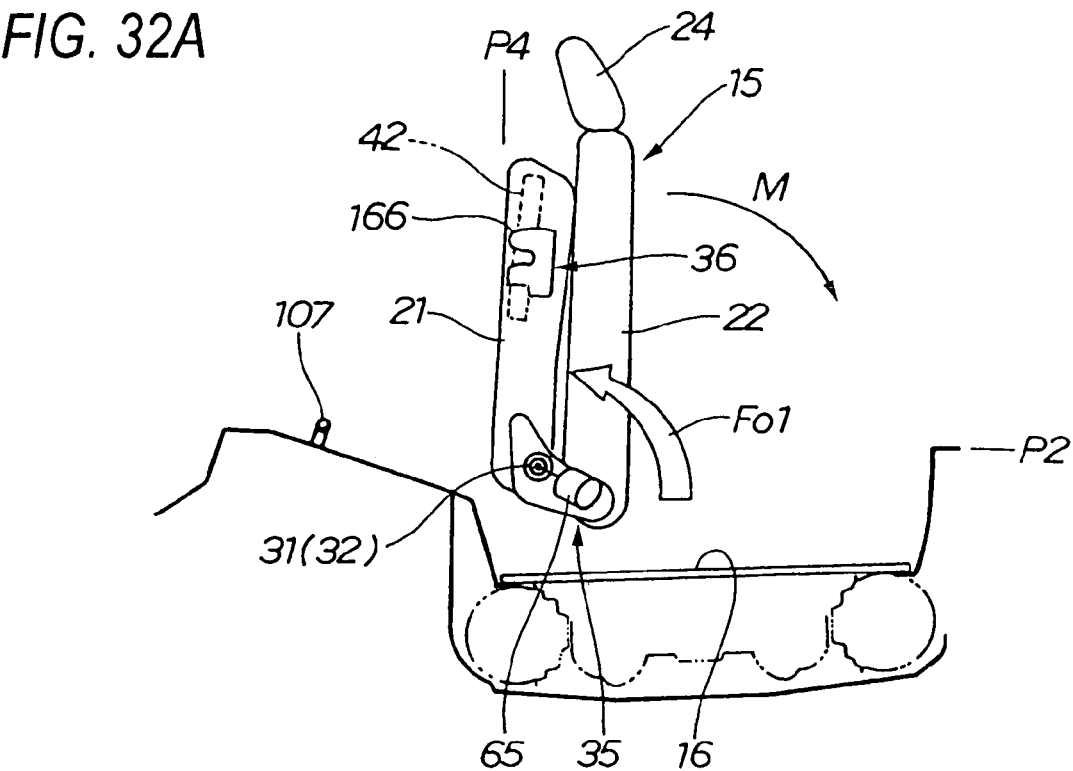
FIG. 32A is a ninth operation of explanatory drawing explaining first last half part of ST13 the stowing operation of the electric vehicle seat stowing structure according to the invention.
Figure 32B:
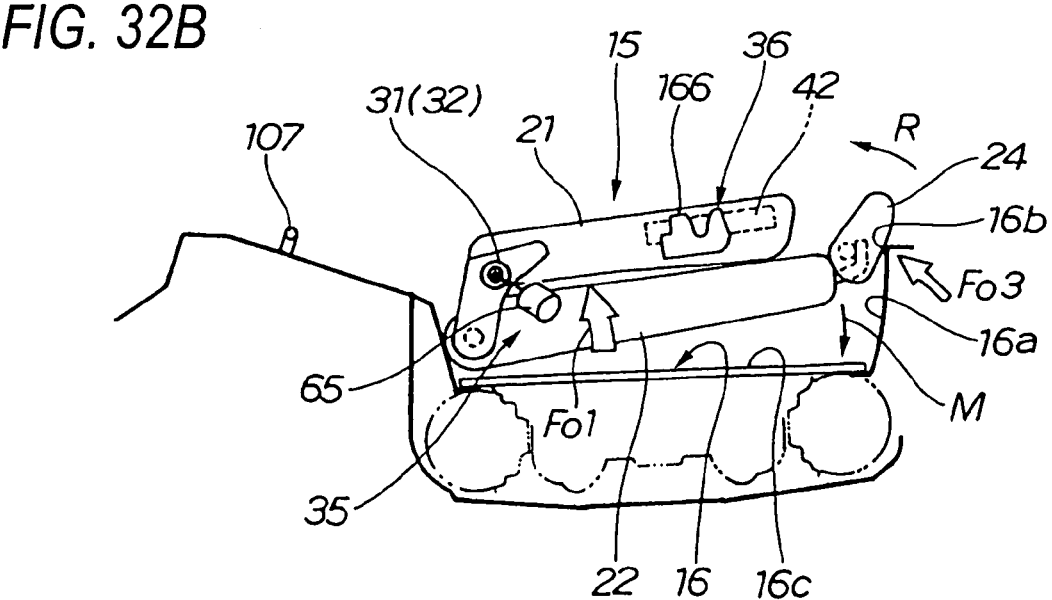
FIG. 32B is a ninth operation explanatory drawing explaining second last half part of ST13 of the stowing operation of the electric vehicle seat stowing structure according to the invention.

FIGS. 32A, 32B are ninth operation explanatory diagrams which explain the stowing operation of the electric vehicle seat stowing structure according to the invention, the diagrams being such as to explain a latter half part of the process in ST13.

In FIG. 32A, the seat cushion 21 is swung to the vertical position P4, and then the seat cushion 21 continues to be swung from the vertical position P4 to the rear of the vehicle body as indicated by an arrow M.

Here, while the seat cushion 21 stays within a range from the vertical position P4 to the stowing position P2, the weights of the seat cushion 21 and the left seat back 22 are applied to a direction in which the seat cushion 21 is swung.

On the other hand, by additionally providing on the right support shaft 32 the spring 121 (refer to FIG. 5) whose repulsive force Fo1 increases as the seat cushion 21 moves towards the stowing position P2, the repulsive force Fo1 of the spring 121 is secured relatively large which results when the seat cushion 21 continues to be swung over the vertical position P4 to the stowing position P2.

Consequently, the weights of the seat cushion 21 and the left seat back 22 can be offset by the repulsive force Fo1 of the spring 121.

By this construction, the seat cushion 21 can smoothly be swung from the vertical position P4 to the stowing position P2 as indicated by the arrow M.

In FIG. 32B, the seat cushion 21 is smoothly swung to the rear of the vehicle body so as to be stowed in the floor recessed stowing portion 16. As this occurs, a rear side of the left head restraint 24 is brought into abutment with an upper end 16b of a rear wall 16a which constitutes the floor recessed stowing portion 16.

By this construction, a load Fo3 is exerted on the rear side of the left head restraint 24 as indicated by an arrow, and the left head restraint 24 is folded up as indicated by an arrow R against the spring force of a spring (not shown) for supporting the head restraint 24.

In this state, the seat cushion 21 continues to be swung to the rear of the vehicle as indicated by an arrow M.

FIG. 33 is a tenth operation explanatory diagram showing the stowing operation of the electric vehicle seat stowing structure according to the invention, the diagram being such as to explain ST14.

The seat cushion 21 is brought into abutment with a bottom surface 16c of the floor recessed stowing portion 16. The current value of the cushion driving motor 65 exceeds the threshold, and the cushion driving motor 65 is stopped.

By this operation, the stowing process of the seat cushion 21 and the left seat back 22 (the second rear seat 15) in the floor recessed stowing portion 16 is completed.

Next, a restoring operation of the electric vehicle seat stowing structure 20 will be described with reference to FIGS. 34 to 37.

Figure 34:
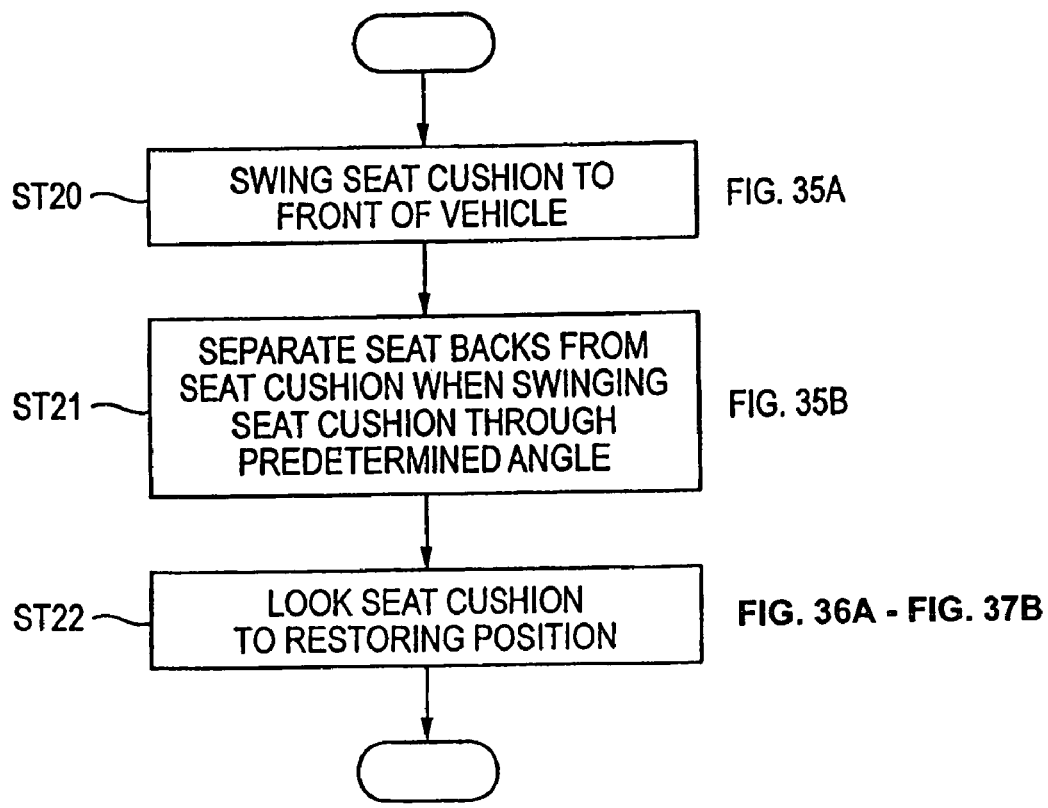
FIG. 34 is a flowchart explaining a restoring operation of the electric vehicle seat stowing structure according to the invention.

FIG. 34 is a flowchart which explains a restoring operation of the electric vehicle seat stowing structure according to the invention.

ST20: The tailgate is opened, and the seat operating button is depressed so as to switch on the restoring switch, whereby the seat cushion is swung to the front of the vehicle body.

ST21: As the seat cushion is swung to the front of the vehicle body through a predetermined angle, the seat back is separated apart from the seat cushion.

ST22: The seat cushion is locked to the restoring position.

The details of ST20 to ST22 will be described below.

Figure 35A:
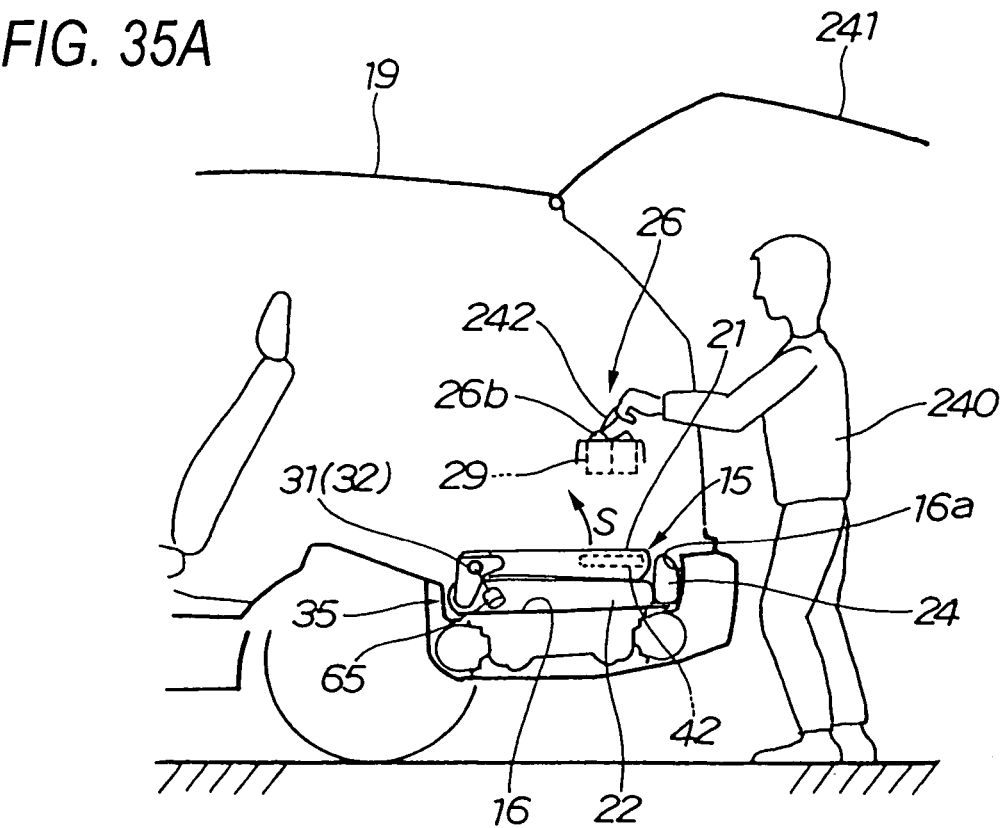
FIG. 35A is a first operation explanatory drawing explaining the restoring operation of the electric vehicle seat stowing structure according to the invention.
Figure 35B:
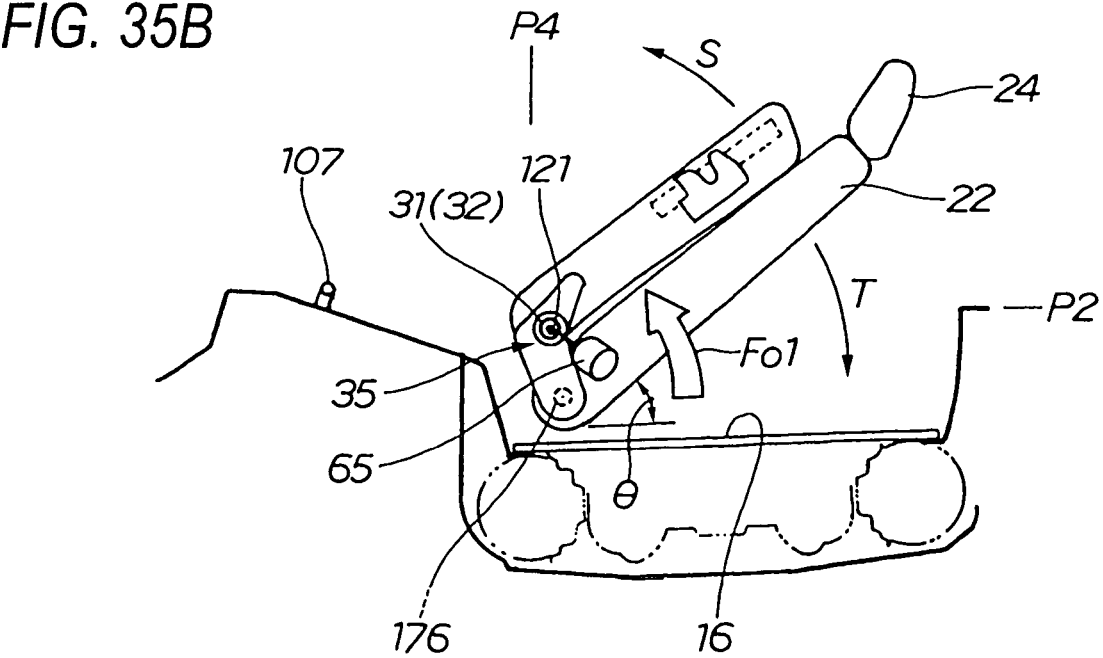
FIG. 35B is a first operation explanatory drawing explaining the restoring operation of the electric vehicle seat stowing structure according to the invention.

FIGS. 35A, 35B first operation explanatory diagrams which explain the restoring operation of the electric vehicle seat stowing structure according to the invention, in which FIG. 35A describes ST20, whereas FIG. 35B describes ST21.

In FIG. 35A, the user 240 opens upwardly the tailgate 241 provided at the rear of the vehicle body 19. The tailgate opening switch (not shown) is switched on by the opening of the tailgate.

Next, the restoration operating part 26b of the seat operating button 26 provided rearward of the second rear seat 15 is depressed with the finger so as to turn on the restoring switch 29.

After the control unit 42 has detected that the tailgate opening switch is on, the cushion driving motor 65 (refer to FIGS. 2, 3, as well) of the swing drive mechanism 35 is driven.

By this operation, the cushion drive motor 65 is driven, whereby the seat cushion 21 is swung about the left and right support shafts 31, 32 to the front of the vehicle body as indicated by an arrow S together with the left seat back 22 so as to be taken out of the floor recessed stowing portion 16.

The left head restraint 24 is released from the rear wall 16a of the floor recessed stowing portion 16 by taking out the seat cushion 21 from the floor recessed stowing portion 16 together with the left seat back 22.

The left head restraint 24 is restored to an in-use position (refer to FIG. 35B) by a spring (not shown) which support it.

In FIG. 35B, as the seat cushion 21 is swung to the front of the vehicle body only through a predetermined angle θ, the left seat back 22 is separated apart from the seat cushion 21.

Namely, the mesh engagement of the lock gear 181 of the lower swing lever 182 with the second gear 179 is released, whereby the left seat back 22 descends by its own weight as indicated by an arrow T about the rotational shaft portion 176.

Here, as has been described with reference to FIG. 32, by additionally providing on the right support shaft 32 the spring 121 (refer to FIG. 5) whose repulsive force Fo1 increases as the seat cushion 21 moves toward the stowing position P2, the repulsive force Fo1 of the spring 121 can be secured relatively large which results when the seat cushion 21 is swung over the vertical position P4 to the stowing position P2.

Due to this, when the seat cushion 21 is swung from the stowing position P1 to the vertical position P4, the weight of the seat cushion 21 and the left seat back 22 can be offset with the repulsive force Fo1 of the spring 121.

By this construction, the seat cushion 21 can smoothly be swung from the stowing position P2 to the vertical position P4 as indicated by an arrow S.

Figure 36A:
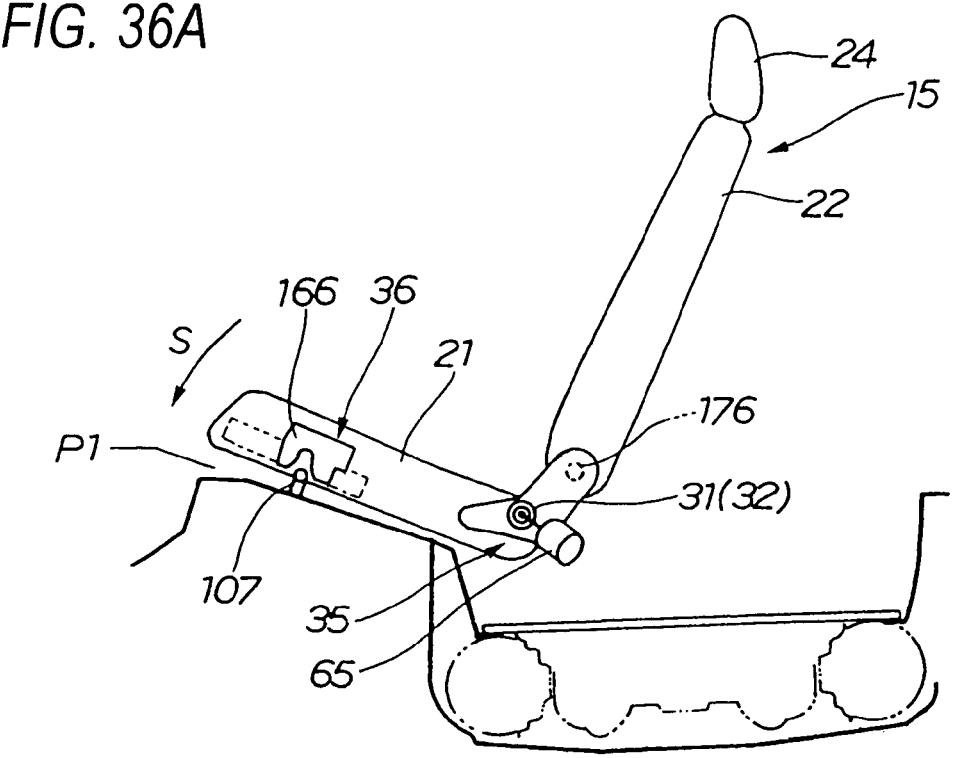
FIG. 36A is second operation explanatory drawing explaining the restoring operation of the electric vehicle seat stowing structure according to the invention.
Figure 36B:
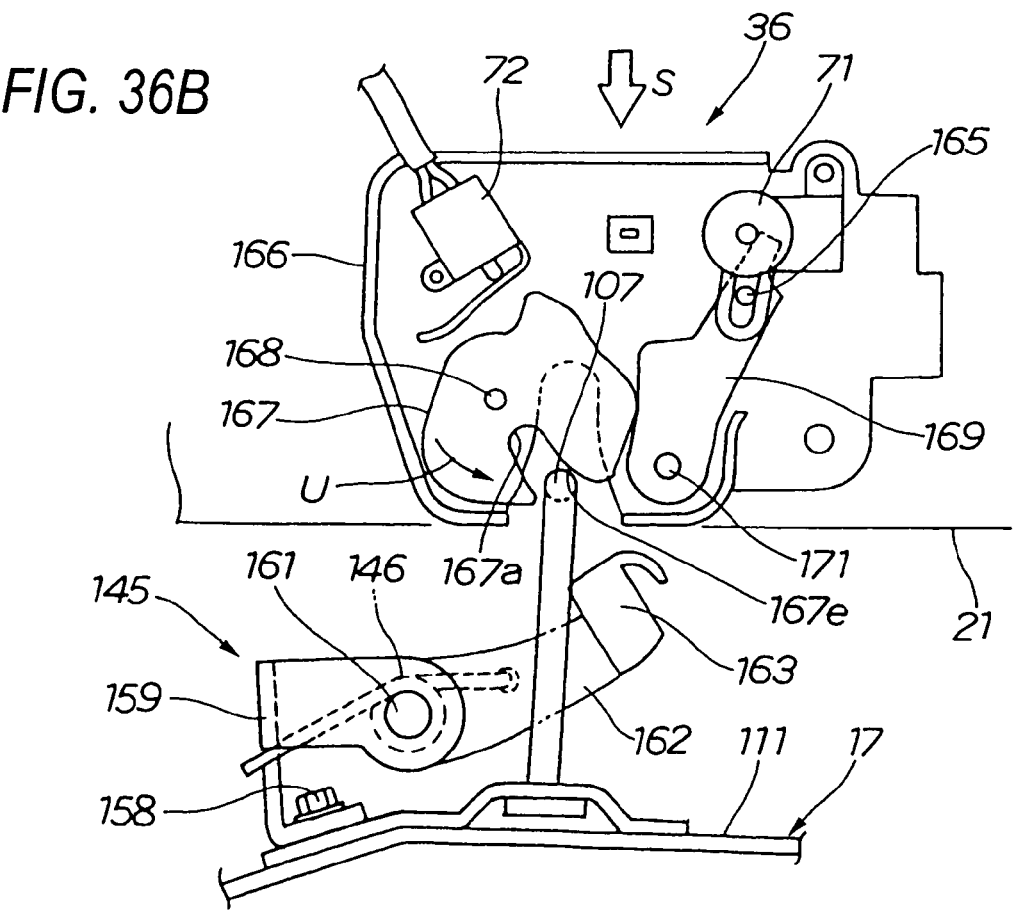
FIG. 36B is second operation explanatory drawing explaining the restoring operation of the electric vehicle seat stowing structure according to the invention.

FIGS. 36A, 36B are second explanatory diagrams which explain the restoring operation of the electric vehicle seat stowing structure according to the invention, the diagrams being such as to explain a first half part of the process in ST22.

In FIG. 36A, when the seat cushion 21 is swung toward the front of the vehicle as indicated by an arrow S, the seat cushion approaches the seating position P1.

In FIG. 36B, an upper side 167e of the engagement groove 167a of the latch 167 is brought into abutment with the striker 107.

In this state, the bracket 166 and the latch 167 of the left cushion lock mechanism 36 descend together with the seat cushion 21 (refer to FIG. 36A, as well) as indicated by an arrow S, whereby the upper side 167e of the engagement groove 167a is pushed up by the striker 107, and the latch 167 rotates about the latch pin 168 as indicated by an arrow U.

Figure 37A:
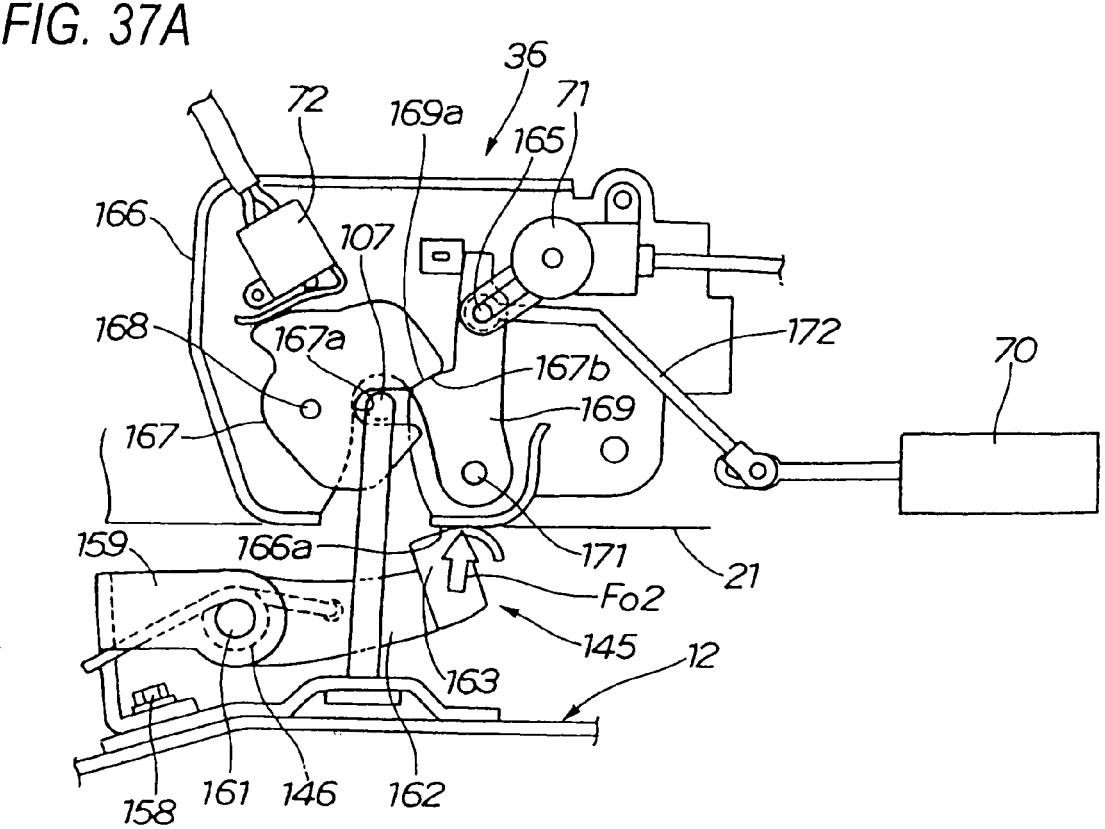
FIG. 37A is a third operation explanatory drawing explaining the restoring operation of the electric vehicle seat stowing structure according to the invention.
Figure 37B:
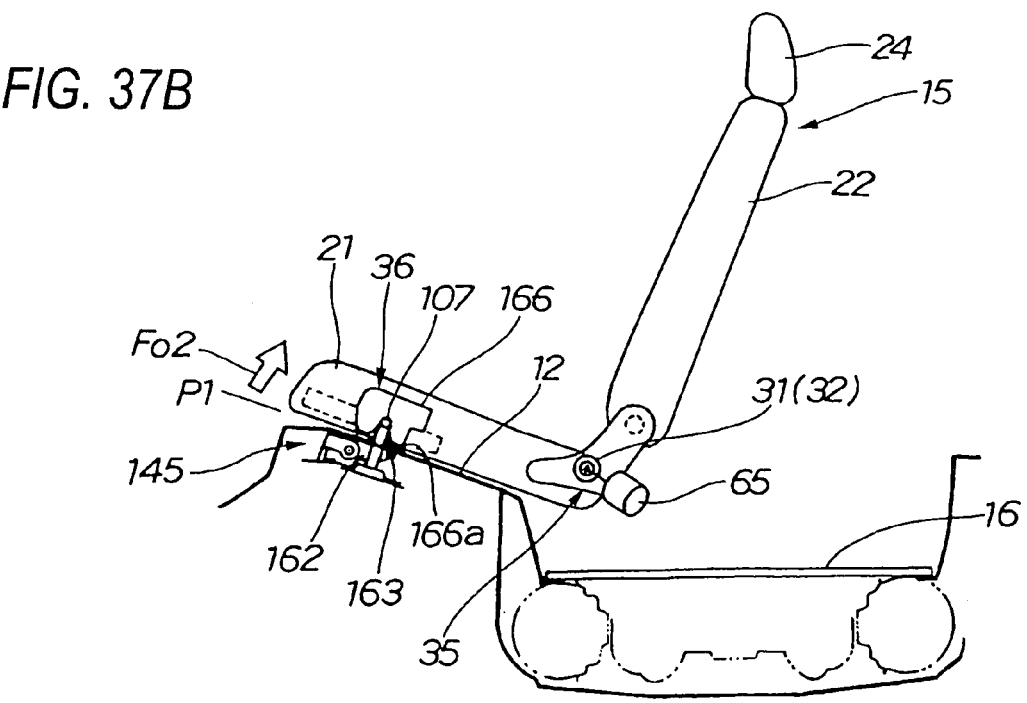
FIG. 37B is a third operation explanatory drawing explaining the restoring operation of the electric vehicle seat stowing structure according to the invention.

FIGS. 37A, 37B are third operation explanatory diagrams which explain the restoring operation of the electric vehicle seat stowing structure according to the invention, the diagrams being such as to explain a latter half part of the process in ST22.

In FIG. 37A, the seat cushion 21 is restored to the seating position P1 (refer to FIG. 37B), the latch 167 is returned to the lock position, and the latch switch 72 is turned off.

The control unit 42 shown in FIG. 37B detects that the latch switch 72 has been turned off and stops the cushion driving motor 65 (refer to FIGS. 2, 3, as well) of the swing drive mechanism 35.

By this operation, the restoring operation of the second rear seat 15 is completed.

Thus, according to the electric vehicle seat stowing structure 20, the second rear seat 15 can be stowed in the floor recessed stowing portion 16 and can restore the same structure to the in-use position from the floor recessed stowing portion 16 in an electric fashion.

Here, when the seat cushion 21 is restored to the seating position P1, the seat cushion 21, or, to be specific, a lower-portion 166a of the bracket 166 is brought into the distal end portion 163 of the push-up member 162 which constitutes the left seat cushion push-up member 145.

However, since the distal end portion 163 of the push-up member 162 is supported by the spring of the lift-up spring 146, when the seat cushion 21 is brought into abutment with the distal end portion 163 of the push-up member 162, a force exerted on the distal end portion 163 of the push-up member 162 can be absorbed by an elastic displacement of the lift-up spring 146.

By this construction, when the seat cushion 21 is restored to the seating position P1, the application of a relatively large magnitude of force to the floor 12 can be prevented.

In addition, the spring force Fo2 of the lift-up spring 146 is applied in a direction as indicated by an arrow through the abutment of the distal end portion 163 of the push-up member 162 with the lower portion 166a of the bracket 166, and seat cushion 21 is pushed up so as to be separated apart from the floor with this spring.

Consequently, even in a case where no occupant is seated in the seat cushion 21, the latch 167 and the striker 107 are made to lock together in an ensured fashion, whereby, as an example, the looseness between the latch 167 and the left striker 107 can be eliminated.

In FIG. 37B, since the state where the seat cushion 21 is held at the seating position P1 can be maintained, the generation of vibration noise can be prevented which would otherwise result from the interference of the latch 167 (refer to FIG. 37B) and the left striker 107 while the vehicle is running.

Note that while, in the embodiment that has been described heretofore, an example of the assembling method of the electric vehicle seat stowing structure 20 has been described with reference to FIGS. 17 to 22, it is possible to adopt an assembling method that will be described below.

Figure 38A:
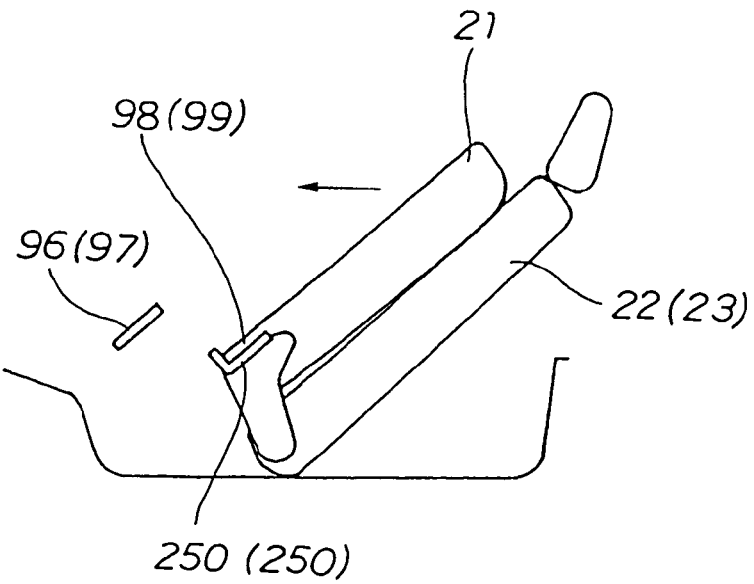
FIG. 38A is a drawing explaining another assembling example of the electric vehicle seat stowing structure according to the invention.
Figure 38B:
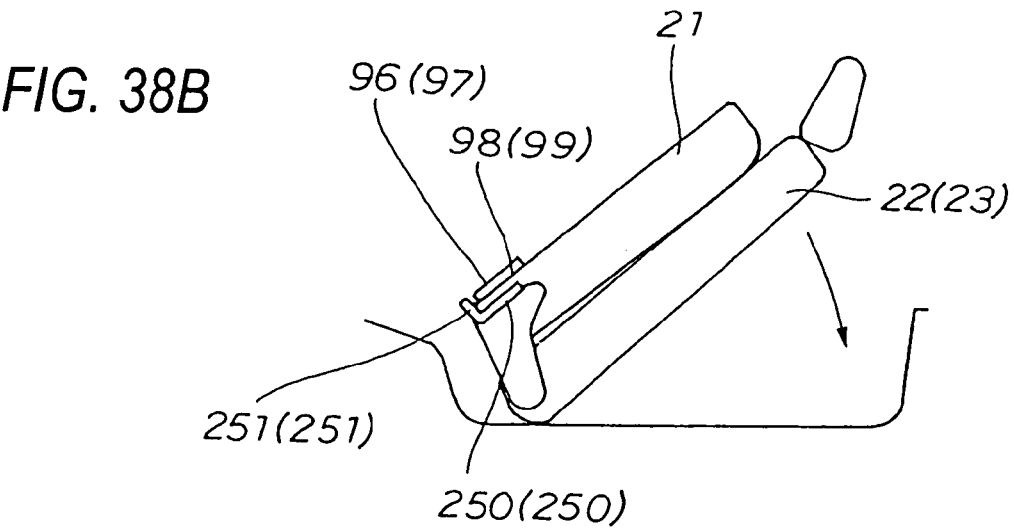
FIG. 38B is a drawing explaining another assembling example of the electric vehicle seat stowing structure according to the invention.
Figure 38C:
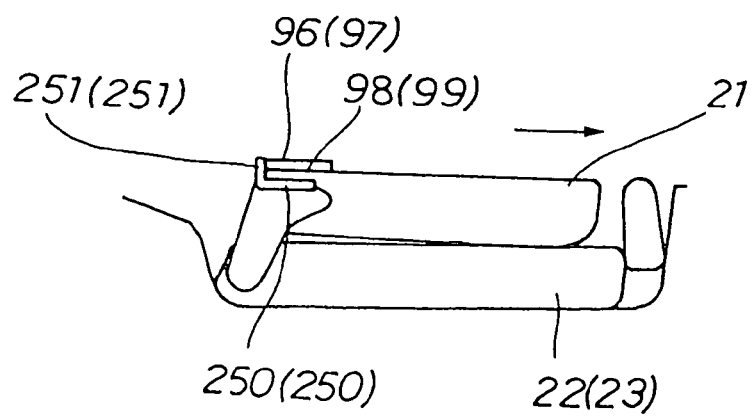
FIG. 38C is a drawing explaining another assembling example of the electric vehicle seat stowing structure according to the invention.
Figure 39:
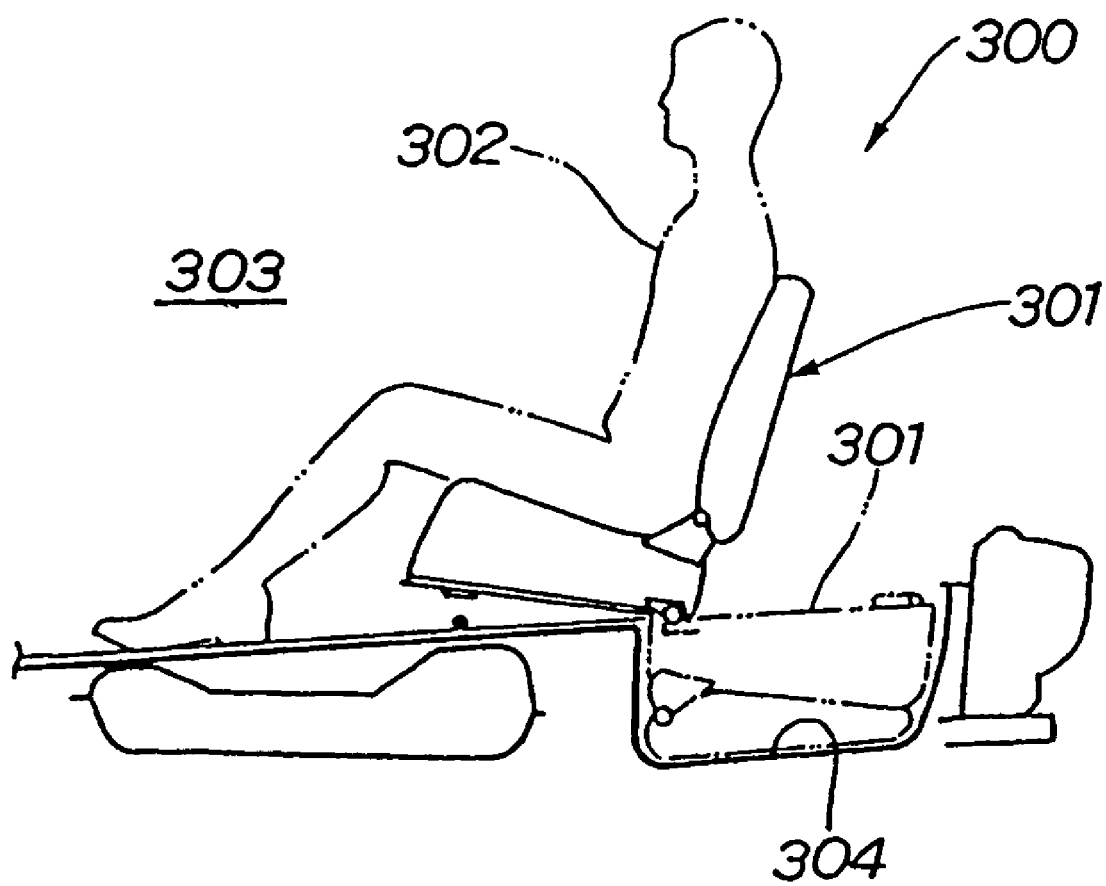
FIG. 39 is a cross-sectional view shown as FIG. 3 in a cited Japanese Utility Model Unexamined Publication JP-UM-5-40029 and FIG. 40A is a drawing explaining the function of a conventional vehicle seat stowing structure.
Figure 40A:
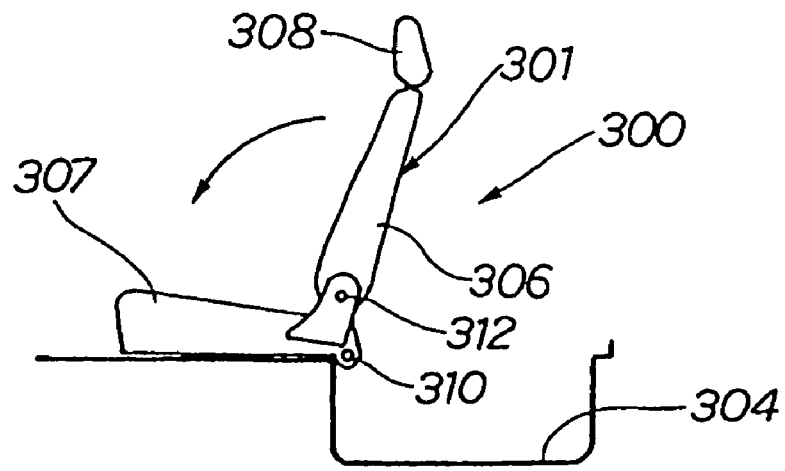
Figure 40B:
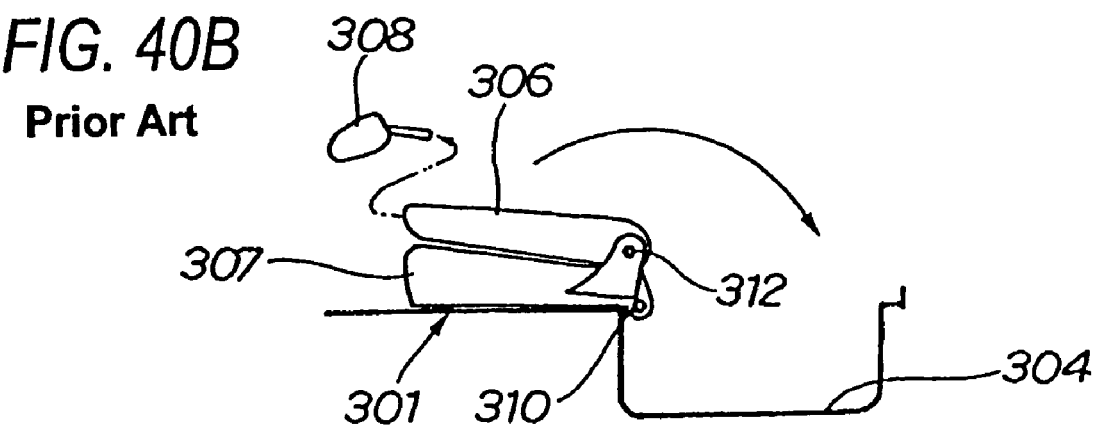
FIG. 40B is a drawing explaining the function of a conventional vehicle seat stowing structure.
Figure 40C:
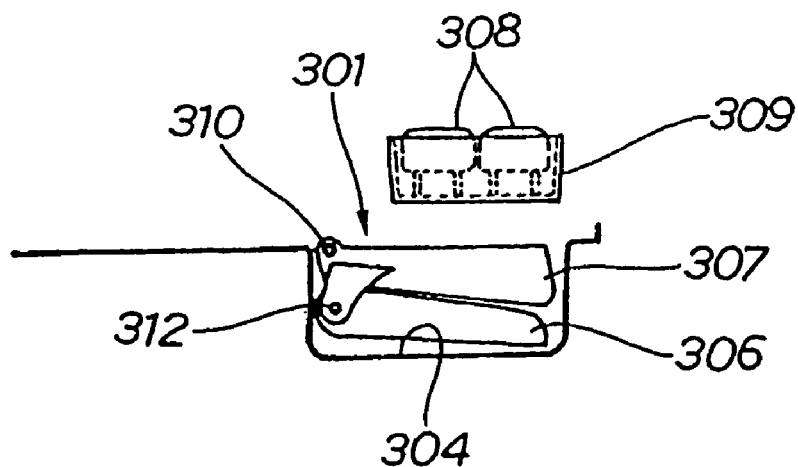
FIG. 40C is a drawing explaining the function of a conventional vehicle seat stowing structure.

FIGS. 38A to 38C are explanatory diagrams which explain another example of assembling the electric vehicle seat stowing structure according to the invention.

In FIG. 38A, left and right L-shaped brackets 250, 250 are attached to the left and right bottom portions 98, 99 of the seat cushion 21, respectively.

The left and right seat backs 22, 23 are folded over the seat cushion 21, and the seat cushion 21 is inclined through a predetermined angle, in which condition, lower end portions of the left and right seat backs 22, 23 are placed on the bottom portion of the floor recessed stowing portion 16.

In this state, the seat cushion 21 moves in a direction indicated by an arrow. Here, the left and right mounting plates 96, 97 are set in a state where they are inclined through a predetermined angle.

In FIG. 38B, the left and right mounting plates 96, 97 (refer to FIG. 20 as well) are brought into abutment with the left and right bottom portions 98, 99 of the seat cushion 21, respectively.

In this state, with locking pawls 251, 251 of the left and right L-shaped brackets 250, 250 being locked to the left and right mounting plates 96, 97, the distal end portion of the seat cushion is swung downwardly as indicated by an arrow.

In FIG. 38C, the seat cushion 21 and the left and right seat backs 22, 23 are received in the floor recessed stowing portion 16, and the left and right bottom portions 98, 99 of the seat cushion 21 are made to face upwardly.

As this occurs, the left and right mounting plates 96, 97 are guided by the locking pawls 251, 251 of the left and right L-shaped brackets 250, 250 and follow the motion of the seat cushion 21 while abutting with the left and right bottom portions 98, 99 of the seat cushion 21.

Consequently, the state is maintained where the left and right bottom portions 98, 99 of the seat cushion 21 are press secured to the left and right mounting plates 96, 97.

After the seat cushion 21 has been stowed in the floor recessed stowing portion 16 in such a manner that the left and right bottom portions 98, 99 of the seat cushion 21 are made to face upwardly, the seat cushion 21 is pulled to the rear of the vehicle body as indicated by an arrow, so that the locking pawls 251, 251 of the left and right L-shaped brackets 250, 250 are locked to the left and right mounting plates 96, 97, respectively, in an ensured fashion.

By this construction, the seat cushion 21 is positioned relative to the left and right mounting plates 96, 97, and threaded holes (not shown) in the seat cushion 21 are aligned with the mounting holes 96b . . . , 97b . . . in the mounting plates 96, 97 (refer to FIGS. 21A, 21B) In this state, the left and right mounting plates 96, 97 can be attached to the left and right bottom portions 98, 99 of the seat cushion 21, respectively, by screwing the mounting bolts 101 . . . (refer to FIGS. 22B, 22C) into the threaded holes in the seat cushion 21 via the mounting holes 96b . . . , 97b . . .

Thus, the mounting bolts 101 . . . can be screwed into the seat cushion 21 from above while maintaining the state where the left and right bottom portions 98, 99 of the seat cushion 21 are press secured to the left and right mounting plates 96, 97.

Consequently, even with this assembling method being adopted for the electric vehicle seat stowing structure 20, as with the method for assembling the electric vehicle seat stowing structure 20 shown in FIGS. 17 to 22, the mounting operation of the left and right mounting plates 96, 97 to the left and right bottom portions 98, 99 of the seat cushion 21 can be implemented with ease without spending much time.

Furthermore, while, in the embodiment, the example has been described where the electric vehicle seat stowing structure 20 is applied to the vehicle whose riding capacity ranges from 6 to 7 occupants, the invention is not limited thereto, and the electric vehicle seat stowing structure 20 can be applied to a vehicle whose riding capacity ranges 4 to 5 occupants, as well.

In addition, while, in the embodiment, the example has been described where the left and right lock release mechanisms 57, 62 are installed in the left and right seat backs 22, 23, the invention is not limited thereto, and the left and right lock release mechanisms 57, 62 can be installed in the seat cushion 21.

Furthermore, while, in the embodiment, the example has been described where the swing drive mechanism 35 is provided on the left-hand side of the floor 12, whereas the mounting member 33 is provided on the right-hand side of the floor 12, the invention is not limited thereto, and on the contrary, the swing drive mechanism 35 can be provided on the right-hand side of the floor 12, whereas the mounting member 33 can be provided on the left-hand side of the floor 12.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

With the aforesaid construction, the invention provides the following advantages.

According to the first aspect of the invention, the group of reduction gears is disposed on the gear case or the bracket, and the actuator is disposed on the side of the gear case or the bracket.

Consequently, the protrusion of the swing drive mechanism into the cargo space provided behind the seat cushion can be prevented.

By this construction, the cargo space can be secured largely, and the cargo space can be used effectively by allowing it to satisfy various applications, thereby making it possible to improve the convenience in handling.

According to the second aspect of the invention, the swing drive mechanism is mounted on the rear member which reinforces the floor, whereby, even if a relatively large magnitude of force is exerted on the swing drive mechanism so mounted, the seat cushion can smoothly be swung between the seating position and the stowing position while preferably maintaining the mounting accuracy of the swing drive mechanism.

In addition, the strikers are mounted on the rear members which reinforces the floor, whereby even if a relatively large magnitude of force is applied to the strikers, the seat cushion can be locked to the seating position in an ensured fashion while maintaining the mounting accuracy of the strikers.

According to the third aspect of the invention, the reinforcing cross member is disposed on the floor in the vicinity of the strikers, and the end portions of the cross member are joined to the gussets which additionally function to reinforce the wheel houses.

Consequently, since the rigidity of the vicinity of the strikers can be increased, even if a relatively large magnitude of force is applied to the strikers, the seat cushion can be locked to the seating position in the ensured fashion while maintaining the mounting accuracy of the strikers more preferably.

What is claimed is:

1. An electric vehicle seat stowing structure, comprising:
   a swing drive mechanism for swinging a seat cushion between a seating position and a stowing position, the swing drive mechanism provided on a floor of a vehicle in the vicinity of a wheel house including
      a group of reduction gears disposed in a gear case or in a bracket; and
      an actuator for driving the group of reduction gears placed vertically on a side of the gear case or the bracket; and
   a striker for locking the seat cushion in the seating position.

2. An electric vehicle seat stowing structure as set forth in claim 1, further comprising
   a rear member for reinforcing the floor, wherein the swing drive mechanism and the striker are mounted on the rear member.

3. An electric vehicle seat stowing structure as set forth in claim 1, further comprising a reinforcement cross member disposed on the floor in the vicinity of the striker, wherein an end portion of the cross member is connected to a gusset reinforcing the wheel house additionally.

4. An electric vehicle seat stowing structure as set forth in claim 2, further comprising a reinforcement cross member disposed on the floor in the vicinity of the striker, wherein an end portion of the cross member is connected to a gusset reinforcing the wheel house additionally.

5. An electric vehicle seat stowing structure as set forth in claim 1, wherein the electric vehicle seat stowing structure is adopted to a the vehicle of which riding capacity ranges from 6 to 7 occupants.

6. An electric vehicle seat stowing structure as set forth in claim 1, wherein the electric vehicle seat stowing structure is adopted to a the vehicle of which riding capacity ranges from 4 to 5 occupants.

7. An assembling method of an electric vehicle seat stowing structure, comprising steps of:
   mounting a cross member on a floor of a vehicle;
   mounting a first support shaft on the floor, and disposing a first mounting plate provided on the first support shaft so as to be inclined at a predetermined angle;
   mounting a second support shaft on the floor via a swing drive mechanism, and disposing a second mounting plate provided on the second support shaft so as to be inclined at the predetermined angle;
   mounting first and second strikers, respectively, at positions being spaced apart at a predetermined distance relative to the first and second support shafts;
   inclining the seat cushion according to inclination angles of the respective first and second mounting plates;
   engaging first and second locking brackets of the seat cushion with the first and second mounting plate, respectively;
   swinging the seat cushion to a floor recessed stowing portion; and
   mounting the first and second mounting plates on a bottom portion of the seat cushion
   wherein the swing drive mechanism includes
      a group of reduction gears disposed in a gear case or in a bracket; and
      an actuator for driving the group of reduction gears placed vertically on
   a side of the gear case or the bracket.

8. An assembling method of an electric vehicle seat stowing structure as set forth in claim 7, wherein the first support shaft and the first mounting plate are a right support shaft and a right mounting plate, respectively, and the second support shaft and the second mounting plate are a left support shaft and a left mounting plate, respectively.

9. An assembling method of an electric vehicle seat stowing structure as set forth in claim 7, wherein the first support shaft and the first mounting plate are a left support shaft and a left mounting plate, respectively, and the second support shaft and the second mounting plate are a right support shaft and a right mounting plate, respectively.

10. An electric vehicle seat stowing structure as set forth in claim 1, further comprising a lock mechanism including
    a base mounted on a cushion frame;
    a plate mounted on the base via a rotational shaft portion;
    first and second gears provided at an upper end portion of the base;
    a lower lever mounted on the plate via a pin so as to freely swing thereon;
    a lock gear formed on the lower lever, the lock gear meshing with the first and second gears;
    an intermediate lever mounted on the plate via an intermediate pin so as to freely swing thereon, the intermediate lever pressing a distal end of the lower swing lever;
    an upper lever mounted on the plate via an upper pin so as to freely swing thereon; and
    a tension spring extended between the lower swing lever and the upper swing lever.

11. An electric vehicle seat stowing structure as set forth in claim 10, further comprising an automatic lock release mechanism including
    a mounting bracket mounted on the cushion frame;
    a driving motor provided on the mounting bracket;
    a fluctuating shaft protruded from the driving motor;
    a magnet mounted on the fluctuating shaft; and an upper and lower sensor mounted, respectively, on locations that correspond to upper and lower ends of the fluctuating shaft.

12. An electric vehicle seat stowing structure as set forth in claim 11, further comprising a manual lock release mechanism including a lever of which a lower end is mounted thereon via a pin in such a manner that the lever freely swings on the pin;

an arm provided in such a manner as to extend to the lower end portion of the manual lever;

an inner cable of which a proximal end portion is connected to the distal end portion of the arm; and a coil spring mounted on the pin.

13. An electric vehicle seat stowing structure as set forth in claim 12, wherein the cable branches to a first and second cable at a connecting portion, the first and second cable being connected to the automatic lock release mechanism and manual lock release mechanism, respectively.

* * * * *